(12) United States Patent
Gunn, III et al.

(10) Patent No.: US 7,184,625 B2
(45) Date of Patent: Feb. 27, 2007

(54) OPTICAL WAVEGUIDE GRATING COUPLER INCORPORATING REFLECTIVE OPTICAL ELEMENTS AND ANTI-REFLECTION ELEMENTS

(75) Inventors: Lawrence C. Gunn, III, Encinitas, CA (US); Thierry J. Pinguet, Cardif-By-The-Sea, CA (US); Maxime J. Rattier, Paris (FR)

(73) Assignee: Luxtera, Inc, Carlsbad, CA (US)

( * ) Notice: Subject to any disclaimer, the term of this patent is extended or adjusted under 35 U.S.C. 154(b) by 142 days.

(21) Appl. No.: 10/776,438

(22) Filed: Feb. 10, 2004

(65) Prior Publication Data

US 2004/0156589 A1    Aug. 12, 2004

Related U.S. Application Data

(60) Provisional application No. 60/446,842, filed on Feb. 11, 2003, provisional application No. 60/446,843, filed on Feb. 11, 2003, provisional application No. 60/446,844, filed on Feb. 11, 2003, provisional application No. 60/446,845, filed on Feb. 11, 2003, provisional application No. 60/446,846, filed on Feb. 11, 2003, provisional application No. 60/446,847, filed on Feb. 11, 2003.

(51) Int. Cl.
*G02B 6/34* (2006.01)
*G02B 6/26* (2006.01)
*G02B 6/42* (2006.01)
*G02B 6/10* (2006.01)
*H01S 3/30* (2006.01)
*H01S 3/03* (2006.01)

(52) U.S. Cl. .............................. 385/37; 385/26; 385/27; 385/28; 385/43; 385/129; 385/130; 385/131; 372/6; 372/64

(58) Field of Classification Search ................. 385/37, 385/26–28, 43, 129–131; 372/6, 64
See application file for complete search history.

(56) References Cited

U.S. PATENT DOCUMENTS 4,173,778 A * 11/1979 Snavely et al. ............. 362/297

(Continued)

OTHER PUBLICATIONS

"Low Loss Nanophotonic Waveguides and Ring Resonators in Silicon-on-Insulator"; Beats, et al.

(Continued)

*Primary Examiner*—Frank G. Font
*Assistant Examiner*—Jerry Martin Blevins
(74) *Attorney, Agent, or Firm*—Fernandez & Associates, LLP

(57) ABSTRACT

An optical wavelength grating coupler incorporating one or more distributed Bragg reflectors (DBR) or other reflective elements to enhance the coupling efficiency thereof. The grating coupler has a grating comprising a plurality of scattering elements adapted to scatter light along a portion of an optical path, and the one or more DBRs are positioned with respect to the grating such that light passing through the grating towards the substrate of the grating coupler is reflected back by DBRs toward the grating. The DBR comprises a multilayer stack of various materials and may be formed on the substrate of the grating coupler. The grating coupler may include a gas-filled cavity, where the cavity is formed by a conventional etching process and is used to reflect light toward the grating. The grating coupler may also incorporate an anti-reflection coating to reduce reflective loss on the surface of the grating.

22 Claims, 24 Drawing Sheets

U.S. PATENT DOCUMENTS

| | | | |
|---|---|---|---|
| 5,033,812 | A | 7/1991 | Yoshida et al. |
| 5,101,459 | A | 3/1992 | Sunagawa |
| 5,132,843 | A | 7/1992 | Aoyama et al. |
| 5,200,939 | A | 4/1993 | Nishiwaki et al. |
| 5,436,991 | A | 7/1995 | Sunagawa et al. |
| 5,473,721 | A * | 12/1995 | Myers et al. ............... 385/129 |
| 5,742,433 | A | 4/1998 | Shiono et al. |
| 6,003,340 | A * | 12/1999 | Borak et al. ................. 65/392 |
| 6,215,928 | B1 * | 4/2001 | Friesem et al. .............. 385/37 |
| RE37,354 | E * | 9/2001 | Welch et al. ............. 372/50.1 |
| 6,285,813 | B1 | 9/2001 | Schultz et al. |
| 2003/0108274 | A1 * | 6/2003 | Haronian .................... 385/17 |

OTHER PUBLICATIONS

"Large-Scale Production Techniques for Photonic Nanostructures"; Bogaerts, et al.

"CMOS-Compatible Planar Silicon Waveguide-Grating-Coupler Photodetectors Fabricated on Silicon-On-Insulator (SOI) Substrates"; S.M. Csutak, S. Dakshina-Murthy & Joe C. Campbell; IEEE Journal of Quantum Electronics, vol. 38, No. 5, May 2002.

"Buried-Oxide Silicon-On-Insulator Structures II: Waveguide Grating Couplers"; Emmons, et al.; IEEE Journal of Quantum Electronics, vol. 28, No. 1, Jan. 1992.

"Integrated Optics for Optical Head Applications"; Ochiai et al; Electronics Letters Aug. 18, 1994, vol. 30, No. 17, p. 1403-1404.

"Effects of Grating Heights on Highly Efficient Unibond SOI Waveguide Grating Couplers": Ang, et al; IEEE Photonics Technology Letters, vol. 12, No. 1, Jan. 1, 2000.

"Mode Matching Technique for Highly Efficient Coupling Between Dielectric Waveguides and Planar Photonic Crystal Circuits"; Sanchis, et al.

"Non Uniform Grating Couplers for Coupling of Gaussian Beams to Compact Waveguides"; West, et al; Published in the Integrated Photonics Research Technical Digest 1994.

* cited by examiner

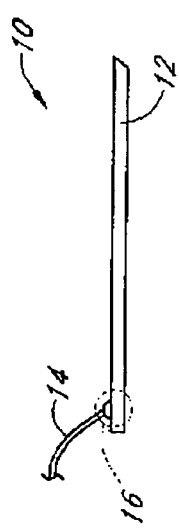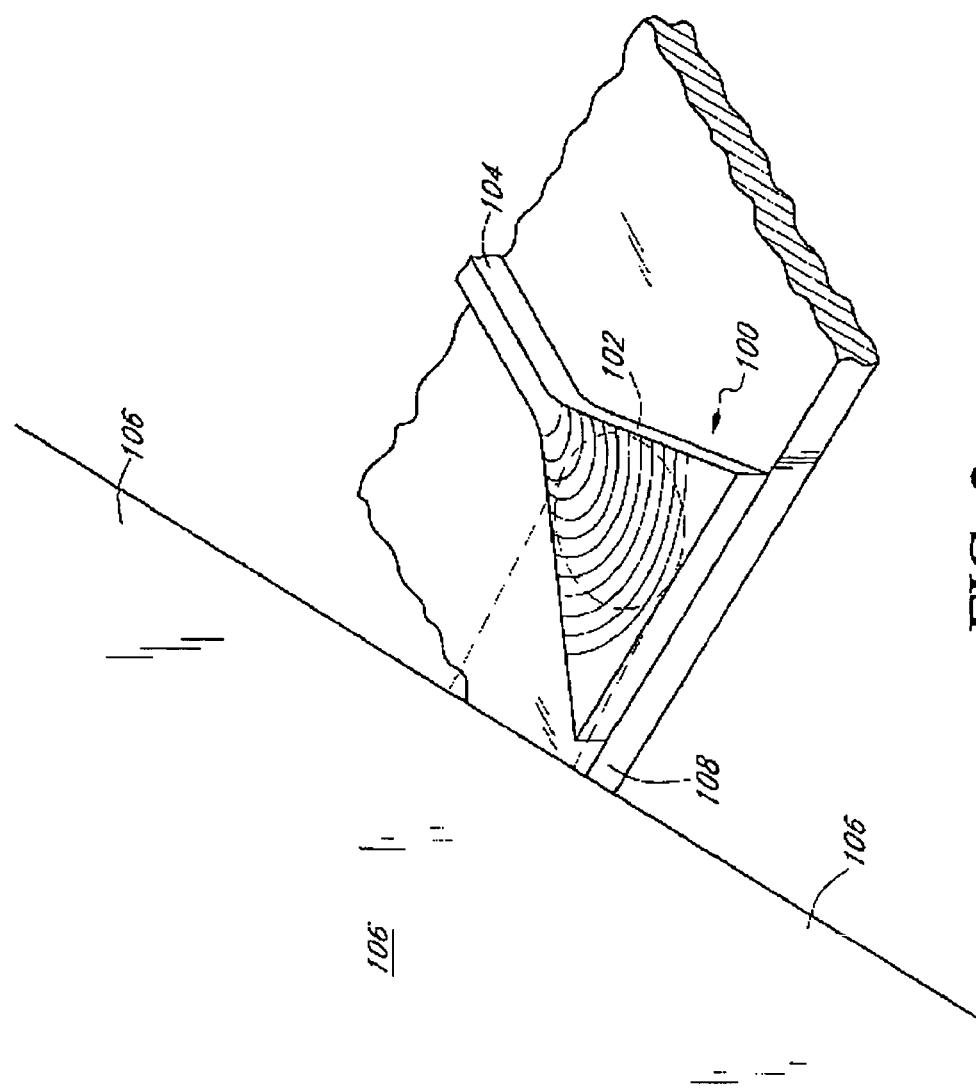
FIG. 1
FIG. 2

OPTICAL WAVEGUIDE GRATING COUPLER INCORPORATING REFLECTIVE OPTICAL ELEMENTS AND ANTI-REFLECTION ELEMENTS

CROSS REFERENCE TO RELATED APPLICATIONS

This application claims the benefit of U.S. Provisional Applications No. 60/446,842, 60/446,843, 60/446,844, 60/446,845, 60/446,846 and 60/446,847, all of them filed on Feb. 11, 2003.

FIELD OF INVENTION

The present invention relates to integrated optics, and more particularly, to an optical waveguide grating coupler incorporating reflective optical elements and anti-reflective elements.

BACKGROUND OF INVENTION

Light offers many advantages when used as a medium for propagating information, the foremost of which are increased speed and bandwidth. In comparison with electrical signals, signals transmitted optically can be switched and modulated faster and can include an even greater number of separate channels multiplexed together. For these, as well as other reasons, lightwave transmission along optical fibers is widespread.

Light can be propagated through planar waveguide structures as well as optical fibers. Planar waveguide structures having a wide variety of functionalities are currently available and many new such devices and components will likely result from future research and development. These planar structures are advantageous because they can be compactly incorporated together in or on a planar platform, i.e. substrate, to form planar packages analogous to integrated circuits (ICs). These structures in general are referred to as integrated optics. Integrated optical "chips" comprise a substrate on which or in which various integrated optical components or devices are formed. Planar waveguides analogous to conductor traces in semiconductor electronic ICs that are mounted in or on the substrate are employed to guide light to various optical, electro-optical, and optoelectronic devices or components on the chip.

In many applications, it is desirable that the optical signal being transmitted through the planar waveguide structures be optically coupled into or out of the integrated optical chip. These signals may, for example, be coupled to an optical fiber that is oriented out of the plane, i.e., above or below, the planar waveguide structure via a grating coupler. The grating coupler, forming a part of the planar waveguide structure, may have a plurality of scattering elements designed to scatter light along a predetermined optical path.

In the case where the planar waveguide receives light delivered by the optical fiber, a coupling efficiency of the grating coupler may be defined as the ratio of the amount of light coupled into the planar waveguide to the quantity of the light delivered by the optical fiber. The coupling efficiency is unfavorably affected by two mechanisms: (i) reflection of light on surface of the grating coupler, and (ii) transmission of light through the grating coupler and absorption of the transmitted light by the substrate of the planar waveguide. Likewise, in the case where the planar waveguide delivers light to the optical fiber, the coupling efficiency, defined as the ratio of the amount of light coupled into the optical fiber to the quantity of the light delivered by the planar waveguide, is also affected by the two mechanisms. In both cases, the coupling efficiency affects the performance of the planar waveguide structure and, consequently, the integrated optical chips. Thus, there is a need for optical elements incorporated by the grating coupler, where the optical elements suppress the two mechanisms and enhance the coupling efficiency of the grating coupler.

SUMMARY OF INVENTION

The present invention provides an optical waveguide grating coupler incorporating reflective optical elements and/or anti-reflective elements to enhance the coupling efficiency.

One aspect of the invention comprises an integrated optical apparatus comprising a planar waveguide having an elongated guiding portion and a grating coupler. The grating coupler comprises a grating comprising a plurality of elongate scattering elements having respective scatter cross-sections adapted to scatter light along at least a portion of a predetermined optical path. The grating coupler further comprises a reflector positioned with respect to the grating such that light not scattered along the portion of the optical path is reflected by the reflector towards the grating. The waveguide may comprise a core region surrounded by cladding, which is formed on a substrate. The reflector may be disposed between the cladding and the substrate such that light passing through the grating coupler that propagates toward the substrate is reflected back toward the grating.

Another aspect of the invention comprises a method of fabricating a waveguide grating coupler for coupling light having a predetermined wavelength between an optical element and a waveguide. The optical element and the waveguide are juxtaposed such that the light propagates along an optical path therebetween at an angle with respect to the optical coupler. A Distributed Bragg Reflector (DBR) is provided on a substrate by forming alternating layers of material having relatively high and low refractive indices and thicknesses that provide enhanced reflectivity for the predetermined wavelength and the angle of the optical path. A planar waveguide is formed over the DBR by forming a slab and cladding above the DBR. An optical grating is formed by patterning a plurality of diffractive features in the waveguide.

Another aspect of the invention comprises an integrated optical apparatus comprising a planar waveguide having an elongated guiding portion and a grating coupler. The grating coupler comprises a grating comprising a plurality of elongate scattering elements having respective scatter cross-sections adapted to scatter light along at least a portion of a predetermined optical path. The grating coupler further comprises a Distributed Bragg Reflector (DBR) positioned with respect to the grating such that light not scattered along the portion of the optical path is reflected by DBRs towards the grating.

Still another aspect of the invention comprises an integrated optical apparatus comprising a planar waveguide having an elongated guiding portion and a grating coupler. The grating coupler comprises a grating comprising a plurality of elongate scattering elements having respective scatter cross-sections adapted to scatter light along at least a portion of a predetermined optical path. The grating coupler further comprises a pair of Distributed Bragg Reflectors (DBRs) positioned on opposite sides of the grating such that light outside the portion of the optical path is reflected by DBRs towards the grating.

Yet another aspect of the invention comprises an integrated optical apparatus comprising a planar waveguide having a cladding. The waveguide has an elongated guiding portion and a grating coupler. The grating coupler comprises a grating comprising a plurality of elongate scattering elements having respective scatter cross-sections adapted to scatter light along at least a portion of a predetermined optical path. The grating coupler further includes a gas-filled cavity, at least a portion of which is in the cladding. The cavity is positioned with respect to the grating such that light not directed along the portion of the optical path is reflected by the cavity towards the grating.

Another aspect of the invention comprises a method of fabricating a waveguide grating coupler. This method includes forming a planar waveguide on a substrate, etching an area adjacent the waveguide down to a level beneath the waveguide, laterally etching beneath the waveguide to form a cavity under the waveguide, and forming an optical grating by patterning a plurality of diffractive features in the waveguide.

Still another aspect of the invention comprises an integrated optical apparatus comprising a planar waveguide having an elongated guiding portion and a grating coupler. The grating coupler comprises a grating comprising a plurality of elongate scattering elements having respective scatter cross-sections adapted to scatter light along at least a portion of a predetermined optical path. The grating coupler further includes an optical coating layer on the grating, as well as an anti-reflection coating on the optical coating.

BRIEF DESCRIPTION OF DRAWINGS

These and other features of the invention will now be described with reference to the drawings summarized below. These drawings and the associated description are provided to illustrate preferred embodiments of the invention and are not intended to limit the scope of the invention.

FIG. 1 depicts a side view of an integrated optical chip coupled to an optical fiber.

FIG. 2 illustrates a perspective view of a grating coupler that couples light between a planar waveguide on the integrated optical chip and an optical fiber that has a substantially larger lateral dimension than the planar waveguide.

DETAILED DESCRIPTION OF PREFERRED EMBODIMENT(S)

Figure 3:
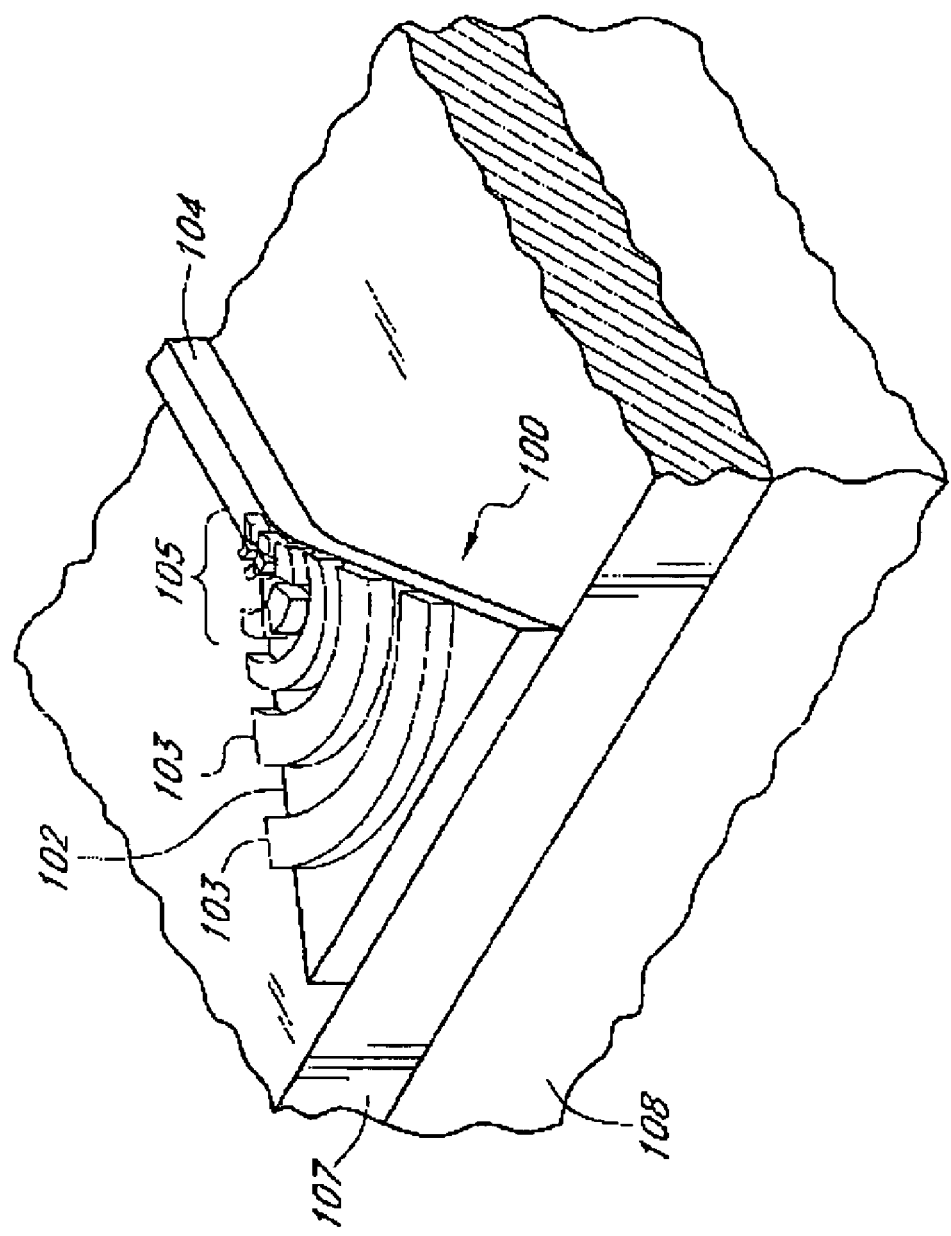
FIG. 3 illustrates a perspective view of one embodiment of a grating coupler for coupling light to a planar waveguide such as a channel waveguide or a strip waveguide.

Although this invention will be described in terms of certain preferred embodiments, other embodiments that are apparent to those of ordinary skill in the art, including embodiments that do not provide all of the benefits and features set forth herein, are also within the scope of this invention. Accordingly, the scope of the invention is defined only by reference to the appended claims.

A. Planar Waveguides and Integrated Optical Chips

In general, optical waveguides comprise a core region comprising material that is at least partially transparent. This core region is surrounded by a cladding region that confines light within the core region. Some optical energy, often referred to as the evanescent energy or the evanescent field, however, may exist outside the core region and within the cladding region.

In certain waveguides, the core region comprises a first medium having a first refractive index, and the cladding region or cladding comprises a second medium having a second refractive index, the refractive index of the core region being greater than the refractive index of the cladding region. A core/cladding interface is located at the boundary between the core region and the cladding region. In such embodiments, when light in the core region is incident upon this core/cladding interface at an angle greater than the critical angle, the light is reflected back into the core region. This effect is referred to as total internal reflection. In this manner, optical signals can be confined within the core region due to total internal reflection at the core/cladding interface.

Waveguides can be fabricated in a wide variety of geometries and configurations. A channel waveguide, and more specifically, a buried channel or embedded strip waveguide, is a specific type of waveguide that fits the description above. A channel waveguide generally comprises a core comprising a first medium having a relatively high refractive index surrounded by a relatively lower refractive index cladding region. A buried channel or embedded strip waveguide generally comprises a core embedded in a substrate that forms at least part of the surrounding cladding region.

A buried channel waveguide is an example of a planar or integrated optical waveguide, which are generally associated with a planar substrate. The planar or integrated optical waveguide may for example be situated on the substrate, in a substrate, or partially on and partially in the substrate. The planar waveguide may be part of the planar substrate itself but preferably comprises a structure formed in or on one or more layers of material positioned on a surface of the substrate. Examples of planar or integrated optical waveguides include the channel waveguides discussed above, as well as slab waveguides, rib or ridge waveguides, and strip loaded waveguides discussed more fully below.

In accordance with conventional usage in the art, optical components that are integrated onto a substrate with planar waveguides, i.e., integrated optical waveguides, are collectively referred to herein as integrated optics. Such optical component may for example, process, manipulate, filter or otherwise alter or control optical signals propagating within the waveguides. As discussed above, these components themselves may be waveguides that guide light.

One of the simplest planar waveguide or integrated optical waveguide configurations is the conventional slab waveguide. The slab waveguide comprises a thin, planar slab surrounded by cladding regions. The cladding regions may take the form of first and second (for example, upper and lower) cladding layers on either side of the slab. The two cladding layers need not comprise the same material. In this simplified example, the slab may be planar with substantially parallel planar boundaries at the interfaces with the first and second (i.e., upper and lower) cladding layers. Generally, the slab has a higher refractive index than either of the cladding layers. Light can therefore be confined in one dimension (e.g., vertically) within the slab. In this configuration of the slab waveguide, optical energy is not confined laterally to any portion of the slab, but extends throughout the slab due to total internal reflection at the planar boundaries between the slab and the surrounding upper and lower cladding layers.

A ridge or rib waveguide is formed by creating thickness variations in the slab. These thickness variations may be formed by depositing material on selected regions of the slab or by removing material from selected regions of the slab. The slab with the ridges or ribs formed thereon may be surrounded on opposite sides by the first and second (e.g., upper and lower cladding layers) comprising relatively low refractive index material. The thicker portions, i.e., the ridges or ribs, which comprise more slab material, will have a higher effective index than thinner region of the slab which comprise relatively lesser amounts of the slab material.

Accordingly, the region within the slab that is beneath the thicker portions and in proximity thereto has a higher effective refractive index than other portions of the slab. Thus, unlike the slab waveguide wherein optical energy propagates throughout the planar slab, the ridge or rib waveguide substantially confines optical energy to the region of the planar slab layer within and under the ridge and in proximity thereto. In a ridge or rib waveguide, therefore, an optical signal can be propagated along a path in the slab defined by the region under which the ridge or rib is located on the slab. Thus, ridge waveguides defining any number and variations of optical pathways can be created by forming one or more ridges or ribs in the slab having the shape and orientation of the desired optical pathways.

Similarly, a strip-loaded waveguide is formed by positioning a strip of material on the slab of a slab waveguide. The slab and the strip located thereon may be surrounded on opposite sides by the first and second (e.g., upper and lower)

cladding layers having lower refractive index than the slab. Preferably, the strip has a refractive index that is greater than that of either cladding layers, however, the index of the strip is preferably approximately equal to that of the slab. The presence of the strip positioned on the slab induces an increase in effective index of the slab in the region beneath the strip and in proximity thereto.

As with the ridge or rib waveguide, the region within the slab that is beneath the strip and in proximity thereto has a higher effective refractive index than other portions of the slab. Thus, the strip-loaded waveguide can substantially confine optical energy to the region of the planar slab layer under the high-index strip, some of the optical energy also being within the strip itself. Accordingly, in a strip-loaded waveguide, an optical signal can be propagated along a path in the slab defined by the region over which the high-index strip is placed on the slab. Waveguides corresponding to any number and variation of optical pathways can be created by depositing one or more strips onto the slab having the shape and orientation of the desired optical pathways.

Another form of waveguide discussed in U.S. patent application Ser. No. 10/241,284 entitled "Strip Loaded Waveguide with Low-Index Transition Layer" filed Sep. 9, 2002, which is hereby incorporated herein by reference in its entirety, comprises a slab having a first refractive index $n_1$ and a strip having a second refractive index $n_2$. In addition, the strip loaded waveguide structure has a transition layer having a third refractive index $n_3$. The transition layer is positioned between the slab and the strip, such that the slab and the strip do not directly contact each other. The refractive index of the transition layer $n_3$ is less than the refractive index of the slab $n_1$ and the refractive index of the strip $n_2$.

The light within the slab is confined to portions beneath the strip because of the presence of the strip, despite the fact that the strip is separated from the slab. The intervening transition layer does not prevent the strip from determining the shape and location of the optical mode(s) supported in the slab. The presence of the strip positioned proximally to the slab portion induces an increase in effective index of the slab portion in the region directly under the strip and in proximity thereto. This increase in effective index defines a relatively high effective index guiding region wherein light in one or more supported optical modes is guided along the strip-loaded waveguide. The strip loaded waveguide guides supported modes in the guiding region despite the presence of the transition layer between the slab and strip. In particular, the transition layer does not prevent the strip from altering the effective index within the slab and more particularly, from raising the effective index within the slab. Preferably, the transition layer has a thickness sufficiently small and an index sufficiently low such that the strip can increase the effective index of the slab in regions immediately beneath and in the proximity thereto.

In certain embodiments of the invention, semiconductor materials used in conventional processes for fabrication of semiconductor microelectronics are employed to create waveguide structures. These materials include, but are not limited to, crystalline silicon, polysilicon, and silicon dioxide ($SiO_2$). In particular, in various preferred embodiments of the strip load waveguide having an insulating transition layer, the slab may comprise single crystal silicon, the transition layer may comprise silicon dioxide, and the strip may comprise polysilicon, although in other preferred embodiments, the strip may comprise crystal silicon. The crystal silicon slab and the polysilicon strip may be doped so as to be electrically conducting although in portions of the slab or strip that are not to be conductive, the slab and the strip are preferably undoped to minimize absorption losses.

As is well known, single crystal silicon is used to fabricate semiconductor microelectronics and integrated circuits (ICs), such as microprocessors, memory chips and other digital as well as analog ICs, and thus single crystal silicon is well characterized and its properties are largely well understood. The term single crystal silicon is used herein consistently with its conventional meaning. Single crystal silicon corresponds to crystalline silicon. Single crystal silicon, although crystalline, may include defects such that it is not truly a perfect crystal, however, silicon having the properties conventionally associated with single crystal silicon will be referred to herein as single crystal silicon despite the presence of such defects. The single crystal silicon may be doped either p or n as is conventional.

Single crystal silicon should be distinguished from polysilicon or "poly". Polysilicon is also used to fabricate semiconductor microelectronics and integrated circuits. The term polysilicon or "poly" is used herein consistently with its conventional meaning. Polysilicon corresponds to polycrystalline silicon, silicon having a plurality of separate crystalline domains. Polysilicon can readily be deposited for example by CVD or sputtering techniques, but formation of polysilicon layers and structures is not to be limited to these methods alone. Polysilicon can also be doped p or n and can thereby be made substantially conductive. In general, however, bulk polysilicon exhibits more absorption losses in the near infrared portion of the spectrum than similar bulk single crystal silicon, provided that the doping, temperature, and other parameters are similar.

Optical switches, modulators, and couplers, among other devices, as well as the waveguides that optically connect them, can be implemented using various waveguide structures including but not limited to the types discussed above, e.g., channel, slab, rib or ridge, strip loaded, and strip loaded with a low index transition layer. In addition, these structures can be formed using semiconductor materials, such as for example, silicon.

B. Optical Coupling to Integrated Optical Chips

An exemplary embodiment of an integrated optical chip 10 such as shown in FIG. 1, comprises a planar substrate 12 which includes a plurality of optical components (not shown) formed on or in the planar substrate or layers formed thereon. These optical components may or may not be planar waveguide structures. Preferably, however, these optical components are optically connected together via planar waveguides (also not shown). These optical components may operate together as a system or subsystem to perform a desired utility. In various embodiments, therefore, it may be desirable to couple light into and/or out of the integrated optical chip 10. Accordingly, an optical element for outputting or receiving light may be placed in close proximity to the integrated optical chip 10 to accomplish such optical coupling. In FIG. 1, such exemplary optical element for coupling light into or receiving light from the integrated optical chip 10 comprises an optical fiber 14 attached to the integrated optical chip 10 in a region 16 of the chip. Although an optical fiber 14 is illustrated in FIG. 1 as optically connected to the chip 10, other waveguide or non-waveguide structures can be employed in the alternative. Instead of an optical fiber 14, for example, the optical element sending or receiving the light may be another planar waveguide or integrated optical device. Examples of possible optical components include light sources such as laser diodes, modulators and optical detectors. In various preferred embodiments, however, the optical element comprises an optical fiber 14 such as shown in FIG. 1.

The optical fiber 14 may be attached to the integrated optical chip 10, for example, by a substantially transparent adhesive, cement, or epoxy. In certain embodiments, the material forming the bond or connection comprises glass. This material may comprise silicon dioxide, or may comprise polymeric material but should not be limited to these particular materials recited herein. The optical fiber 14 may be physically joined to the integrated optical chip 10 with the aid of other fastening structures as well. The optical fiber 14 may be butt up flush against the integrated optical chip 10 or a space may remain therebetween. This space may be an air gap or may be filled with material preferably substantially optically transmissive to the wavelength of light being coupled between the fiber 14 and an integrated optical waveguide on the chip 10.

For many embodiments, the optical waveguides on the integrated optical chip 10 will be substantially smaller than the optical fiber 14. The core of the optical fiber 14 may, for example, have a diameter of about 8 micrometers (µm) while the planar waveguide might have a width and height in the range of between about 0.5 µm and 0.2 µm. Such a mismatch in the size of the two structures leads to coupling loss, as the optical modes supported by the two waveguides are substantially different in size. Preferably, therefore, the integrated optical chip 10 includes an optical coupler, and more particularly, a waveguide grating coupler, for efficiently coupling light between the optical fiber 14 and the planar waveguides on the substrate 12. By employing waveguide grating coupler designs described herein, the coupling efficiency between the fiber 14 and the planar waveguide may be greater than about 50%.

FIG. 2 illustrates a perspective view of a planar waveguide structure 100 comprising a waveguide grating coupler 102 that optically couples the planar waveguide 100 to an external optical element such as an optical fiber 106. (While the optical fiber 106 is also a form of a waveguide, it will be herein referred to as a "fiber" or an "optical fiber" to distinguish it from a planar waveguide and thereby to avoid confusion.) As will be discussed more fully below, this waveguide grating coupler 102 preferable is flared and has a plurality of elliptically shaped elongate scattering elements referred to as rulings or grates for diffracting light into or out of the planar waveguide structure 100. The waveguide grating couplers itself preferably comprises a planar waveguide such as for example a channel waveguide, strip waveguide with or without low index transition layers, rib/ridge waveguide, or slab waveguide. Other types of planar waveguides both those well-known in the art or yet to be devised are also considered possible.

In addition to the waveguide grating coupler, the planar waveguide structure 100 further comprises an elongate guiding portion 104 which may also comprise, a channel waveguide, strip waveguide with or without low index transition layers, rib or ridge waveguide, as well as slab waveguide although the structures and designs should not be limited to these. Other type of planar waveguide well-known in the art or yet to be devised are also possible. This elongate guiding portion 104 may be optically connected to other planar waveguides or planar waveguide structures. This guiding portion 104 may also be connected to non-waveguide optical components.

The planar waveguide structure 100, including the elongate guiding portion 102, is disposed on a substrate or one or more layers of material 108 formed on the substrate. Exemplary waveguide structures and methods for fabricating such waveguides and waveguide structures on substrates 108 are disclosed in U.S. patent application Ser. No. 10/241,284 entitled "Strip Loaded Waveguide with Low-Index Transition Layer" filed Sep. 9, 2002, as well as U.S. patent application Ser. No. 10/242,314 entitled "Tunable Resonant Cavity Based on the Field Effect in Semiconductors" filed Sep. 10, 2002, both of which are hereby incorporated herein by reference in their entirety. Other configurations are considered possible and may be more suitable for specific applications. For example, photonic bandgap crystal waveguides may be used. See, for example, U.S. patent application Ser. No. 10/242,682 entitled "Structure and Method for Coupling Light Between Dissimilar Waveguides" filed Sep. 10, 2002, which is also hereby incorporated herein by reference in its entirety. Nevertheless, the usable waveguide structures are not to be limited to those described herein and may include types yet to be discovered or developed.

Various aspects of the grating coupler 102 described below facilitate effective coupling of light between the fiber 106 and the planar waveguide structure 100 where, in many cases, the size, i.e., diameter, of the fiber 106 is substantially larger than the cross-sectional dimension, i.e., width and height, of the guiding portion 104. As described below, properties of the wavefronts of the light at least partially determine how efficiently the light is transferred. In general, light will propagate longitudinally through the optical fiber 106 as a plane wave. Similarly, light that travels longitudinally through the length of the guiding portion 104 is also preferably a plane wave. Accordingly, various embodiments of the grating coupler 102 are adapted in manners described below to allow formation and receiving of planar wavefronts having the appropriate features such as spatial dimension.

As referred to above, in one aspect described below in greater detail, the grating coupler 102 is adapted to efficiently couple the light signal between the relatively large dimensioned fiber 106 and the relatively small dimensioned guiding portion 104. Transforming the dimensions of the plane waves between the fiber 106 and the elongate guiding portion 104 involves causing the light to either diverge or converge depending on the direction of propagation. For example, to transform the light from the smaller dimensioned planar guiding portion to the larger dimensioned fiber 106, the beam emitted from the planar guiding portion 104 can be made to diverge. In the process of introducing divergence, however, the planar wavefronts become curved wavefronts. Thus in one aspect, as described below in greater detail, the grating coupler is adapted to "straighten" out the curved wavefronts of the divergent beam of the light. In some embodiments, a grating is used that comprises elongate scattering elements or grates having an appropriate shape, such as elliptical, which are selected to suitably manipulate and control the curvature of the wavefronts. It will be understood that a process of transforming the beam of light from the larger dimensioned fiber 106 to the smaller dimensioned planar guiding portion 104 into a converging beam is a reciprocal process of the aforementioned process of producing a diverging beam. Thus in the description herein, it will be understood that description of one process is also applicable to the other reciprocal process.

In certain embodiments where the optical fiber 106 is separated from the waveguide grating coupler 102, the wavefronts propagating therebetween preferably comprise generally plane wavefronts. In many of these cases, the end of the fiber 106 is preferably positioned proximate the grating coupler 102 such that the fiber is in the near field of the grating coupler and vice versa. Accordingly, the wavefronts traversing the distance between the fiber 106 and the grating coupler 102 experience less diffraction.

In addition, the lateral intensity profile of the beam, i.e., the intensity variation in a direction orthogonal to the direction of propagation of the beam, preferably generally matches that of the plane waves traveling in the fiber 106. Thus, in yet another aspect described below in greater detail, the grating coupler 102 is adapted to allow the wavefronts between the fiber 106 and the grating coupler 102 to have a similar intensity profile as that of the waves in the fiber 106 and the guiding portion 104. More particularly, the scatter cross-section of the elongate scattering elements or grates is selected to provide the desired intensity profile. The magnitude of this scatter cross-section may be controlled in some cases, for example, by the width of the elongate scattering elements referred to herein as grating width, g. In some cases, the width of the elongate scattering element may vary along the lateral spatial extent or length of the elongate scattering element.

Figure 4:
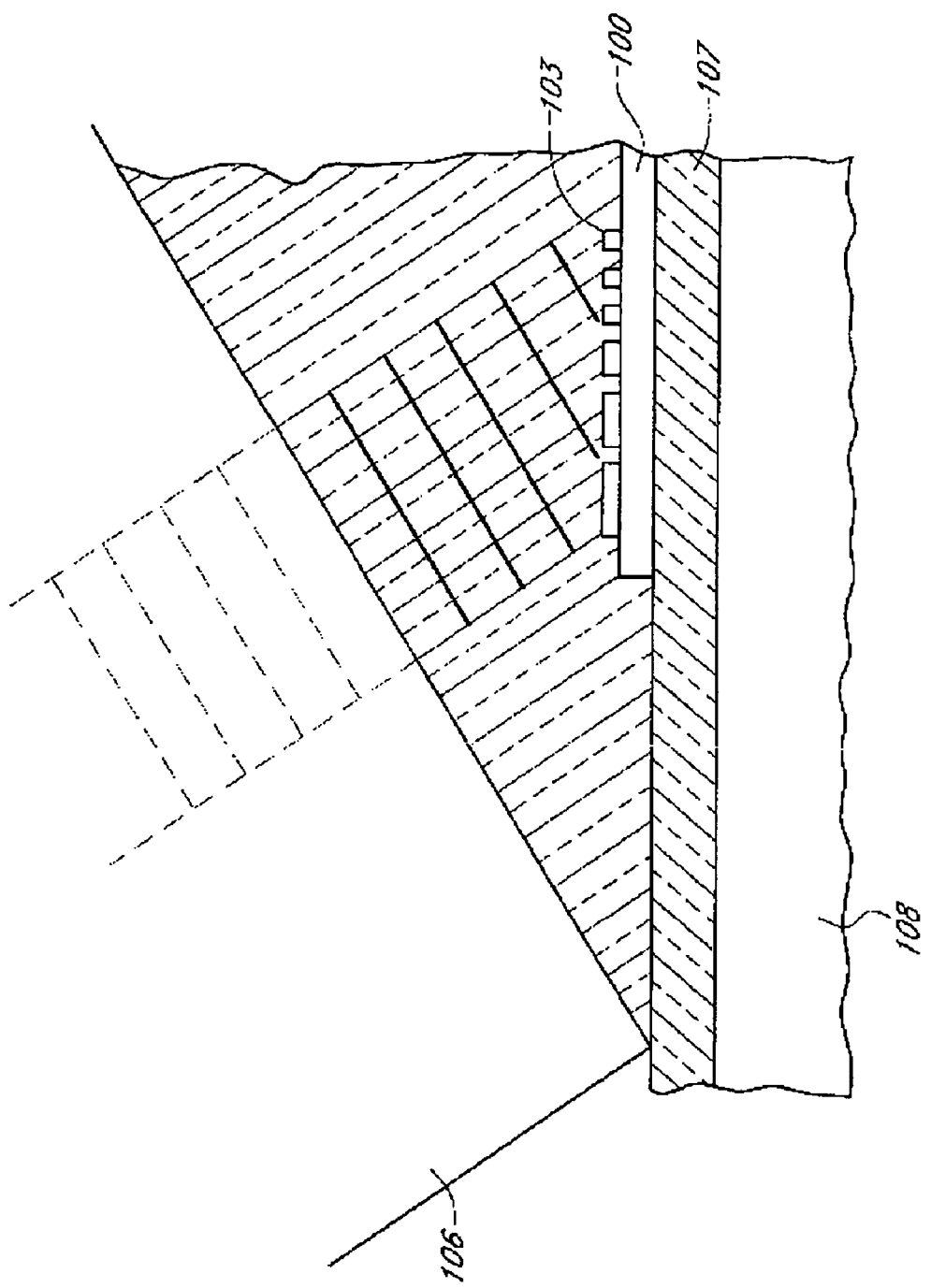
FIG. 4 is a cross-sectional view of a waveguide grating coupler such as shown in FIG. 3, further illustrating optical coupling of plane waves with an optical fiber cemented to the integrated optical chip.

A close-up perspective view of a planar waveguide structure 100 comprising a waveguide grating coupler 102 having elliptically shaped elongate scattering elements 103 of varying widths is illustrated in FIG. 3. As shown, a portion 105 of these elongate scattering elements or grates 103 are segmented. The waveguide grating coupler 102 is also flared. A cross-sectional view of this waveguide structure 100, including a fiber 106 in close proximity thereto, is shown in FIG. 4.

In one embodiment, this planar waveguide structure 100 corresponds to a channel waveguide. The planar waveguide 100 comprises a relatively high index material which is formed on a layer of cladding material 107 which is disposed on a substrate 108 or one or more layers of material formed on the substrate. An upper cladding (not shown) may be formed over the planar waveguide 100. Preferably, the cladding material comprising the upper cladding above the waveguide structure 100 and the layer of cladding 107 below the waveguide structure 100 is relatively low index material. The same material may comprise the upper cladding and the layer of lower cladding 107. The refractive index of this cladding material is preferably low in comparison to the index of the high index material forming the planar waveguide 100.

A plurality of strips or elongate members are arranged over the channel waveguide 100 to form the elongate scattering elements 103 of the grating. In some preferred embodiments, the plurality of strips 103 comprise a different material than that of the channel waveguide 100. In other cases, the material can be substantially the same. In either case, these elongate members 103 perturb the effective refractive index of the channel waveguides 100 at localized regions therein.

In various preferred embodiments, the channel waveguide 100, i.e., the grating coupler and the elongate guiding portion 102 comprises silicon, and more preferably crystal silicon. The lower cladding 107 comprises a layer of silicon dioxide. The substrate 108 comprises a silicon substrate, which may comprise a layer of silicon dioxide formed thereon. Additional layers may also be formed on this silicon substrate beneath the waveguide structure 100. An upper cladding material comprising for example glass, silicon dioxide, or other material substantially optically transmissive to the wavelength of light propagating between the fiber 106 and the planar waveguide 100 may be included. In certain preferred embodiments, the plurality of strips 103 comprise doped or undoped polysilicon or single crystal silicon, however, other different materials may be used for the strips as well. In certain embodiments, the grating spacing may be about 0.6 μm. The width of the grating features may be between about 0.1 to 0.5 μm and the height of the grating features may be about 0.1 μm. In one embodiment wherein the grating coupler comprises a channel waveguide, the thickness of the channel may, for example, be about 0.2 μm and the width of the channel may be about 0.6 μm. The dimensions of the grating coupler 102, however, should not be restricted to those recited herein.

The dimensions of the waveguide 100 in large part along with the material and the associated refractive index, define what modes are supported by the waveguide structure. Preferably, the structure 100 is a single mode waveguide that supports one fundamental mode. The dimensions may also be such that the waveguide structure 100 supports only a single polarization, for example, the TE (transverse electric) polarization mode. The optical fiber 106 may or may not support two polarizations. The dimensions of the waveguide structure 100 depend partially on the wavelength of light for which the waveguide 100 is designed to operate. Various embodiments may be designed for light having a wavelength between about 1.3 and 1.6 micrometers. However, these structures are not to be limited to any particular wavelength or wavelength range and may be designed for microwave, infrared, visible, and ultraviolet wavelengths.

In other embodiments, different materials and dimensions may be used. Additionally, the grating design might be otherwise and may be altered depending on the application. For example, the "grates" or elongated members 103 can be shaped differently and may have other than rectangular or square cross-sections. These elongate members 103 may for instance be blazed. Also, the width of the elongate scattering element 103 may vary along the lateral spatial extent or length of the elongate scattering element. For example, the elongate scattering element 103 may be thinner along a central axis extending longitudinally through the grating coupler 102 and the guiding portion 104 and wider in portions of the elongate scattering element away from this central axis. Such variation in width along the lateral dimension of the elongate scattering element 103 may be employed to provide the desired intensity profile.

Figure 6:
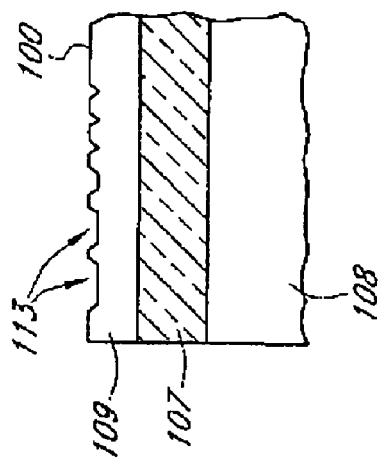
FIGS. 5 and 6 depict perspective and cross-sectional views of other embodiments of a waveguide grating coupler for coupling light to a planar waveguide such as a ridge or rib waveguide.
Figure 5:
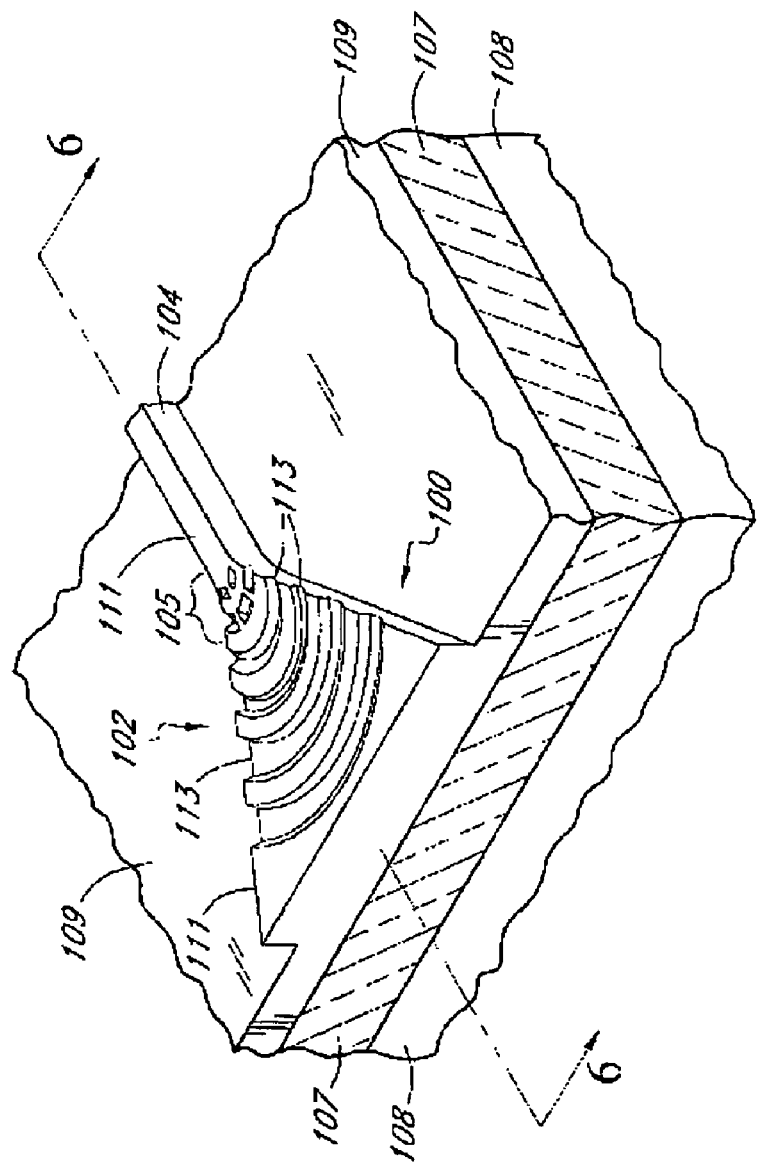

Another embodiment of the planar waveguide structure 100 wherein the elongate scattering elements 103 of the grating are formed differently are illustrated in FIGS. 5 and 6. Also, in this embodiment, the planar waveguide structure 100 corresponds to a rib or ridge waveguide. The planar waveguide 100 comprises a relatively high index material slab 109 which is formed on a layer of cladding material 107 which is disposed on a substrate 108 or one or more layers of material formed on the substrate. A thicker region 111 of the slab 109 corresponding to the "rib" or "ridge" defines the waveguide 100 and controls the confinement of the guided light within the slab. A plurality of elongate grooves 113 are included in the ridge waveguide 100. These grooves or rulings 113 form the elongate scatter elements 103 for the diffraction grating in the grating coupler 102. A portion 105 of these grooved rulings 103 are segmented. The grooves 113 that form the rulings 103 in the grating coupler 102 may be created by patterning such as etching. As indicated above, the width of the elongate scattering element 103 may vary along the lateral dimension of the elongate scattering element 103, e.g., to provide the desired intensity profile.

An upper cladding (not shown) comprising relatively low index material may be formed over the planar waveguide 100. Preferably, the cladding material comprising the upper cladding above the waveguide structure 100 and the layer of cladding 107 below the waveguide structure 100 comprise relatively low index material.

In various preferred embodiments, the slab 109, including the ridge or rib 111 formed thereon, comprises silicon, and more preferably crystal silicon. The lower cladding 107 preferably comprises a layer of silicon dioxide and the substrate 108 comprises a silicon substrate, which may include a layer of silicon dioxide formed thereon. Additional layers may also be formed on this silicon substrate beneath the waveguide structure 100. An upper cladding material comprising for example glass, silicon dioxide, or other material substantially optically transmissive to the wavelength of light coupled between the fiber 106 and the planar waveguide 100 may be included.

In various other embodiments, the planar waveguide structure 100 may comprise a strip-loaded waveguide. Such a waveguide structure 100 may be similar to that shown in FIGS. 5 and 6 except that the ridge 111 is replaced with a layer of material different than that of the slab 109 below.

Figure 8:
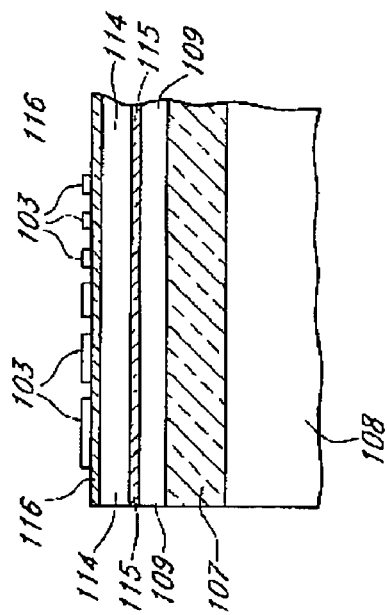
FIGS. 7 and 8 depict perspective and cross-sectional views of other embodiments of a waveguide grating coupler for coupling light to a planar waveguide such as a strip loaded waveguide having a low index transition region.
Figure 7:
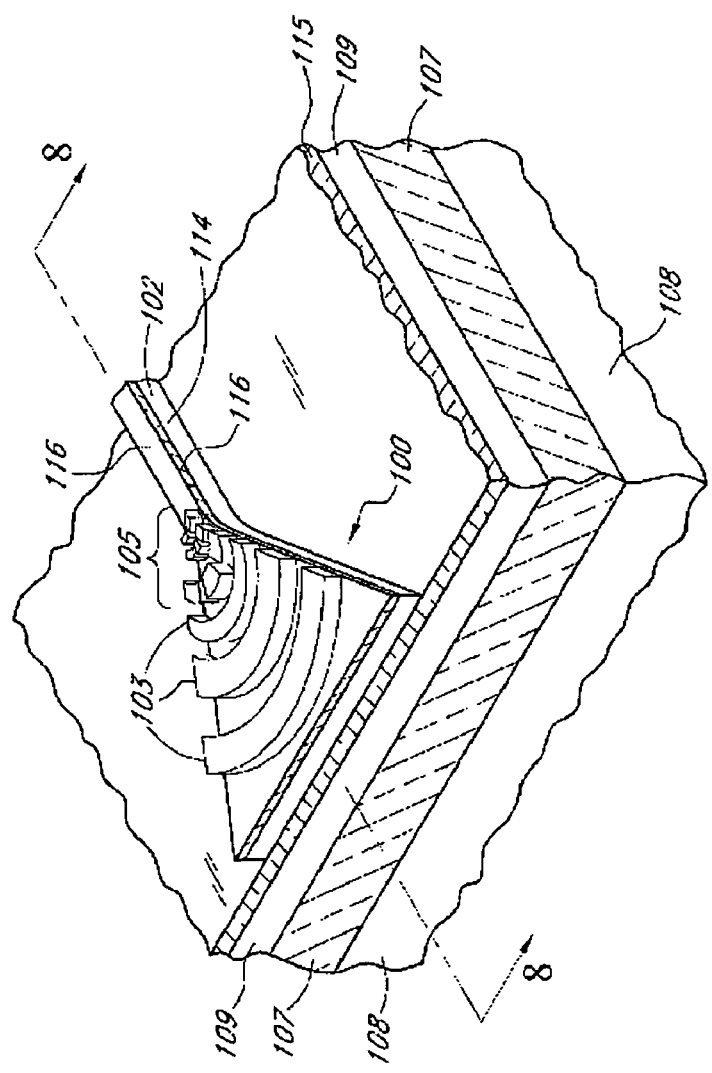

Still another embodiment of the planar waveguide structure 100 is illustrated in FIGS. 7 and 8. In one embodiment, this planar waveguide structure 100 corresponds to a strip-loaded waveguide having a low index transition region. The planar waveguide 100 comprises a relatively high index material slab 109 which is formed on a layer of cladding material 107 which is disposed on a substrate 108 or one or more layers of material formed on the substrate. A strip of material 114 formed over the slab 109 defines the waveguide 100 and controls the confinement of the guided light within the slab. A thin relatively low index transition region 115 is disposed between the strip 114 and the slab 109 as shown.

A plurality of elongate members are arranged over the strip 114 to form the elongate scattering elements 103 of the grating. An intermediate layer 116 may be included between the strip 114 and the plurality of elongate members formed thereon. In some preferred embodiments, the plurality of elongate members 103 comprise a different material than that of the strip 114 and/or the slab 109. In other cases, the material can be substantially the same. Nevertheless, the elongate scattering elements or grates 103 perturb the effective refractive index of the planar waveguides 100 at localized regions therein.

An upper cladding (not shown) comprising relatively low index material may be formed over the planar waveguide 100. Preferably, the cladding material comprising the upper cladding above the waveguide structure 100 and the layer of cladding 107 below the waveguide structure 100, comprise relatively low index material.

In various preferred embodiments, strip 114 and the slab 109 forming the waveguide 100, i.e., grating coupler 102 and the guiding portion 104, comprises semiconductor material such as silicon, and more preferably crystal silicon. The low index transition layer 115 therebetween preferably comprise a thin layer of dielectric such as oxide and more particularly silicon dioxide. In addition, the plurality of elongate members 103 forming the grating preferably comprise silicon and more preferably crystal silicon. Furthermore, the intermediate layer 116 between the plurality of elongate members and strip 114 preferably comprises a thin layer of oxide such as silicon dioxide. Alternatively, the strip 114 and/or elongate members 103 may comprise polysilicon as may the slab 109.

In such embodiments, the lower cladding 107 may comprise a layer of silicon dioxide and the substrate 108 may comprise a silicon substrate, which may include a layer of silicon dioxide formed thereon. Additional layers may also be formed on this silicon substrate beneath the waveguide structure 100 formed thereon. An upper cladding material comprising for example glass, silicon dioxide, or other material substantially optically transmissive to the wavelength of light propagating between the fiber 106 and the planar waveguide 100 may be included.

The design of the waveguide structure 100, however, is not to be limited to the particular materials or geometries recited herein. Still other variations in design are considered possible. For example, it is possible to simultaneously change the index of refraction beneath also the elongate scattering elements 103 of the grating by applying an electric field between the elongate members and the strip 114. See, for example, U.S. patent application Ser. No. 10/242,314 entitled "Tunable Resonant Cavity Based on the Field Effect in Semiconductors" filed Sep. 10, 2002, which is hereby incorporated by reference in its entirety.

Advantageously, the waveguide structures 100 shown in FIGS. 1–8 may be manufactured using conventional integrated circuit fabrication processes. Deposition and patterning techniques may include for example, sputtering, chemical vapor deposition, etching, and damascene processes, which are well known in the art of semiconductor device fabrication as well as fabrication methods yet to be developed.

For instance, the supporting structure may comprise a commercially available silicon wafer with silicon dioxide formed thereon. Conventional "Silicon-on Oxide" (SOI) processes can be employed to form the silicon slab on the silicon wafer or on a sapphire substrate. Fabrication techniques for forming a crystal silicon layer adjacent an insulator include, but are not limited to, bonding the crystal silicon on oxide, SIMOX (i.e., use of ion implantation to form oxide in a region of single crystal silicon), or growing silicon on sapphire. Oxide formation on the silicon slab can be achieved with conventional techniques used in field effect transistor (FET) technology for growing gate oxides on silicon active layers. Still other processes utilized in fabricating FETs can also be applied. In the same fashion that a polysilicon gate is formed on the gate oxide in field effect transistors, likewise, a polysilicon strip can be formed over the oxide transition region in the waveguide structure. This polysilicon strip can be patterned using well-known techniques such as photolithography and etching. Damascene processes are also considered possible. Accordingly, conventional processes such as those employed in the fabrication of Complementary Metal Oxide Semiconductor (CMOS) transistors can be used to create the planar waveguide structure 100. In other embodiments, crystalline silicon strips and elongate scattering elements (i.e., grates and rulings) can be formed on an oxide layer using conventional techniques such as SOI processing.

Another strategy for fabricating the waveguide structures 100 is to obtain a commercially available SOI wafer, which comprises a first silicon substrate having a first silicon dioxide layer thereon with a second layer of silicon on the first silicon dioxide layer. The aggregate structure therefore corresponds to Si/SiO$_2$/Si. The first silicon dioxide layer is also referred to as the buried oxide or BOX. A second silicon dioxide layer can be formed on the SOI wafer and polysilicon or silicon strips or grates can be formed on this structure to create the planar waveguide 100 with the second silicon layer corresponding to the slab 109. The thickness of this second silicon dioxide transition layer can be controlled as needed. The polysilicon or silicon strips or grates can be patterned for example using photolithography and etching. Damascene processes are also envisioned as possible.

In the case where the substrate does not comprise silicon with a layer of silicon dioxide on the surface, a slab comprising crystal silicon can still be fabricated. For example, crystalline silicon can be grown on sapphire. The sapphire may serve as the lower cladding for the slab. Silicon nitride formed for example on silicon can also be a cladding for a silicon slab. The formation of the optional transition layer and the strip on the silicon slab can be performed in a manner as described above.

Other conventional processes for forming layers and patterning may also be used and are not limited to those specifically recited herein. Employing conventional processes well known in the art is advantageous because the performance of these processes is well established. SOI and CMOS fabrication processes, for example, are well developed and well tested, and are capable of reliably producing high quality products. The high precision and small feature size possible with these processes should theoretically apply to fabrication of some of the planar waveguides 100 described above as the material systems are similar. Accordingly, extremely small sized waveguide structures 100 and components should be realizable, thereby enabling a large number of such waveguides and other components to be integrated on a single die. Although conventional processes can be employed to form the waveguides described herein, and moreover, one of the distinct advantages is that conventional semiconductor fabrication processes can readily be used, the fabrication processes should not be limited to only those currently known in art. Other processes yet to be discovered or developed are also considered as possibly being useful in the formation of these structures. Additionally, other materials may also be employed. Moreover, other semiconductor and dielectrics may also be employed. In addition, the waveguides may have different shapes and may be integrated together with different structures.

Figure 9:
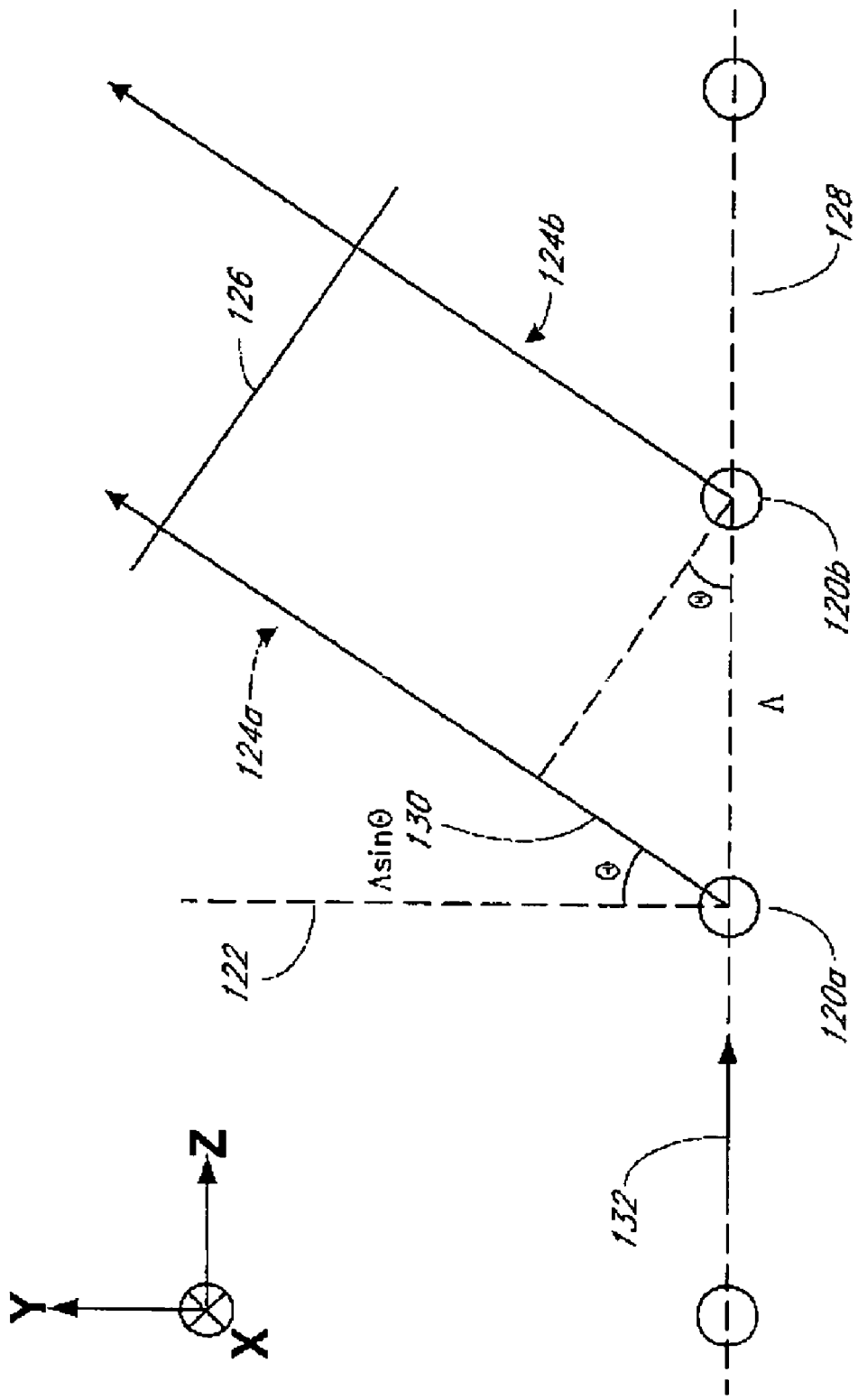
FIG. 9 schematically illustrates scattering of a light that encounters a plurality of longitudinally spaced perturbation features, resulting in a wave having a planar wavefront that propagates along a selected angle with respect to the plurality of perturbation features

A more detailed description of the aforementioned various aspects for improving coupling efficiency of the grating coupler 102 begins with the basic operating principles of the grating as illustrated in FIG. 9. Many of these operating principles are applicable to grating couplers, diffraction gratings in general, and other arrayed wave scatterers or sources. As shown, two exemplary scatterers 120a and 120b are positioned longitudinally along a line 128 (in the Z direction) along with other scatterers. These scatters may correspond, for example, to the scatter elements 103 of the grating described above. A direction 122 (Y) normal to the line 128 of scatterers 120a, b is indicated. As a wave 132 travels along the line 128, it successively encounters the scatterers 120a and 120b. At each scatterer, portions of the wave 132 scatter in a plurality of directions. Two such scattered waves are depicted as parallel rays 124a and 124b directed at an angle $\theta$ with respect to the normal direction 122. As is generally understood, a difference in path length 130 between the two rays 124a, b, from their respective scatterers 120a, b to a given perpendicular to the rays, i.e., line 126, can be expressed as $\Lambda \sin \theta$, where $\Lambda$ is the spacing between the scatterers 120a, b. If the scatterers 120a, b are sources that emit waves in phase, a coherent wavefront is produced such as represented by the perpendicular line 126. The dynamics of this wave are governed in part by the condition $\Lambda \sin \theta = m\lambda$ (where $\lambda$ is the wavelength, and m is an integer) as is well known.

In the case of the waveguide grating coupler, it is useful to consider the path length difference from a point before the scatterer 120a to the perpendicular line 126 of $n_{wg}\Lambda - n_{glass} \Lambda \sin \theta$ since the scattered waves originate from the same original wave 132. In this equation, $n_{wg}$ and $n_{glass}$ correspond to the refractive indices of the waveguide coupler and of glass covering the waveguide coupler, respectively. Thus, a condition $n_{wg}\Lambda - n_{glass}\Lambda \sin \theta = m \lambda$ is relevant to the coherent wavefront produced by the waveguide grating coupler. Accordingly, the spacing $\Lambda$ between two scatterers and the wavelength $\lambda$ determines the angle $\theta$ of propagation of the resulting coherent wavefront. The aforementioned condition for producing a coherent wavefront can also be expressed in terms of phases of the scattered waves as differing by multiples of $2 m\pi$ radians at the wavefront.

It will be appreciated that the foregoing scattering principle can be extended into two dimensions, for example, along a direction (X) into the plane in FIG. 9. Thus, the scatterers 120a, b depicted in FIG. 9 may represent a cross-sectional view of a grating or a segmented grating described herein wherein the plurality of elongate scattering elements are disposed longitudinally along the length of the waveguide 100. Furthermore, while the description above in reference to FIG. 9 relates to a scattering process from the line 128, coincident with the elongated guiding portion, the principle is also applicable to the reverse process where the scatterers receive the wave directed at an angle of $\theta$ and scatter the light along the line 128.

In FIG. 9, the scatterers are depicted as circular objects to facilitate illustration of the geometry associated with scattering. It will be appreciated that the scatterers can have many different shapes, including but not limited to the various scattering features described below. Furthermore, while the scatterers in FIG. 9 are depicted as being generally uniform in dimension and spacing, other configurations may be utilized to achieve the desired results. As described below in greater detail, the intensity, direction, and shape (i.e., phase characteristics) of the scattered wave depends on the shape, dimension, and the spacing of the scatterers. Furthermore, as also described below in further detail, the shape and dimension of the scatterers and the spacing therebetween may be "tuned" to achieve the desired phase characteristics and intensity profile of the scattered wave.

Figure 10:
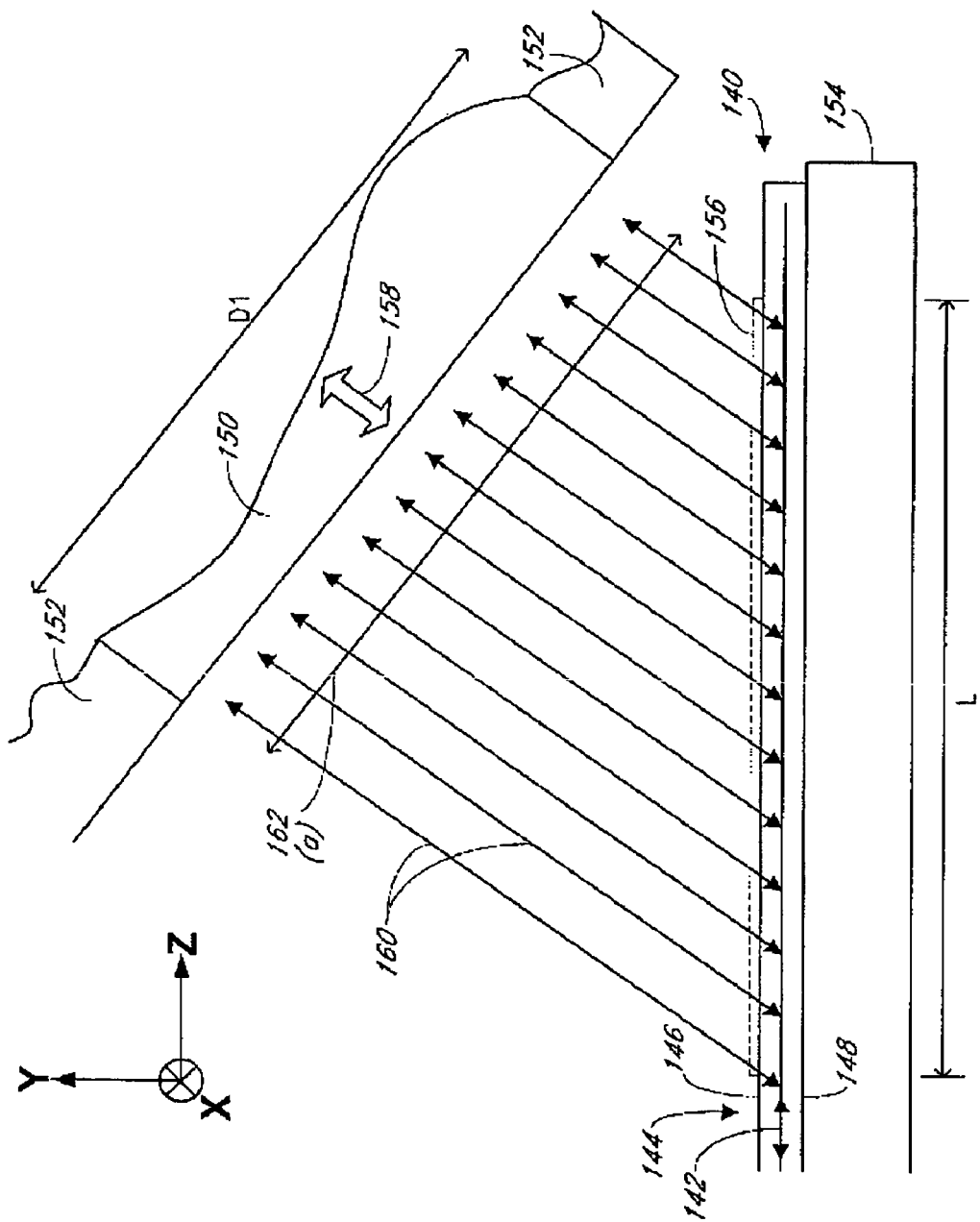
FIG. 10 depicts a side view of an optical fiber oriented with respect to a grating coupler schematically illustrating one possible method of controlling the beam size of the scattered light by selecting the longitudinal dimension of the grating coupler such that the scattered beam width is similar to the diameter (D1) of the core of the optical fiber.
Figure 11:
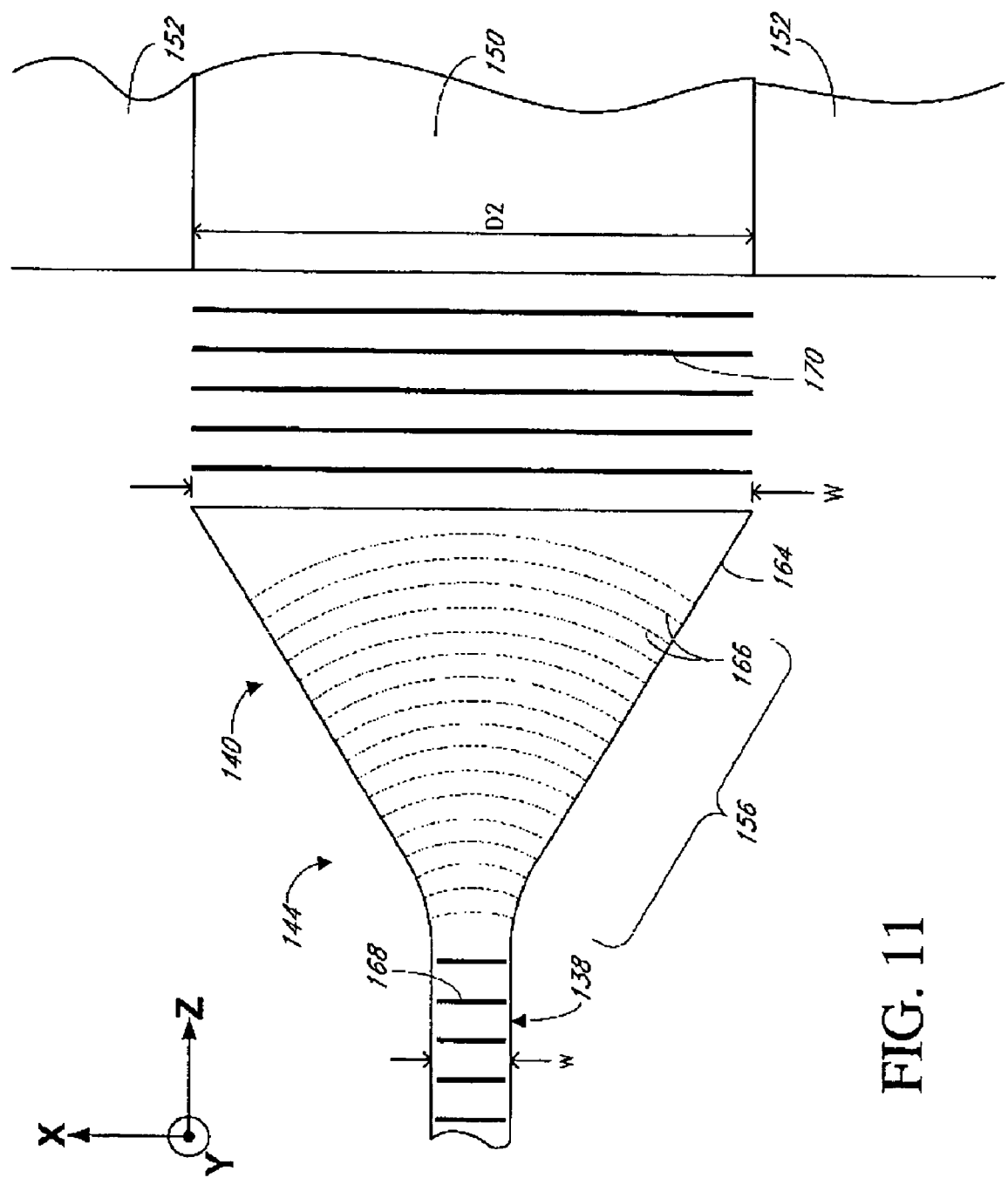
FIG. 11 is a top view of the grating coupler of FIG. 10, schematically showing one possible method of controlling the width of the scattered beam with respect to the fiber's diameter (D2) by providing a flared portion at the end of the waveguide.

As previously described, one aspect of the grating coupler relates to transforming the lateral dimension of the plane waves that propagate in the waveguide guiding portion 104 and the fiber 106. FIGS. 10 and 11 illustrate side and top views of one possible embodiment of a grating coupler 140 that performs such a function. In the side view of the grating coupler 140, one end of a fiber core 150 is shown to be oriented at an angle with respect to a waveguide 144 that forms part of the grating coupler 140. The fiber core 150 is also shown surrounded by a cladding 152. The fiber core 150 has orthogonal diameters D1 and D2 in FIGS. 10 and 11, respectively. It will be understood that the relative dimensions of the fiber core 150 and the cladding 152 illustrated herein may not necessarily reflect the actual fiber core/cladding in use. In subsequent descriptions of the fiber, the cladding may simply be omitted in illustrations, and the fiber core may be simply referred to as a "fiber".

As illustrated in FIG. 10, the grating coupler 140 comprises a portion of the waveguide 144 having a first surface 146 (upper surface in FIG. 10) and a second surface 148 (lower surface). Adjacent to or incorporated in the first surface 144 is a grating assembly 156 having a length L along the direction of the waveguide 144. This grating assembly 156 preferably coincides with the input/output region of the grating coupler as light is coupled into or out of the waveguide structure via the plurality of elongate scattering elements in the grating assembly. The second lower surface 148 of the waveguide 144 forms a boundary between the waveguide 144 and a planar layer 154 which may preferably comprises the lower cladding as described above.

The grating assembly 156 interacts with a wave 142 that travels within the waveguide 144 longitudinally along its length, i.e., in the Z direction. In particular, the grating 156 scatters the wave 142 into a plurality of scattered waves 160 in a manner described above with reference to FIG. 9. Since the grating assembly 156 scatters the wave 142 from one end to the other, the length L of the grating assembly 156 in part determines the width, $\alpha$, (indicated by a double-ended arrow 162) of the collective scattered waves 160 of interest. Accordingly, as schematically shown by the side view of the grating coupler 140 in FIG. 10, by selecting the length L of the grating assembly 156, one can generally control the lateral spatial extent 162 of the scattered waves 160 to match the dimension D1 of the fiber 150. In this configuration, $L=D1/\cos\theta$ In certain embodiments, L and D1 may be about 10 μm, although the dimensions should not be limited to these values.

Moreover, in the case where the scattered waves 160 together form a plane wave which has virtually no divergence, this width, a, 162 corresponds to the beam width of the scattered beam that is emitted by the grating coupler 140 and incident on the fiber 150. If the separation between the waveguide scatter assembly 156 and the fiber 150 is substantially short such that the fiber is in the near field of the grating assembly and vice versa, the amount of diffraction will be reduced and divergence and beam expansion will be substantially limited. Preferably, for example, the grating coupler 140 is a distance of approximately one Rayleigh range from the optical fiber 150. The distance separating the grating from the fiber 150 may range, for example, from up to about 500 μm, but is more preferably between about 1 and 10 μm. Additional details regarding possible structures of the grating assembly 156 are more fully described below.

In one embodiment, as illustrated in FIG. 11, the grating coupler 140 comprises a flared end 164 whose lateral dimension in the X direction (denoted as W) is substantially larger than that of the guiding portion 138 (denoted as w). In various embodiments, for example, the width, W, of the flared end 164 may range up to approximately 500 μm and more preferably may be about 10 μm. In contrast, for these embodiments, the width, w, of the guiding portion 138, preferably ranges up to approximately 20 μm and more preferably is about 0.5 μm. Widths, W, w, outside these ranges, however, are considered possible. This transformation from the smaller width, w, to the larger width, W, may occur over a distance of up to approximately 1 millimeter (mm) and preferably is between about 20 and 100 μm.

The dimension W is selected to yield wavefronts 170 between the grating coupler 140 and the fiber 150 that have a lateral intensity profile compatible with the dimension D2 of the fiber 150 shown in FIG. 11. Specifically, the flared end 164 transforms laterally smaller guided wavefronts 168 in the guiding portion 138 to the laterally larger wavefronts 170 that enter the fiber 150. Thus, the grating coupler 140 efficiently couples the plane wavefronts 168 with the plane wavefronts (not shown) in the fiber 150. The spatial extent of these wavefronts may be defined, for example, by the location where they experience evanescent decay. Accordingly, the width of the wavefronts in a planar waveguide or an optical fiber is determined in large part by the dimensions of the respective guiding structure.

The transformation of the wavefronts from planes of small dimension to plane waves of larger dimension or vice versa is at least in part achieved by the grating assembly 156 which comprises a plurality of elongate scattering elements, i.e., the rulings or grates 166. These scattering elements 166 are preferably elliptically shaped to assist in accomplishing this transformation as more fully described below.

Note that the longitudinal expanse, L, (i.e., in the Z direction) of the grating assembly 156 was preferably selected to correspond to the diameter D1 of the optical fiber 140 while the dimension W of the flared end of the grating coupler 140 was selected based on the diameter D2 of the fiber. The dimensions D1 and D2 are orthogonal but in the case where the optical fiber has a circular core, D1 and D2 will be substantially identical. In contrast, D1 will be unequal to D2, for certain specialized optical fibers such as elliptical fiber.

The wavefronts 170 preferably propagate in free space between the grating coupler 140 and the fiber 150 although this region may be filled with material. The light is preferably not guided within this region and may experience diffraction effects. As described, above, however, the wavefronts 170 preferably travel between the grating coupler 140 and the fiber 150 through a distance that is substantially smaller than the characteristic Rayleigh length of the fiber 150. The fiber is in the near field of the grating coupler and vice versa. Thus, the behavior of these wavefronts 170 can in certain embodiments be described as a near field propagation. In the case where the fiber 150 is not in close proximity of the grating coupler 140, the light beam diverges in the space between the fiber and the coupler. The wavefronts 170 are therefore not planar beyond the near field. The grating coupler 140, however, can be designed to provide efficient coupling of this diverging beam. In various embodiments, the grating spacing between the elongate scattering elements 166 is adjusted and in some cases is preferably chirped. The shape of the rulings or grates 166 may be changed from elliptical to other shapes such as quartics to accommodate the divergence. As is well known, quartics are geometric shapes described by fourth order polynomials.

Figure 13:
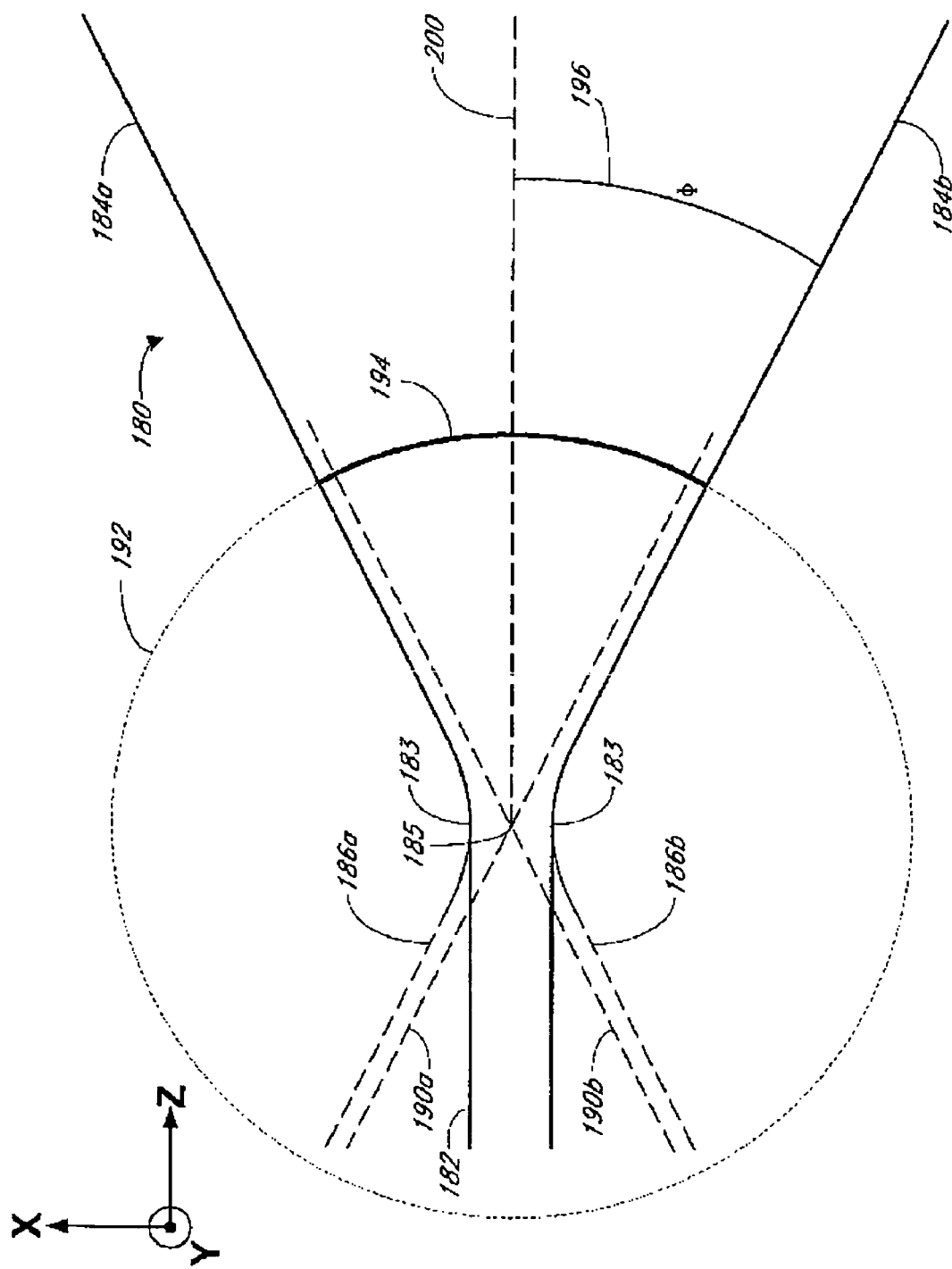
FIG. 13 schematically illustrates one possible embodiment of the flared end having hyperbolic shaped edges that cause formation of right circular cylindrical wavefronts having circular curvature as seen in the XZ plane of the grating coupler and planar waveguide portion which is shown in the drawing.

In principle, the flared end of the grating coupler 140 can take on any shape and size. Preferably, however, the coupler 140 is configured to effectively expand the lateral size of the relatively small plane waves to a size similar to the diameter of the fiber. Conversely, the coupler 140 preferably has a shape and size to reduce the spatial extent of the larger wavefronts emanating from the optical fiber 150 into a size for efficient coupling into the guiding portion of the grating coupler 140. This tapering preferably reduces reflection losses. One particular embodiment of the grating coupler having a specific shaped flared end and elongate scattering elements thereon is described below in reference to FIGS. 13 and 14. In this design, the coupler is flared such that it curves hyperbolically.

Figure 12:
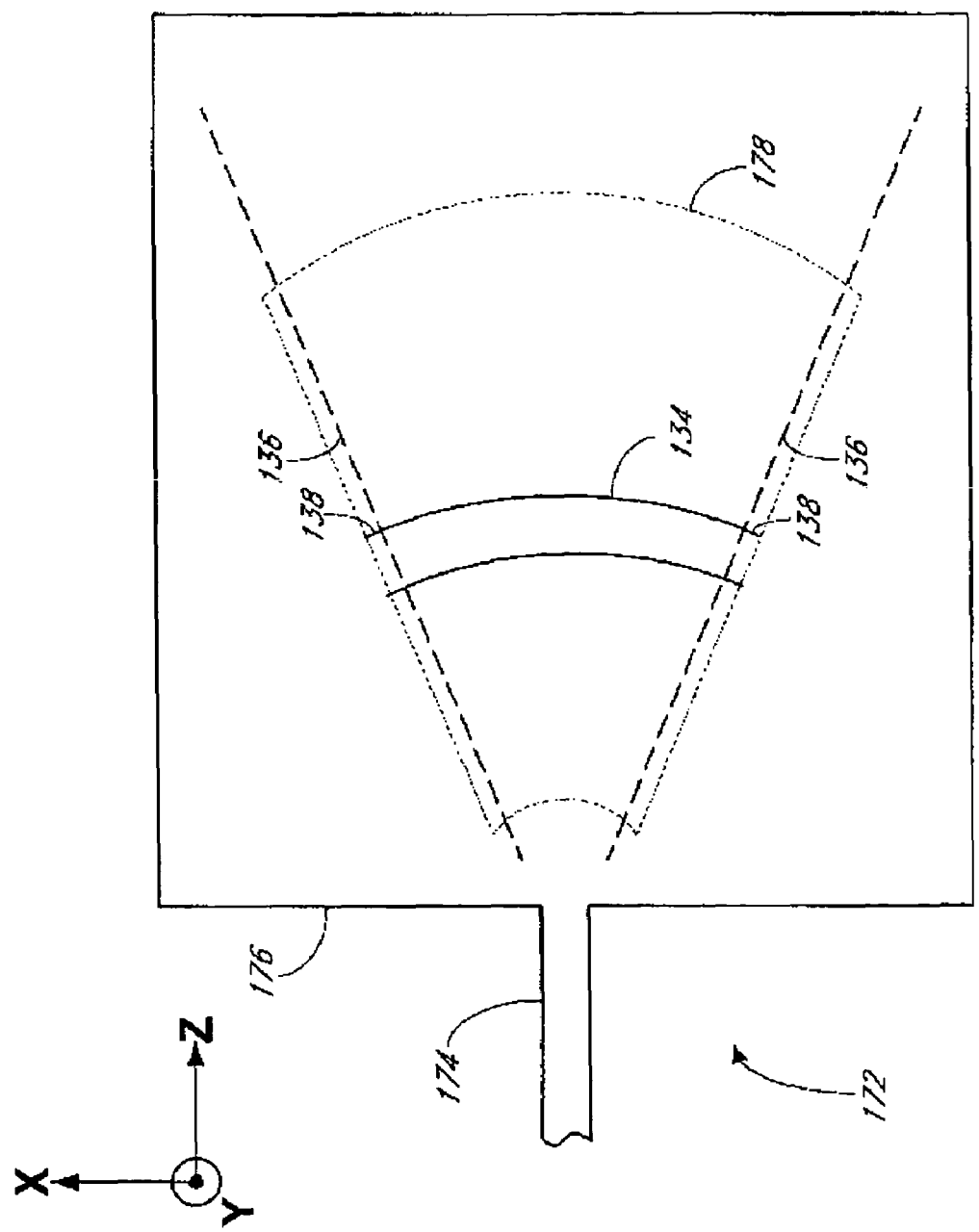
FIG. 12 depicts a top view of another embodiment of the grating coupler having an end that is not flared.

In contrast, however, FIG. 12 illustrates a grating coupler 172 that does not have a flared end. Instead, the grating coupler comprises a guiding portion 174 optically coupled to a rectangular slab 176. The slab 176 may have any number of shapes, provided that its dimension is large enough to support the diverging beam of light that exits from the guiding portion 174. The opening angle of the diverging light beam emanating from the guiding portion 174 is generally determined by the numerical aperture of the guiding portion 174. Wavefronts 134 propagating from the guiding portion 174 through the slab are approximately right circularly cylindrical in shape for a planar slab. In the X-Z plane, i.e., the plane of the slab, the wavefronts have circular curvature. The boundaries of the diverging beam that define the divergence angle are depicted as dashed lines 136. These boundaries 136 are defined by the wavefronts 134 that include evanescent fields 138, where the intensity of the evanescent fields decay rapidly. The boundaries 136 are located at the region corresponding to evanescent decay of the light intensity. To scatter and transform such physically unbound wavefronts 134, a grating assembly 178 may be formed which generally cover at least the region of the slab wherein the diverging beam is propagating, i.e., the region between the aforementioned boundaries 136.

The grating coupler 172 formed from the slab 176 is advantageously simpler to fabricate than other couplers with specifically shaped flared ends 164. The flared ends 164, which have reflecting physical boundaries, however, may improve coupling efficiency by redirecting the optical power within the evanescent fields back into the grating coupler. The flared ends 164 may also provide a generally better efficiency in capturing light output from a larger dimensioned optical fiber 150 and directing it into the a smaller guiding portion 138 while reducing back reflections.

As discussed above, FIG. 13 illustrates one embodiment of a waveguide coupler having a hyperbolic flared end 180 with side walls 184*a, b* that generally conform to portions of hyperbolic curves 186*a, b*. A waveguide guiding portion 182 may have a lateral dimension in the X direction substantially similar to the distance between the vertices 183 of the hyperbolic curves 186*a, b*. Thus, the straight walls of the guiding portion 182 transition into the sloping side walls 184*a, b* of the flared end 180 at a region referred to herein as the "throat." As is generally understood, a symmetric set of hyperbolic curves are bounded by two asymptotes 190*a, b* that cross at the center 185 of the pair of curves. The hyperbolic curves 186*a, b* approach the asymptotes 190*a, b* as one moves away from the center 185. Thus, the side walls 184*a, b*, being portions of the symmetric set of hyperbolic curves 186*a, b*, can be approximated as two linear lines similar to the asymptotes 190*a, b* at points beyond a certain distance away from the center 185. The flaring of the coupler preferably approximates a hyperbolic curvature, however, deviations in the contour of the sidewall may exist from the perfect hyperbolic shape.

As is understood, a wavefront that propagates through a waveguide is generally perpendicular to the sidewalls of the waveguide in the region near the sidewalls. For example, plane waves propagate longitudinally down a waveguide having parallel upper and lower walls and parallel sidewalls. Propagation of the light is achieved by total internal reflection. A ray of light propagating in the waveguide reflects between the two opposite walls at an angle with respect to the normal of the wall that is greater than the critical angle. Thus, such a ray generally propagates along the waveguide, not without touching the walls, but by reflecting between the walls. A light beam may be characterized as an ensemble of such rays, as a wavefront corresponds to an ensemble of wavelets. The lateral components of this ensemble of rays effectively cancel out, and a net "ray" can be represented as propagating longitudinally, i.e., in the Z direction, along the length of the waveguide. The wavefront representation of such a set of rays is thus a plane wave traveling perpendicular to the walls of the waveguide comprising parallel planar walls.

This qualitative description applies equally to light waveguides having curved sidewalls. Because an ensemble of rays impinging on a given spot of a curved wall reflect specularly about the normal, the normal components of the rays essentially cancel, thereby yielding a representative "net" ray that is generally perpendicular to the curved wall at the given spot. Thus, the corresponding representative net wavefront is generally perpendicular to the wall in the proximity of the wall.

For the foregoing reasons, a wavefront 194 that propagates through the flared end 180 is also perpendicular to the sidewalls 184*a, b* at the boundaries of the flared waveguide. As a result, the flared end produces a wavefront having a right circularly cylindrical shape.

As discussed above, the sidewalls 184*a, b* of this flared waveguide approximately extend along two straight lines that intersect at a center 185. These sidewalls which are angled with respect to each other, define a roughly wedge-shaped cavity in the X-Z plane of FIG. 13. As discussed above, light propagating from the narrower end of the wedge shaped cavity diverges as it travels to the wider end of the flared cavity. As the wavefront is perpendicular to the sidewalls 184*a, b* at the boundaries of the guide, the wavefront 194 propagating therein has smooth circular curvature in two dimensions, i.e., in the X-Z plane shown in FIG. 13. This circularly shaped wavefront has a center of curvature substantially at the center 185 approximately where the two lines 186*a, b* intersect. This wavefront 194 forms an arc, a portion of the larger circle 192 with a center 185 at this intersection of the two lines 186*a, b*. Likewise, if the sidewalls 184*a, b* have finite height in the Y direction, the wavefront will be right circularly cylindrical. For this geometry, the guiding portion 182 has a rectangular cross-sectional shape. This rectangular cross-sectional shape is maintained in the flared end 180, although the size of the rectangle increases away from the center 185. Because the width of the waveguide structure increases as a result of the flaring, the wavefront 194 in the flared end 180 generally corresponds to a right circularly cylindrical shaped wavefront.

Although the waveguide coupler can flare out at an arbitrary angle, a flare angle 196 (Φ) is preferably selected to accommodate the in-plane "numerical aperture" of the guiding portion 182. If this condition is substantially satisfied, the light in the evanescent field of the diverging beam can be substantially coupled into the optical fiber or the guiding portion 182 depending on the direction of propagation. The flare angle 196 (Φ) may range from approximately 0 to 60° although the angle should not be limited to this range of values. In one preferred embodiment, the flare angle 196 (Φ) is selected to be approximately 30 degrees to accommodate the numerical aperture of one type of guiding portion 182.

Figure 14:
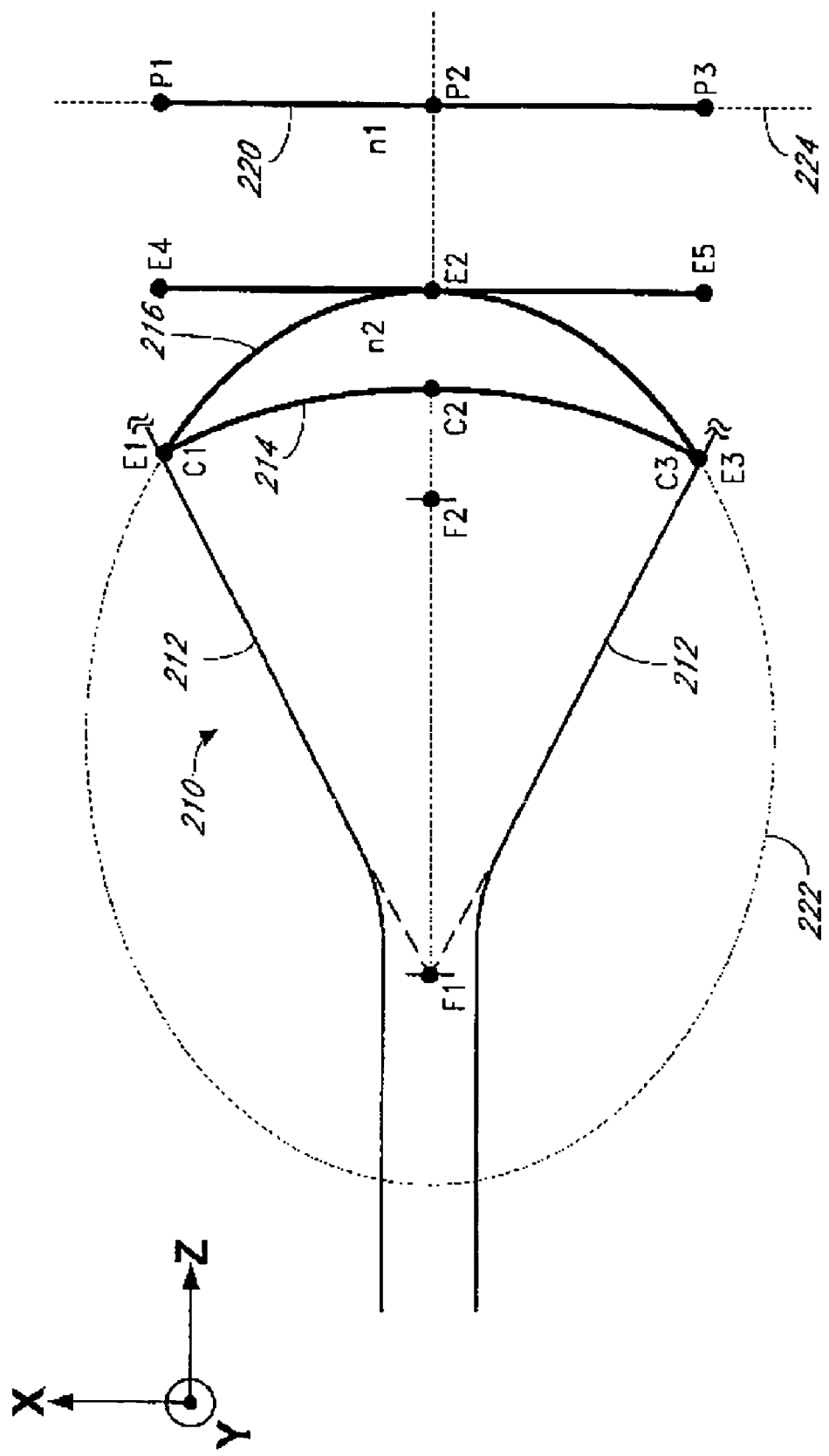
FIG. 14 schematically illustrates how the right circular cylindrical wavefront encountering an elliptically shaped feature is transformed into a plane wavefront, and vice versa.

The grating coupler preferably comprises a plurality of elongate scattering elements that transform the curved wavefronts in the flared end into a plane wavefront. As describe above, these curved wavefronts can have any number of shapes, depending on the shape of the flared end. In the embodiment described above in reference to FIG. 13, the hyperbolic shape of the flared end is shown to produce substantially circularly cylindrical wavefronts. FIG. 14 illustrates a particular shape of the grating that transforms the right circularly cylindrical wavefronts into the plane waves. It will be appreciated, however, that the concept of forming the grating to accommodate a specific wavefront shape can be applied to any number of flared end shapes.

As illustrated in FIG. 14, a flared end 210 comprising hyperbolic flared sidewalls 212 supports a right circularly cylindrical wavefront 214 in a manner described above. It is desired that a plane wavefront 220 emerges from a grating comprising an elongate scattering element 216, or in reverse, the plane wavefront 220 impinging on the grating comprising the elongate scattering element 216 becomes the circularly cylindrical wave 214.

It can be intuitively shown that the elongate scattering element 216 preferably has a curvature that is greater than the curvature of the circular wavefront 214. As the circular wavefront 214 propagates outward (to the right in FIG. 14), two edge points labeled as C1 and C3 first encounter respective edge points E1 and E3 on the scattering element 216. The scattered portions of the points C1 and C3 exit the flared end 210 having an effective refractive index $n_2$ into a medium with a lower refractive index of $n_1$. As the circular wavefront 214 progresses further, it encounters the scattering element 216 along locations progressively inward from the edge points E1 and E3. As point C2 of the circular wavefront 214 encounters point E2 of the scattering element 216, the equi-phase portion of the scattered waves from the points E1 and E3 have traveled farther than the distance C2E2 due to the lower refractive index $n_1$. Thus, by selecting the configuration of the scattering element 216 such that the optical path corresponding to the product C2E2×(refractive index $n_2$) is equivalent to the optical path E1E4 or E3E5×(refractive index $n_1$), the resulting wavefront emerging from the grating comprising the scattering element 216 may be made to be a plane wavefront.

A more formal exemplary treatment of how the grating comprising the elliptical scattering element 216 transforms the cylindrical wavefront 214 into the plane wave 220 can also be described with reference to FIG. 14. This treatment, however, like the less formal treatment above, is for explanatory purposes and may or may not specifically characterize the operation of various embodiments. As shown, the scattering feature 216 conforms to a portion of an ellipse 222. The points E1 and E3 of the scattering feature 216 and edge points C1 and C3 of the circularly curved wavefront 214 are depicted as respective common points along the flared wall 212. The circular wavefront 214 may be thought of as originating from a first focus point F1 corresponding to the center of curvature associated with the cylindrical wavefront 214. As previously described, the grating 216 transforms the circularly curved wavefront 214 to the plane wave 220, on which are indicated three exemplary points: P1, P2, and P3. P1 is a longitudinal extension from point C1, P2 is a longitudinal extension from C2 along the center axis, and P3 is a longitudinal extension from point C3.

As the wavefront 220 has equal phase across its spatial extent, the optical path length from F1 to P1 via E1 can be expressed as $$n_2(F1E1)+n_1 \sin(\theta)(E1P1)=\text{constant} \quad (2)$$

where θ corresponds to the angle of incident or diffracted light. This equation can be rewritten as, $$(F1E1)+(n_1 \sin(\theta)/n_2)(E1P1)=\text{constant} \quad (3)$$

as well. If the planar wavefront 220 selected is coincident with the directrix of the ellipse 222 having F1 and F2 as its focal points then, $$(F2E1)=e(E1P1). \quad (4)$$

Thus, Equations 3 and 4 can be combined to yield $$(F1E1)+(F2E1)=\text{constant}, \quad (5)$$

where $e=(n_1 \sin(\theta)/n_2)$. Equation 4 describes an ellipse, which has an eccentricity e. Thus for the foregoing reasons, a grating feature 216 that transforms a circularly cylindrical wavefront into a plane wave preferably has an elliptical curve associated with it. Depending on the angle θ of the incident or diffracted beam, e change may sign. The angle θ may range for example through 180° (i.e., ±90° as measure from a normal to the waveguide grating coupler). Curved scattering features 216 having various elliptical shapes may be characterized by the foci F1 and F2. In FIG. 14, the focus F1 is depicted as positioned in the "throat" of the waveguide coupler. As shown, the focus F1 may be defined by sidewalls 212 of the flared portion 210. This focus F1 may remain fixed for varying locations of focus F2 that are selected for different angles θ of incidence or diffraction. For example, the focus F2 located on the Z axis may be on either the right hand side or the left hand side of F1, depending on angles θ, e.g., for θ between ±90°. For θ=0°, for example, the eccentricity as defined above e is zero and F1 and F2 overlap, corresponding to a circular curvature in such preferred embodiments. Of course, a wide range of variations in curvature is possible and should not be limited to elliptical. As described above, for example, curvatures defined by quartics may be employed in cases such as when the optical fiber is in the far field and the beam diverges or converges. Other shapes and curvatures are also possible. Accordingly, the mathematical description provided herein should not be considered limiting as other embodiments of the waveguide grating coupler are possible.

In addition it will be appreciated that the flared end may be shaped differently to increase the lateral size of the scattered beam. As previously described, the shape of the flared end determines the shape of the wavefronts therein. Accordingly, the shape of the elongate scattering elements can be adapted to transform the flared-end-specific wavefront to the desired wavefront such as a plane wave.

The description, however, of the transformation of a cylindrical wavefront 214 by the grating is presented herein for explanatory purposes only and should not be considered limiting the possible grating shape. For example, although elliptical scattering elements are preferred, the elliptical shape need not be limited to that which converts right circularly cylindrical wavefront in the flared end into plane wave or vice versa. Other elliptical as well as non-elliptical shapes can be employed. The elongate scattering elements may be approximately elliptical or deviates from elliptical curvature. Other curvatures may also be employed such as for example quartics as well as ones not readily characterized by a simple analytical function. These elongate scatter elements, i.e., grates or rulings, may be curved or straight. If curved, the concave side of the curved grating feature may face the elongate guiding portion or may be oriented otherwise. The elongate scattering elements may have substantially the same or similar curvatures such as a family of curves having different dimensions. In other alternative embodiments, the curvatures may be substantially different for different rulings or grates.

Figure 15A:
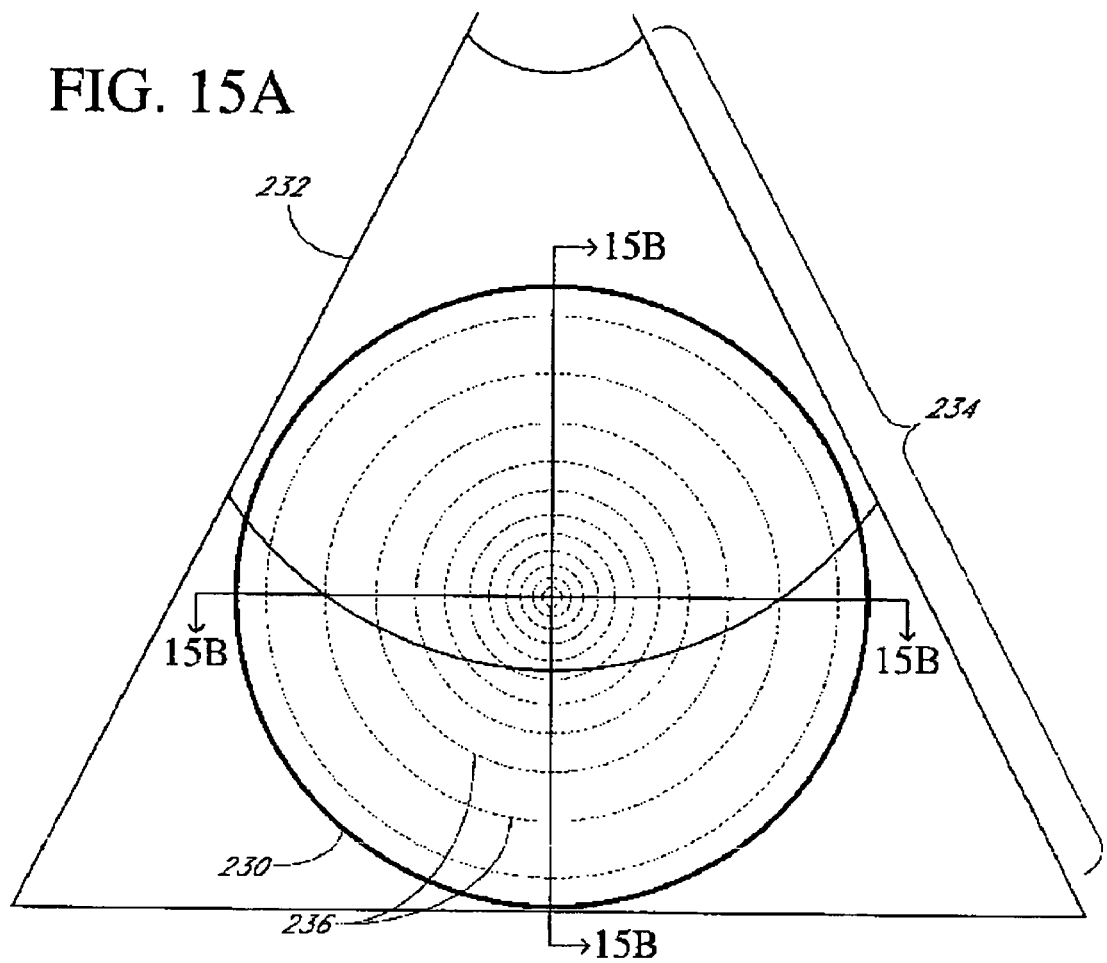
FIGS. 15A and 15B schematically show a desired two-dimensional Gaussian intensity profile of the scattered beam that approximates the Gaussian mode profile in the fiber.
Figure 15B:
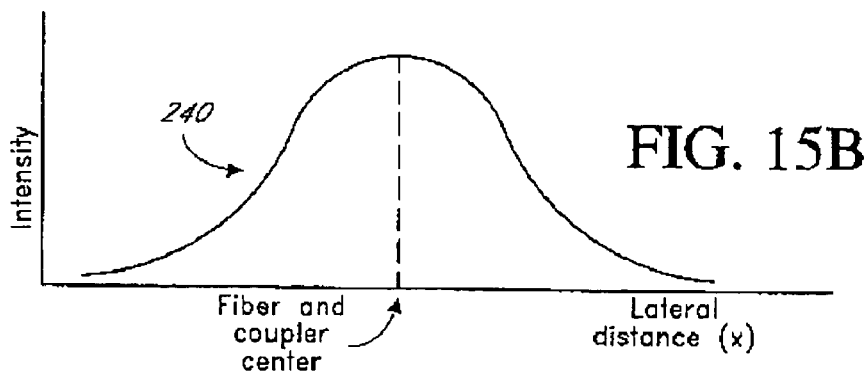

Preferably, the grating coupler is adapted to allow a scattered beam to have an intensity profile similar to that of the fiber. FIGS. 15A and 15B schematically illustrate a preferred Gaussian intensity profile of the beam that enters or exits a fiber 230. FIG. 15A depicts a superimposed sectional view of the fiber 230 over a flared end 232 having an input/output region 234 comprising a grating assembly. The grating assembly 234 comprises a plurality of elongate scattering elements arranged in a manner described below to yield the scattered beam whose intensity is schematically depicted as a plurality of contour (equi-intensity) lines 236. Preferably, a cross-section through the center of the intensity contour, as shown schematically in FIG. 15B, comprises a generally Gaussian shaped profile 240. Preferably, the center of the Gaussian intensity profile of the scattered beam is proximate the center of the fiber in order to increase the coupling efficiency.

Figure 16:
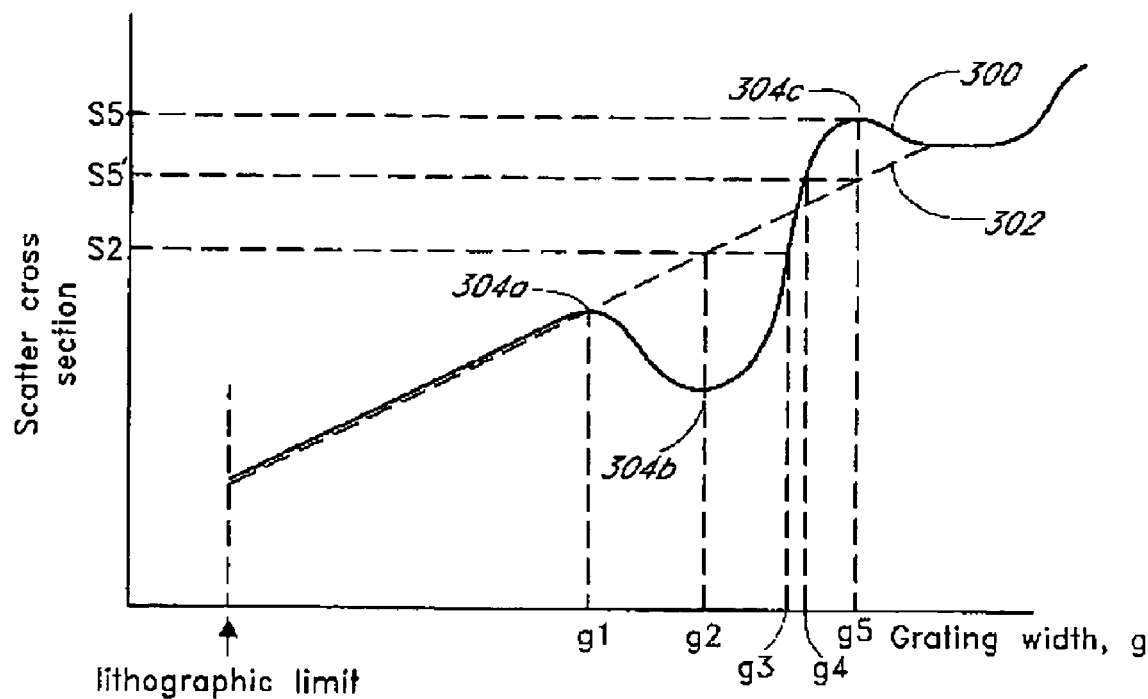
FIG. 16 is an exemplary plot of scatter cross-section versus grating width, g, wherein the scatter cross-section fluctuates with increasing grating width as a result of the geometry of the grating coupler.
Figure 17:
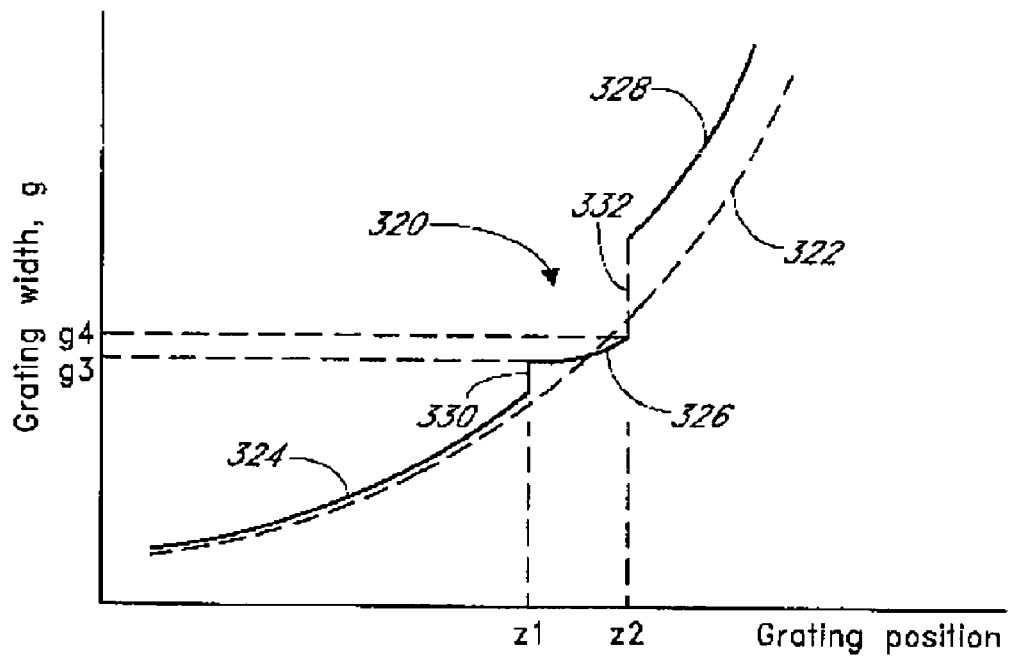
FIG. 17 depicts an exemplary grating width profile mapping the grating width, g, versus longitudinal position across the grating coupler for the case where the scatter cross-section varies as a function of width as defined by a non-monotonically function such as shown in FIG. 16.
Figure 20:
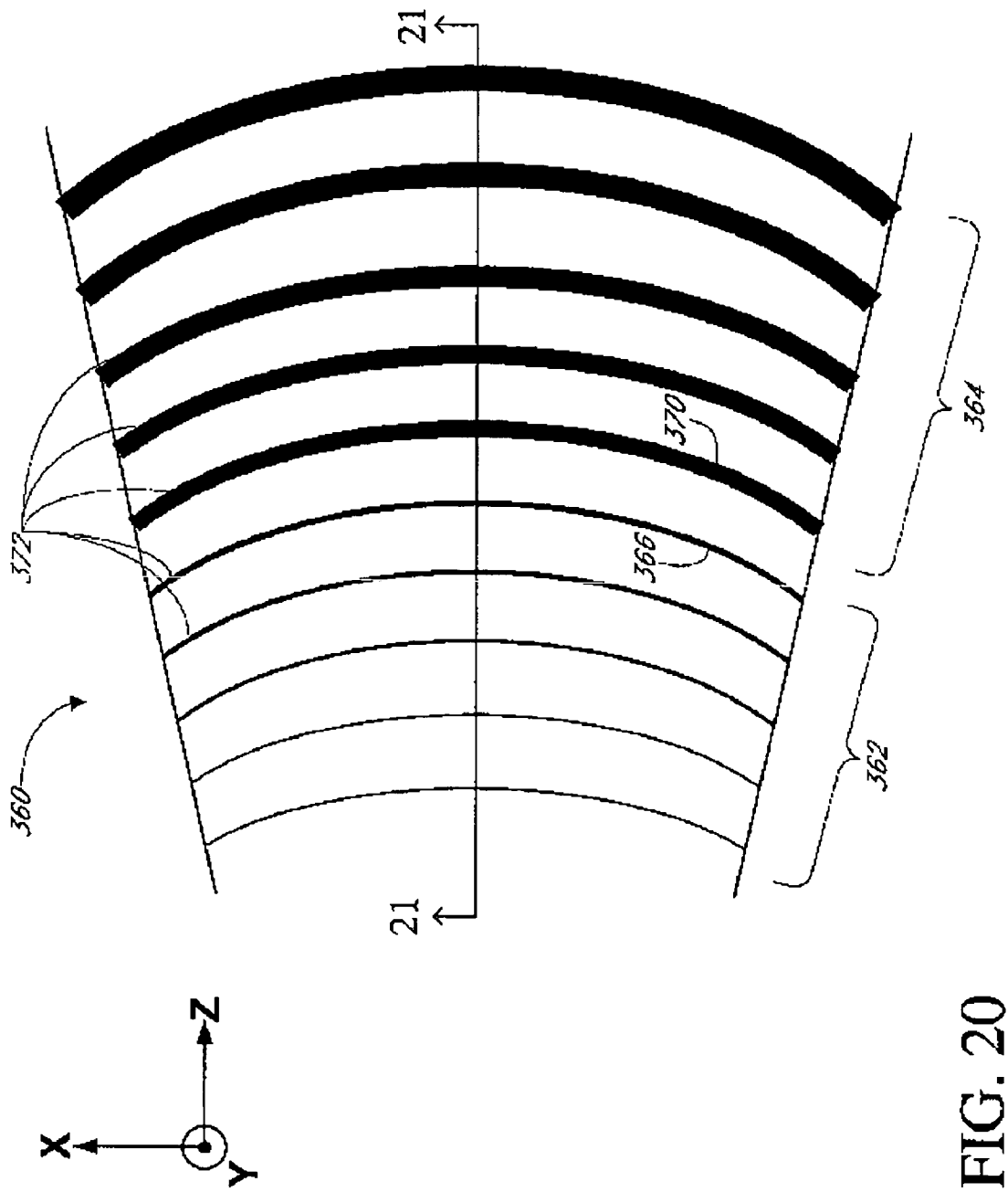
FIGS. 20 and 21 are top and side views of a grating assembly for the case where the scatter cross-section varies in width in accordance to a non-monotonically function such as shown in FIGS. 16 and 18.
Figure 21:
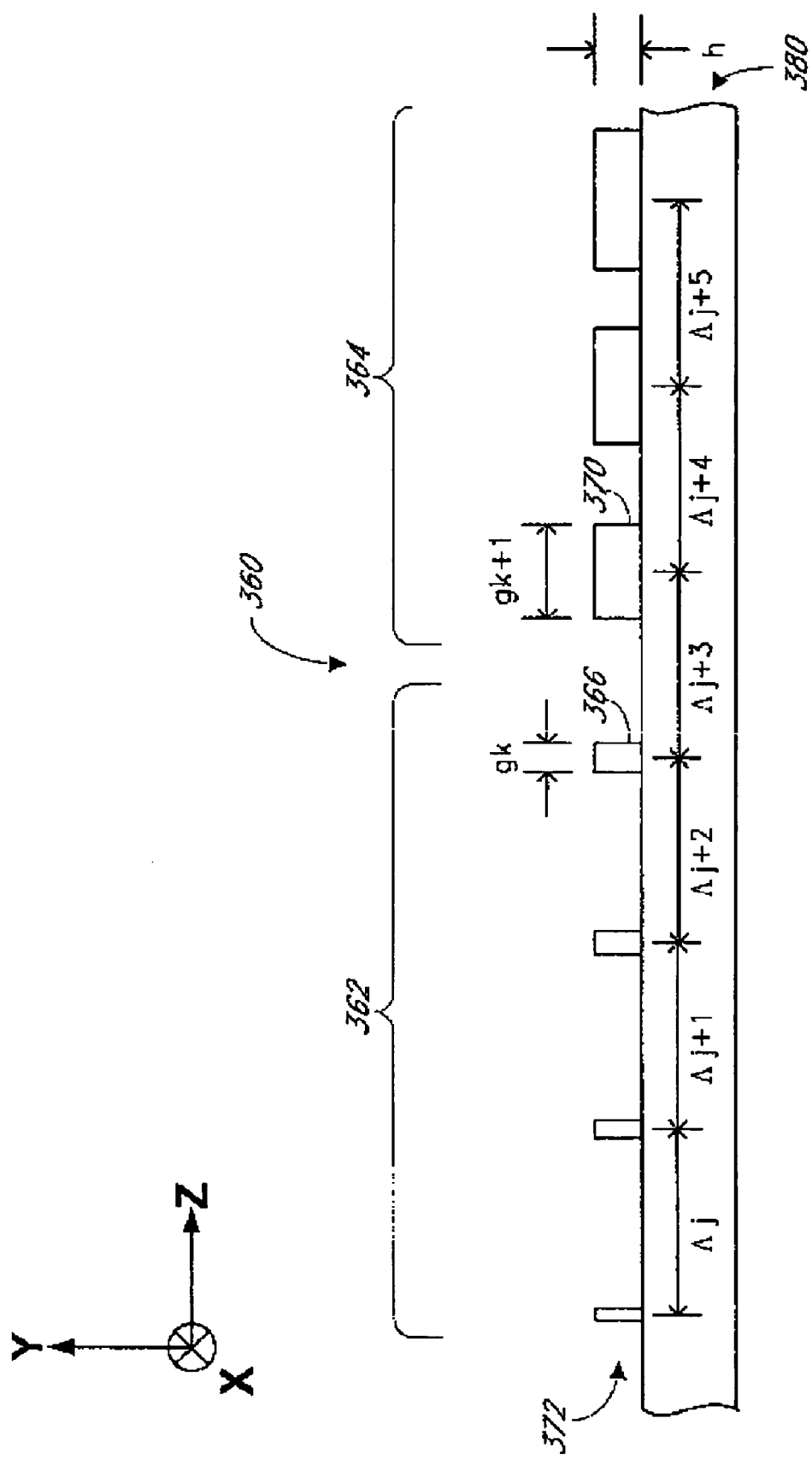

One possible embodiment of the grating assembly that provides the desired Gaussian intensity profile is now described. FIGS. 16 and 17 illustrate the basis for the design criteria to be applied to the shapes and sizes of the elongate scattering elements, and FIGS. 20–21 illustrate one possible implementation of such a design.

As is consistent with conventional usage, a scatter cross-section for a scattering element of a grating is a quantity that determines how much of the incident light is scattered into a specified angle. Generally, the scatter cross-section increases as the grating feature size increases. Thus, for constant height gratings, the scatter cross-section overall increases as the width of the scattering element increases. In grating couplers where the elongate scattering elements only induce relatively weak scattering of light, the increase in the scatter cross-section is generally monotonic. Simulations and measurements show, however, that when the grating coupler induces stronger scatterings, the scatter cross-section often times oscillates as a function of grating width, g. Instead of monotonically increasing with grating width, the scatter cross-section may decrease with further increase in width. This trend may be reversed such that additional increase in width again leads to increasing scatter cross-section. This "oscillation" in the dependency of the scatter cross-section on grating width may be repeated in a similar manner for even larger grating widths.

One possible reason for such oscillation is due to the interference of reflected light from the various interfaces associated with the grating coupler portion of the waveguide. For example, for certain embodiments characterized by the perspective and side sectional view of the grating coupler 100 in FIGS. 7 and 8, light may propagate partially in the waveguide strip 114 and partially in the slab 109. The light traveling within the waveguide 100 can reflect from a variety of boundaries therein. For example, reflections might originate from the boundary between the strip 114 and the low index transition region 115, the boundary between the low index transition region 115 and the slab 109, and the top boundary between the slab 109 and the lower cladding layer 107. The net effect of the multiple layer reflections and their subsequent scatterings by the grating coupler can result in oscillatory behavior of the scatter cross-section when the grating width is varied. Such oscillation depends on the geometry of the device (e.g., the arrangement and thicknesses of the waveguide layers and materials comprising them), and may be determined more readily by numerical analysis (i.e., simulation) than by analytical methods.

FIG. 16 schematically illustrates an exemplary curve 300 depicting the oscillation of the scatter cross-section as the grating width (g) increases. The exemplary scatter cross-section curve 300 is shown from the lower width limit that in many cases is dictated by the lithographic resolution. Overall, the curve 300 is shown to increase as indicated by a dashed line 302. On the more local level (over a short range of grating widths, for example), the curve reaches a local maximum 304a at grating width $g_1$, dips down to a local minimum 304b at width $g_2$, and increases substantially to another local maximum 304c at width $g_5$. Accordingly, the relationship between the scatter cross-section and width is non-monotonic, both increasing and decreasing with increasing grating width. Similarly, this relationship exhibits both negative and positive slopes as well as points where the slope of the curve is zero. In addition, there are multiple width that will produce substantially the same scatter cross-section.

It should be understood, however, that the exemplary curve 300 is just an example to illustrate the design consequences of the scattering elements described below. Embodiments of the waveguide grating coupler may or may not have corresponding curves similar to the curve 300 depicted in FIG. 16. Moreover, the actual scatter cross-section plot depends on the actual configuration of the waveguide grating coupler, and possibly other components and will likewise vary for different geometries and specific implementations. Variations of the characteristics of this exemplary curve may or may not be observable for other designs. Moreover, the novel concept of designing the grating based on such a phenomenon is a general concept that can be applied to a variety of situations; thus, it will be appreciated that the concept described through the exemplary configuration can be applied to other configurations.

Additionally, although the scatter cross-section in FIG. 16 is described in the context of a constant grating height, it will be appreciated that similar treatment can also be applied to, by way of example, same width-varying height gratings, combination of varying width and height, or other possible feature variations and combinations thereof. Furthermore, although the grating is referred to as having a height, it will be appreciated that such usage of terms is not intended to limit the application of this concept to features built on top of the waveguide. Other forms of features, such as for example grooved gratings, along with corresponding terms such as "depth" instead of "height", may be used as well.

FIG. 17 schematically illustrates one possible profile characterizing the grating width, g, as a function of grating position along the coupler. In particular, a width profile 320 comprises discontinuous portions 324, 326, and 328 of a curve, with a discontinuity 330 between the first and second portions 324 and 326 of the curves, and a discontinuity 332 between the second and third portions 326 and 328 of the curve.

Also shown schematically in FIG. 17 is a monotonically increasing reference width profile 322 that corresponds to the monotonically increasing reference scatter cross-section 302 of FIG. 16. This monotonically increasing reference width profile 322 may correspond, for example, to a waveguide grating coupler exhibiting weak scattering behaviors. The width profile 322 is preferably selected to account for the reduction or decay in the amount or intensity of light within the waveguide grating coupler along the length of the coupler as light is scattered out by the elongate scattering elements. This decay may, for example, be defined by the complementary error function erfc(z). More preferably, the width profile 322 is also selected to produce a Gaussian intensity profile (along the waveguide direction) as described above for example with reference to FIGS. 15A and 15B. Accordingly, this width profile 322 is preferably a curve that, when multiplied with a curve that describes the decay in light intensity longitudinally along the grating coupler portion of the waveguide due to leakage (by scattering), yields the Gaussian intensity profile (along the waveguide direction) described above. These relationships are described by the equations:

$$\partial E/\partial z = -F(z)E(z) \tag{5}$$

$$\partial E/\partial z = -G(z) \tag{6}$$

where F(z) is the scatter cross-section as a function of longitudinal distance along the grating, E(z) characterizes the reduction (or decay) of light along the length of the waveguide as more and more light is coupled out, and G(z) is the Gaussian intensity distribution along the Z direction corresponding to the preferably Gaussian intensity profile of the beam output by the waveguide couple. E(z) is obtained from the integration of the Gaussian profile G(z), which is known as the "complementary error function," erfc(z). As is well known, the complimentary error function erfc(z) corresponds to unity minus the error function erf(z). Equations 5 and 6 combined yield the relationship:

$$F(z)=G(z)/E(z) \qquad (7)$$

As described above, the scatter cross-section profile F(z) is preferably selected to produce this Gaussian intensity profile G(z) in certain circumstance. Since the quantity of light within the waveguide decays as it progresses through the waveguide grating coupler and is scattered out by the elongate scattering elements, less light is available to be coupled out toward the flared end of the waveguide. Accordingly, the scatter cross-section needs to be larger toward the flared end. In the case where the scatter cross-section increases monotonically with grating width, e.g., at substantially the same rate, the grating width profile may resemble the scatter cross-section profile F(z).

The grating width profile is preferably based on the desired scatter cross-section F(z) which preferably takes into account the decay E(z) of light within the waveguide as the light is propagating through the grating coupler and being scattered out. More preferably, the scatter cross-section F(z) is selected to produce the desired Gaussian beam profile G(z). Accordingly, the profile F(z) preferably enables efficient coupling of a beam having a Gaussian intensity into and/or out of the waveguide grating coupler. However, in other embodiments, the desired intensity profile is not Gaussian or other scatter cross-sections are implemented. Also, the decay E(z) may or may not be characterized by the complementary error function erfc(z) and may or may not be incorporated into the design and the selection of scatter cross-sections and grating widths.

A relationship between the scatter cross-section and the grating width can be used to determine the grating width profile across the grating coupler. A particular scatter cross-section profile F(z) can be implemented by a proper selection of grating widths. This selection may be based on the specific relationship between the scatter cross-section and grating width such as depicted for example in FIG. 17.

For example, to implement an exponentially increasing scatter cross-section profile F(z), a grating width profile such as shown in FIG. 17 may be used. The relationship between the scatter cross-section and grating width such as shown in FIG. 16 may determine the selection of grating widths. As described above, however, the curves depicted in FIGS. 16 and 17 are schematic and as such the plots in FIGS. 16 and 17 do not correlate exactly with each other. For purposes of understanding the general relationships between the various aspects and properties of the waveguide grating coupler described herein, reference will be made to FIGS. 16 and 17 as being related.

As noted above, the first portion of the relationship between scatter and width depicted schematically in FIG. 16 increases monotonically and, moreover, at a substantially constant slope. Accordingly, the first portion 324 of the width profile in FIG. 17 may generally conform to the shape of an exponential in the case where an exponentially increasing scatter cross-section is desired. Similarly, the first portion 324 of the grating width profile in FIG. 17 follows the above-described reference curve 322. As previously described, the reference curve 322 is the grating profile for the case the scatter cross-section 302 increase monotonically and at a constant rate as a function of grating width of FIG. 16.

The discontinuities 330 and 332 accommodate for the irregular variations where scatter cross-section curve 300 of FIG. 16 oscillates. In particular, the discontinuity 330 that occurs at the grating position z1 corresponds to the transition in the scatter cross-section from the local maximum 304a (at $g_1$) to the local minimum 304b (at $g_2$) depicted in FIG. 16. For the monotonically increasing scatter cross-section situation (characterized by the aforementioned reference curve 302), the grating width continues to increase before and after position z1 in order to compensate for the decay in the intensity of light in the waveguide. When a dip occurs in the scatter cross-section curve 300 from $g_1$ to $g_2$, thereby deviating from the reference curve 302, a suitable scatter cross-section value is selected to yield the desired Gaussian intensity profile. This scatter cross-section value is denoted S2 and is that value produced by the width $g_2$ if the reference curve 302 applied. However, this scatter cross-section value S2 occurs on the curve 300 at width $g_3$. Thus, in FIG. 17, the discontinuity 330 at z1 occurs because of the extra "jump" from $g_2$ to $g_3$ needed to obtain the desired cross-section value S2. This "jump" corresponds to a higher increase in the width of the next elongate scattering element, i.e., ruling or grate.

The slope of the grating width profile may depend on the slope of the relationship between the scatter cross-section and the grating width. For example, the first portion 324 of the curve has a higher slope than that of the second portion 326 of the curve. The reduction in slope of the grating width profile results from the increase in slope of the curve 300 defining the relationship between the scatter cross-section and the grating width. This increase in slope is exemplified by the disparity in the slope of curve 300 at grating widths $g_1$ and $g_3$. With a larger slope, less incremental increases in grating width are needed to introduce respective increases in scatter cross-section. Because the slope of the first portion 324 is different than the slope of the second portion 326 on opposite sides of the discontinuity, the slope or rate of change itself has a discontinuity.

Note that some values of scatter cross-section on curve 300 (e.g. scatter strength S5 for width $g_5$) are larger than values of scatter cross-section associated with the reference curve 302 (e.g., S5). Accordingly, a smaller grating width $g_4$ is needed to produce the scatter strength of S5 in comparison to the width $g_5$ yielded by the reference curve 302. This reduced width is exhibited on the grating width profiles shown in FIG. 17 where at position z2 a smaller width $g_4$ is used in comparison with the reference profile 322.

A second discontinuity 332 in the grating profile results from the second local maximum 304c (at $g_5$) on the plot 300 of the scatter strength versus grating width. This discontinuity is between the second and third portions 326, 328 of the grating width profile. For continued increase in scatter strength, a substantial jump or increase in width is introduced in comparison to the surrounding grates or rulings.

The exemplary scatter cross-section curve 300 of FIG. 16 and the corresponding width profile curve 320 of FIG. 17 illustrate how the grating width dependence on grating position may include discontinuities (e.g., in rate of change). The grating profile depends in part on the scatter cross-section F(z) desired along the length of the grating assembly. In the case where the scatter cross-section progressively increases from one end to another, discontinuities (i.e., jumps in width) in the grating profile will result from local maxima in the scatter strength versus grating width relationship. Conversely, for scatter cross-sections that decrease from one location to another, local minima in the scatter strength grating width curve will produce discontinuities in the grating profile. As discussed above, the relationship between the scatter cross-section and the grating width may vary with the waveguide geometry and may be oscillatory. In addition, the curve in FIG. 17 is for illustrative purposes only. Accordingly, this exemplary curve should not be construed as limiting. Other profiles having same or different characteristics are possible for different embodiments. It will therefore be appreciated that the novel concept of altering the grating width progression to compensate for the irregularities or fluctuations of the scatter cross-section is applicable to other potential configurations characterized by grating profiles having same or different features than those illustrated by the exemplary curve 320 in FIG. 17.

Figure 18:
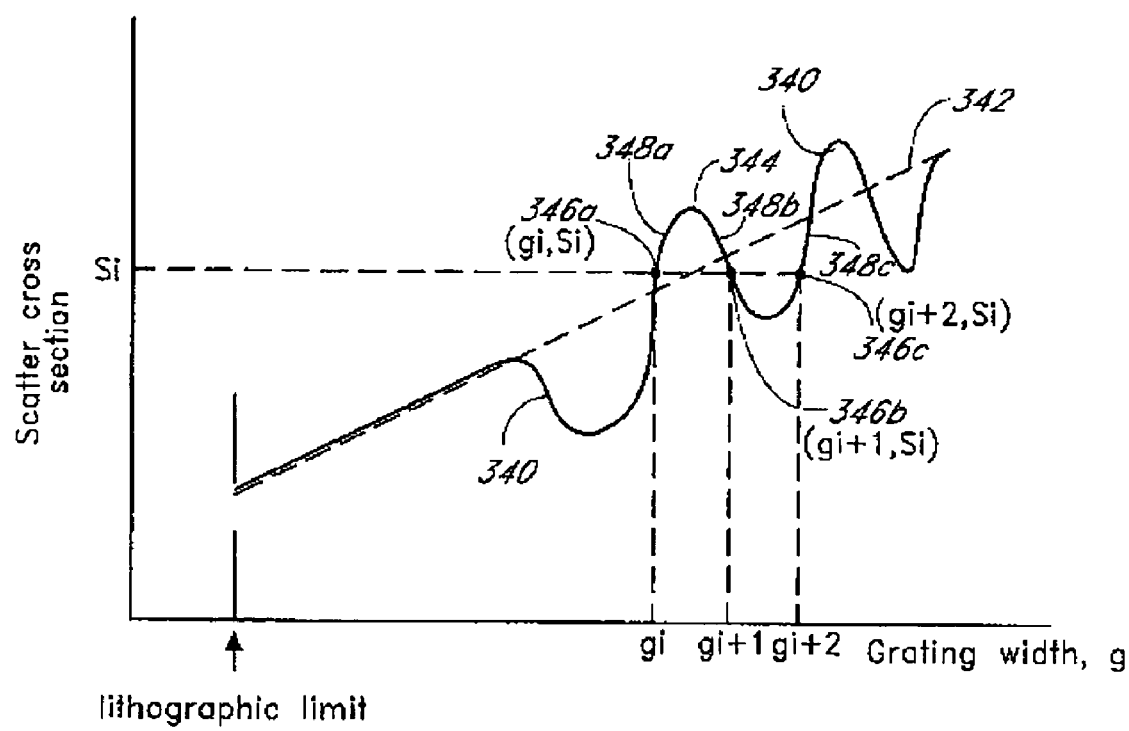
FIG. 18 illustrates another exemplary plot of scatter cross-section versus grating width, g, wherein the scatter cross-section fluctuates between higher and lower values of scatter-strength with increasing grating width.
Figure 19:
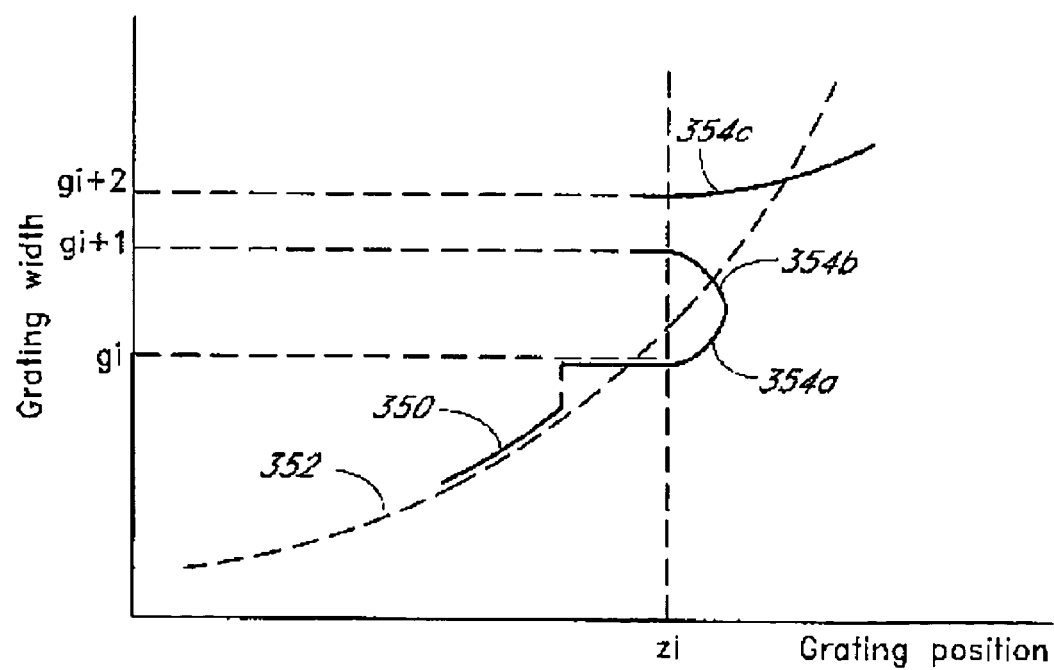
FIG. 19 is an exemplary grating width profile corresponding to a scatter cross-section plot such as shown in FIG. 18, wherein the oscillatory behavior of the scatter cross-section may give rise to multiple possible width profiles.

FIGS. 18 and 19 schematically illustrate an embodiment wherein the dependency of the scatter strength on grating width includes irregularities that result in multiple possible width profiles. As discussed above, the curves in these figures are for illustrative purposes only and may differ for different embodiments of the waveguide grating coupler. FIG. 18 shows an exemplary oscillatory cross-section curve 340 having a plurality of local extrema, again depicted with respect to a reference curve 342. The oscillatory behavior of the curve 340 is such that the same scatter strength value, $S_i$, occurs at three widths $g_{i-1}$, $g_{i+1}$, and $g_{i+2}$ (indicated by points 346a, b, c on the curve 340). Other scatter values also can be produced by multiple grating widths as a result of this particular oscillatory pattern.

Such multiple width values translate into multiple possible grating profiles shown in FIG. 19, where a portion of a width profile curve 350 is again depicted with respect to a reference profile 352. At the grating location of $z_i$, the three exemplary possible width values $g_i$, $g_{j+1}$, and $g_{i+2}$ (each having scatter cross-section value of S1) translates to three separate curve segments 354a, b, and c, respectively. These segments 354a, b, and c arise from three respective sections 348a, 348b, 348c on the curve 340 characterizing the relationship between scatter strength and grating width. Accordingly, the grating width at or near the location $z_i$ may have any of the three exemplary values. Moreover, for grating positions beyond $z_i$, the grating widths can be selected from any of the three curve segments 354a, b, and c as each provide overlapping scatter strength values. The grating in the grating profile can also jump from one segment 354a, b, and c to another segment 354a, b, c as desired. It will be appreciated that such an option to choose from more than one grating width at a given location may be utilized advantageously in designing a grating coupler.

The grating width profiles shown in FIGS. 17 and 19 comprise continuous portions 324, 336, 328, 354a, 354b, 354c of smooth curves 320, 350 with some discontinuities 330, 332. The corresponding grating coupler may comprise a plurality of rulings or grates, for example, 2 to 5, 5 to 10, 10 or 20, or more scattering elements. The widths of these scattering elements preferably coincide with grating profiles such as schematically represented in FIGS. 17 and 19. Of course, since only a discrete number of elongate scattering elements would be included in the grating coupler, the specific scatter elements although in accordance with the grating profiles would correspond to discrete data points on the grating profile plots. Preferably, however, the grating widths are selected to coincide with the appropriate grating profile curve to achieve the desired goal, for example, to provide an exponentially or geometrically increasing scatter cross-section profile across the length of the grating coupler.

An exemplary grating structure comprising grating features having widths that vary in accordance with a grating width profile which includes a discontinuity or jump (e.g., in rate of change of width) is illustrated in FIGS. 20 and 21. A portion of a grating assembly 360 may, for example, represent the discontinuous curve 320 of FIG. 17. The assembly 360 comprises a plurality of elongate scattering elements 372 that can be grouped into a first group 362 and a second group 364. The first group 362 has an end grating 366 adjacent to an end grating 370 of the second group. As depicted in FIG. 20, the elongate scattering elements in each of the two groups 362, 364 have widths that increase progressively. There is, however, a significant increase in the grating width between the end elongate scattering elements 366 and 370 of the first and second groups 362, 364. This exemplary sudden increase in the grating width corresponds to the discontinuity between the curves 324 and 326 at location $z_1$ or between the curves 326 and 328 at location $Z_2$ described above in reference to FIG. 17. Measuring the grating widths at the respective locations of the scattering element and determining the rate of change of the grating width based on these positions, yields a discontinuity in rate of change between the two scattering elements 366 and 367 in comparison with the other scattering elements.

FIG. 21 is a side sectional view of the grating assembly 360 of FIG. 20. The elongate scattering elements 372 are shown to have a constant height h. It will be appreciated, however, that the height itself may be varied alone or in conjunction with width variation using similar grating profiling concept described above to achieve the desired end results. As previously described in reference to FIG. 20, the progressive increase in the widths of elongate scattering elements within the first group 362 ends at the scattering element 366. A substantial exemplary increase in the width occurs between the scattering element 366 and the next scattering element 370 that begins the second group 364. The rate of increase in width in the first group 362 is also different from that of the second group 364. This rate is preferably determined using the grating widths and positions obtained at the location of the scattering elements 372. The width of the grating features in the first group increases exponentially. The rate of increase is also exponential. In contrast, the rate of increase of the widths for the grating features 364 in the second group 362 is smaller and non-exponential. This rate jumps as well between the two groups.

Although the elongate scattering elements 372 are depicted as being formed on top of a waveguide layer 380, it will be appreciated that the grating features may be formed as grooves into the layer 380, either at its top or bottom layer. Furthermore, the novel concept of varying the grating dimensions to account for the scatter cross-section fluctuations may be applied to groove width and groove depth as well as the height or index of refraction of the scattering elements or various other aspects of the grating that affect the scatter strength.

The grating profile formation as determined by the characteristic scatter cross-section of a particular grating coupler is described above in reference to FIGS. 16–21. Such a technique allows formation of wavefronts having a desired intensity profile, such as for example, Gaussian, between the grating coupler and the fiber. In the description above, the intensity contribution from a given scattering element is determined by its desired scatter cross-section, which in turn is determined at least in part by its sectional dimension. The width of the grating may be selected as a parameter to vary in order to achieve the desired scatter cross-section, although as stated above, other dimensions such as height or other parameter may also be varied.

In various embodiments, the grating coupler comprises segmented scatter elements. What is meant by segmented is that instead of a single elongate scattering element extending laterally (i.e., generally in the X direction) across of the waveguide, the grating is separated into two or more distinct portions which together extend laterally across at least a portion of the width of the waveguide. A region, such as a space, which induces less scatter separates these portions. This region has different physical dimensions than the portions it separates so that it is less able to scatter light. For example, the region may comprise a scatter feature having a smaller scatter height or smaller effective index so as to be less efficient scatterer. In certain preferred embodiments, this space does not contain a scattering feature at all. For example, in the case where the grating comprises raised scattering features or grates, no raised feature is provided between the two portions of scattering features so as to create a space separation. Similarly, in the case where the grating comprises grooves, no groove is present in this space. Consequently, the ruling or grate comprises one or more spaces separating portions of the ruling or grate extending lateral across the grating.

The segmentation controls the scatter cross-section of an elongate scattering element. A segmented grate or ruling may scatter less light than a continuous or solid elongate scattering element having similar grating width. Furthermore, of the segmented scattering elements having similar width, an elongate scattering element comprising longer segments in general may scatter more light than one having shorter segments provided that the spacing between the segments are generally similar in both scattering elements.

Figure 22:
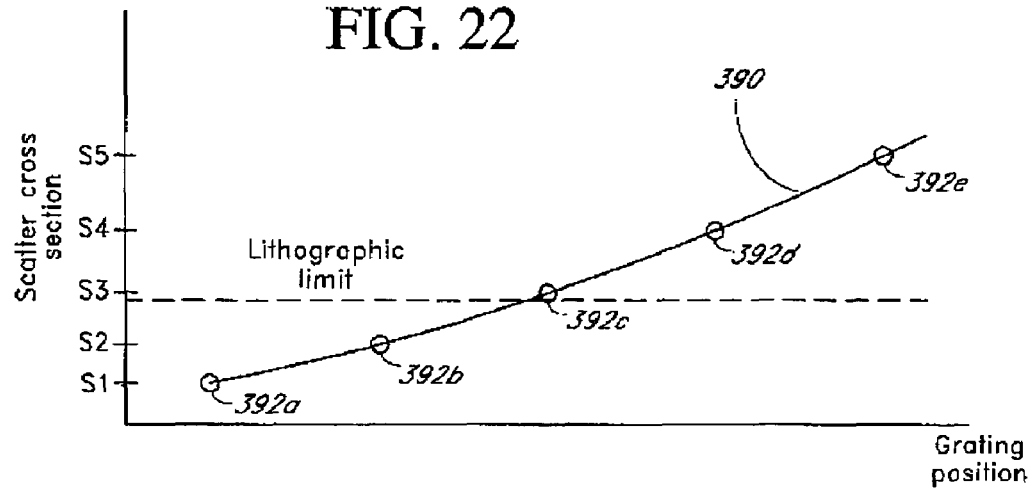
FIG. 22 is a plot of scatter cross-section versus grating position (z) for an exemplary grating coupler, further showing the lithographic limit of feature size that limits the width of rulings that can be patterned to form the grating.

One particularly useful application of such a property of scattering elements is schematically illustrated in FIG. 22, where it is desired that at least some of the elongate scattering elements have scatter cross-sections less than what fabrication processes can practically provide. In an exemplary grating profile, a desired scatter cross-section curve 390 is shown as a function of grating position. A plurality of grating positions 392a–e and their corresponding and progressively increasing scatter cross-section values $S_1$ to $S_5$ are shown superimposed on the curve 390.

In the grating coupler illustrated in FIG. 22, an exemplary lithographic limit for grating feature formation corresponds to a solid grating width, $g_L$, which gives a scatter cross-section of approximately $S_3$. Hence, a solid grating 394c corresponding to the scatter cross-section $S_3$ has a width $g_L$, and subsequent solid elongate scattering elements 394d, e have progressively increasing widths $g_4$ and $g_5$. It may be impractical, however, to fabricate two exemplary elongate scattering elements 394a, b with widths less than $g_L$ due to the lithographic limit. Thus, the elongate scattering elements 394a, b are given the lower limit width $g_L$ and segmented in order to achieve the desired scatter cross-section values $S_1$ and $S_2$ respectively. Of the segmented elongate scattering elements 394a, b, the grating 394a comprises a plurality of segments (or features) 396, and the grating 394b comprises a plurality of features 398. The features 398 are longer than the features 396, that is, they span a greater distance laterally across the width of the waveguide, i.e., in the X direction. The segmented grating 394b also has a greater fill factor than the segmented grating 394a. Accordingly, the grating 394b has a greater scatter cross-section than the grating 394a.

This lithographic limit may for example be about 90 to 350 nanometers but should not be limited to this range especially considering the lithographic smaller and smaller feature sizes are attainable with continually developing fabrication process. It will be understood that the segmented elongate scattering elements described above are not restricted to the lower lithographic limit, width $g_L$. The width of the segmented scattering elements can be based on any value greater than or equal to $g_L$, and segmentation can be employed to reduce the scatter cross-section. It will also be understood that although two exemplary segmented scattering elements are described above in reference to FIG. 22, the grating coupler may have more or less than two segmented scattering elements. In some embodiments of the grating coupler, it may not be necessary to segment the elongate scattering elements as the smallest scattering cross-section may be achieved with a scattering element having a width greater than the lithographic limit. Conversely, some embodiments of the grating coupler may utilize a plurality of segmented elongate scattering elements, regardless of the grating widths. Segmented elongate scattering elements may be employed for reasons other than providing scattering cross-section smaller than provided by feature sizes at the lithographic limit. In some cases, the scatter cross-sections of the segmented elongate scattering elements may be larger than the scatter cross-section of unsegmented elongate scattering elements. Segmented elongate scattering elements can be employed in a wide range of designs for different reasons. Thus, it will be appreciated that the novel concept of utilizing the segmented elongate scattering elements may be applied to a variety of grating coupler configurations.

Figure 23A:
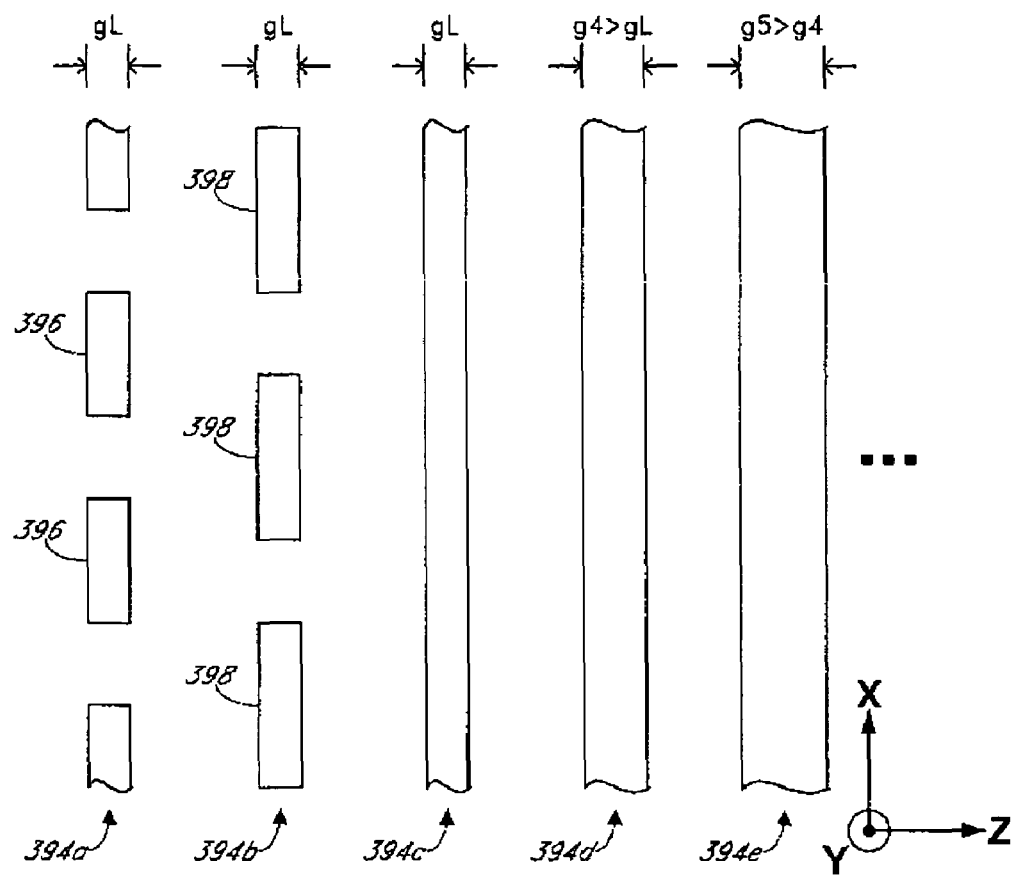
FIG. 23A illustrates a portion of a grating coupler comprising segmented elongate scattering elements (i.e., rulings or grates) that reduce the scatter cross-section when compared to a solid continuous elongate scattering elements of similar width.
Figure 23:
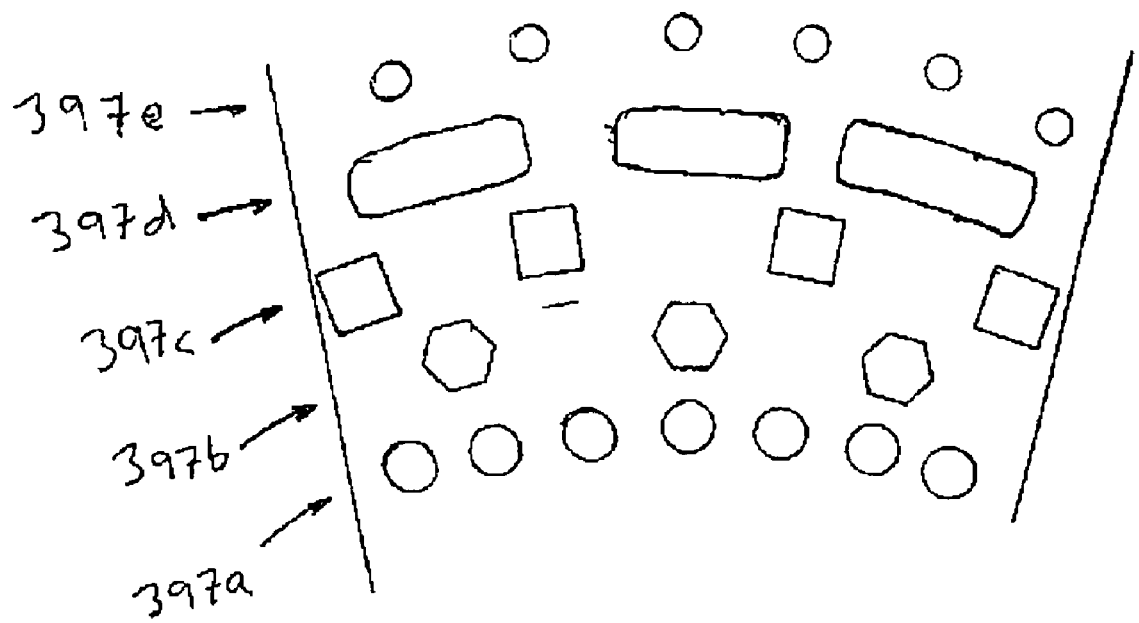
FIG. 23B schematically illustrates a portion of a grating coupler comprising segmented elongate scattering elements (i.e., rulings or grates) comprising different types of scattering features.
FIG. 23C schematically illustrates a segmented elongate scattering element (i.e., ruling or grate) comprising different size scattering portions having different scatter cross-sections.
Figure 23:
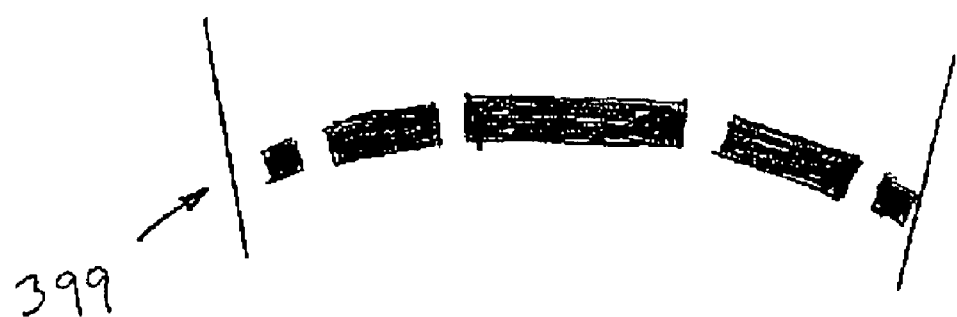

Although the elongate scattering elements 394a–e are depicted as being straight in FIG. 23A, these discrete feature may be aligned along a curve or a line but are not so restricted. Also, the elongate scattering elements in FIG. 23A may be a small portion of an overall curved scattering element, or a portion of a straight scattering element, or any combination thereof. This curved line may, for example, be elliptical or quartic as describe above. Other paths are also possible.

It will also be appreciated that although the segmented features described above are depicted as rectangular features, the "segmented feature" may include other shapes such as square, triangular, circular, elliptical. The segmented features may comprise by way of example, a series of bumps or depressions, or a series of other discrete features. The features may be columns or cylinders such as for example right circular cylinders, which protrude out of or into the waveguide. These cylinders may be square, triangular, circular, elliptical, etc. as seen from a top view. The segmented feature may have rounded edges. The features may comprise material different than that surrounding the feature or may comprise material having different properties (e.g., doping, density). The features may also have other sizes, orientations, positions, and spacings, for example. Features having other characteristics are also possible. The fill factor, which is determined by the size and spacing of the scattering feature, may vary as well.

The features may vary from one segmented grating 397a to another segmented grating 397b, 397c, 397d, 397e such as shown in FIG. 23B. The features may also vary within a given segmented scattering element 399 as shown in FIGS. 23C. These variations may include, for example, differences in scattering cross-sections, in shapes, in sizes (e.g., length, width, height), positions, orientations, in spacing between features, in materials or material properties or combinations of these. Other characteristics of the feature or that define the feature may be varied as well. The variations may be regular or irregular. Variations along a segmented elongate scattering element may be employed for example to control the shape of the beam of light coupled out of or into the waveguide coupler causing it to be diverging or converging.

Regardless of whether the elongate scattering element is segmented, in various embodiments, the longitudinal spacing (i.e., in the Z direction) between consecutive elongate scattering elements is preferably suitable for directing the beam having the desired wavelength in the desired direction. As shown in FIGS. 1, 2, 4, and 10, an optical element, such as an optical fiber 106 may be oriented at an angle with respect to the planar waveguide to which optically coupling is provided. Accordingly, a beam emanating from the input/output region of the waveguide coupler will preferably exit at an angle towards the optical fiber or vice versa. In general, it is known that the longitudinally spacings of the rulings or grates determine the angle of the scattered beam. Thus, the elongate scattering elements in the waveguide grating can be selected to control the angle of the optical path between the fiber and the grating coupler. More specifically, the longitudinal position of the grating features along the length of the scattering elements will determine in part the phase of light scattered therefrom. Selection of the relative phase difference from the different spatially separated scatters can therefore be used to control the wavefront scattered from the grating, i.e., both its shape and its angle of propagation. Variation of the period of the grates controls the angle of propagation. Non-uniform variations in the spacing may be employed to control the shape of the beam, e.g., causing the beam to converge or diverge. Accordingly, adjustments to the longitudinal separation between the different elongate scattering elements or rulings are preferably included to provide for the appropriate beam angle and beam shape.

As illustrated with reference to FIGS. 24 and 25, a reflective element may be included to increase the coupling efficiency of the grating coupler by directing light toward the grating. The coupling efficiency of the grating coupler generally refers to the fraction of light input into the grating coupler that is output along the desired optical path to a designated location. The coupling efficiency can be calculated for example by dividing the amount of light reaching a designated receiving area by the quantity of light that is directed onto the coupler. For instance, in the case where a grating coupler receives light from an optical fiber that is to be channeled into a planar or integrated optical waveguide, the coupling efficiency is the fraction of light delivered by the optical fiber that is coupled into the planar waveguide by the grating coupler. In the case where a grating coupler receives light from a planar waveguide and couples this light to an external optical fiber, the coupling efficiency is the percentage of light from the planar waveguide that is coupled by the grating coupler into the optical fiber.

Figure 24:
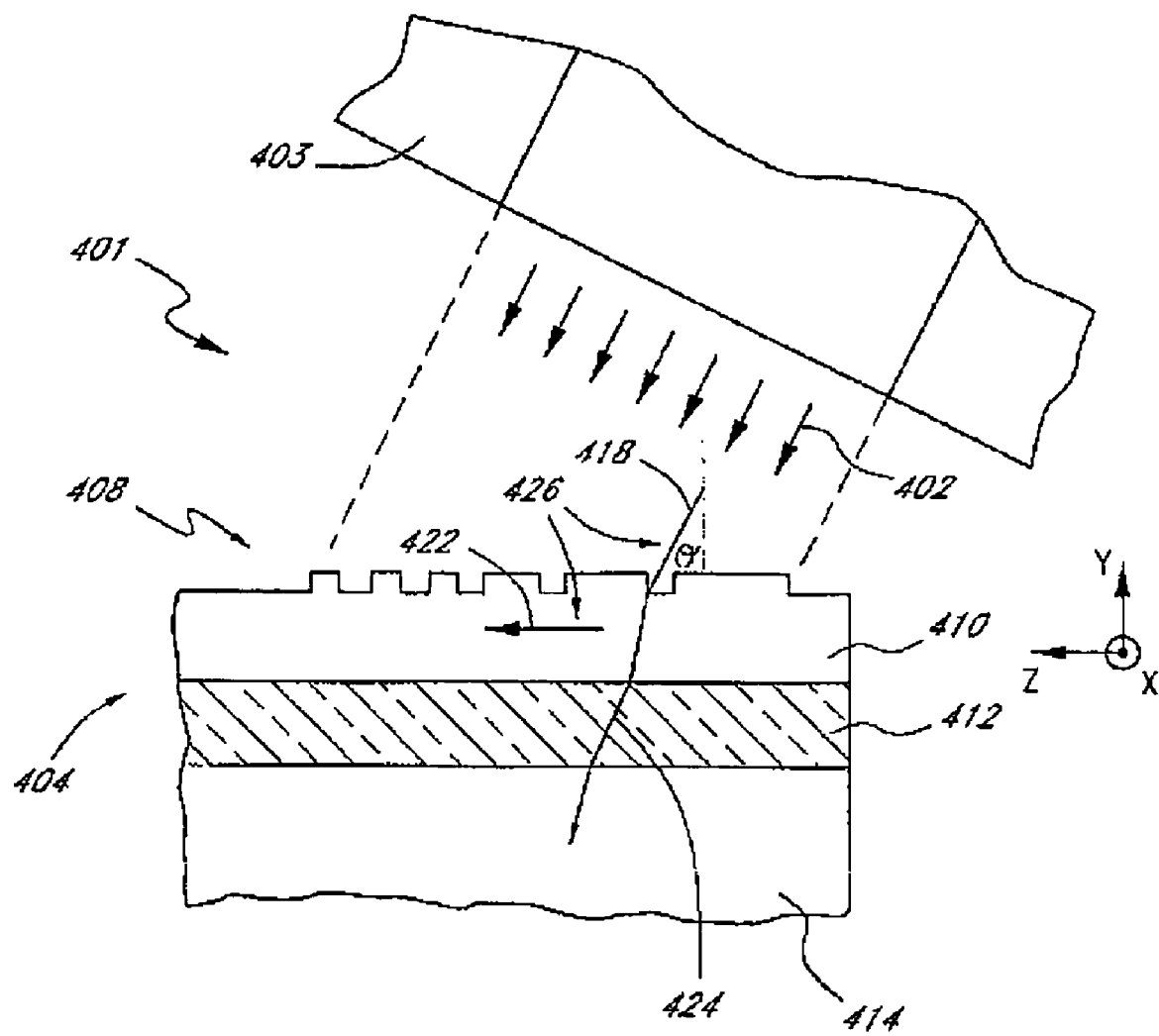
FIG. 24 is a cross-sectional view of a waveguide grating coupler schematically illustrating optical coupling of light from an optical fiber into a planar waveguide with a portion of the light from the optical fiber not following the desired optical path into the planar waveguide.

FIG. 24 schematically illustrates a grating coupler 401 coupling light 402 from an optical fiber 403 into a planar waveguide 404, wherein a portion 424 of the light from the optical fiber 403 does not follow a desired optical path 426 into the planar waveguide 404. Instead the light 424, shown as a deviant light ray, propagates on through the waveguide grating coupler and is lost. In certain embodiments, such as that shown in FIG. 24, the predetermined optical path 426 corresponds to the path followed by light propagating from the fiber 403 (generally at the angle θ) and scattered by the grating so as to be directed longitudinally down the waveguide 404 in a direction parallel to the Z-axis. In other embodiments, the predetermined optical path 426 is along the same path, but the light propagates in the opposite direction.

Figure 25:
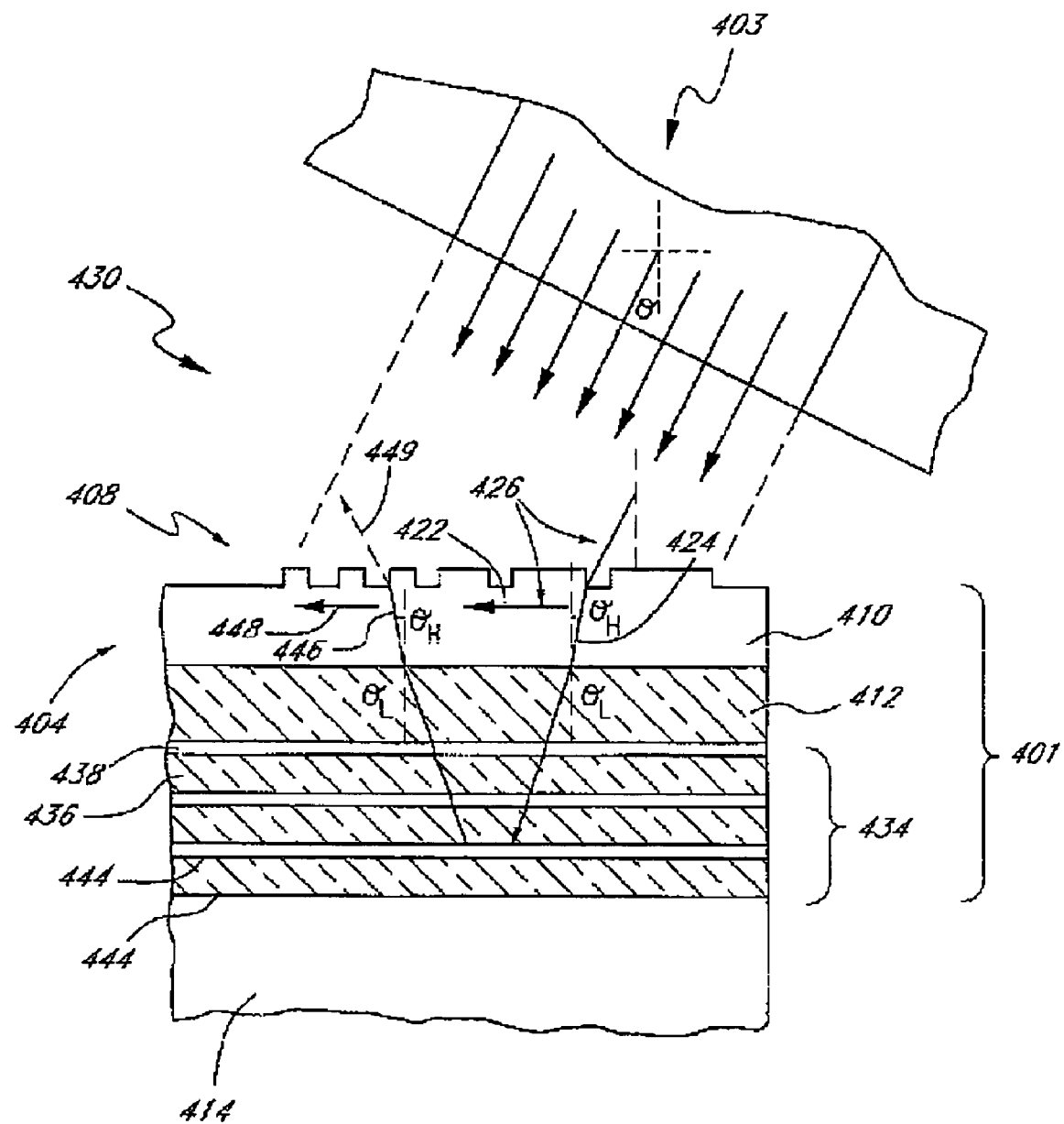
FIG. 25 is a cross-sectional view of a waveguide grating coupler that includes a distributed Bragg reflector (DBR) disposed beneath the waveguide grating to redirect deviant light rays back toward the waveguide grating for coupling into the planar waveguide.

For the purposes of explanation of certain features and effects consistent with embodiments of the present invention, FIGS. 24 and 25 and the corresponding description contained herein illustrate cases wherein light is output by the optical fiber 403 and is coupled into the optical waveguide 404. However, as described above, the principles for these and other embodiments discussed herein are also applicable to the reverse process wherein light is transmitted by a planar waveguide and coupled into an optical fiber by a grating coupler. Similarly, such principles are also applicable wherein the optical fiber 403 is replaced by another device such as a second waveguide with an optical coupler or a laser with appropriate optics for properly conditioning a beam for launching into a waveguide. Also, the optical fiber 403 is shown at a specific location and orientation such that light propagates from the fiber to the grating coupler 401 at the specific angle θ, however, this angle may be different for other configurations.

As discussed above, the grating coupler 401 shown in FIG. 24 includes a grating assembly (or simply a grating) 408 comprising a plurality of elongate scattering elements that scatter incident light 402 from the optical fiber 403 such that a portion 422 of this light is transmitted longitudinally, i.e., in the Z direction, along the planar waveguide 404. The planar waveguide 404 comprises a slab 410 disposed over a cladding 412 and a substrate 414. In this configuration, the grating assembly 408 together with the slab 416 through which light propagates is located between the (i) optical fiber 403 and (ii) the cladding 412 and substrate 414, which are on opposite sides.

During operation, the light 402 is incident on the grating 408, as represented in FIG. 24 by an incident ray 418. As discussed above, a portion of this light 418 (represented by ray 422) is diffracted by the grating 408 into a predetermined diffractive order that preferably coincides with an optical path along the longitudinal (Z) direction of the waveguide 404. Another portion of the light 402 (represented by ray 424) is not scattered into this predetermined diffractive order and passes straight through the grating. The scattering process illustrated in FIG. 24 is the reverse process to that described above in relation to FIG. 9. The unscattered light 424 is illustrated as propagating onward into the cladding 412 and substrate 414 where it may be absorbed or possibly transmitted through the cladding 412 and substrate 414. In either case, the unscattered light 424 is lost, as it does not propagate longitudinally down the waveguide 404 along the predetermined optical path 426. In addition to the unscattered light 424 shown in FIG. 24, a portion of the light 418 that is incident on the grating 408 may also be scattered at various angles that are incompatible with coupling into the waveguide 404. This light is also lost. One method of recovering some of the lost light and to thereby enhance the coupling efficiency of the grating coupler 401, is to redirect this light back towards the grating 408 where it can be scattered into the waveguide 404.

FIG. 25 shows an integrated optical apparatus 430 comprising a grating coupler 401 that includes a reflective element 434 for reflecting light back towards the grating 408. The reflective element 434 comprises a Distributed Bragg Reflector (DBR) 434 positioned with respect to the grating 408 such that some of the light outside the portion 422 of the optical path 426 is reflected by DBR 434 towards the grating 408. The light reflected toward the grating 408 by the DBR 434 includes both the unscattered light 424 as well as scattered light that does not propagate along the predetermined optical path 426.

Distributed Bragg reflectors are well-known highly effective reflective elements. The DBR 434 generally comprises alternating layers 436, 438 of low and high refractive index material, respectively. The alternating low and high index layers 436, 438 create interfaces with refractive index mismatches that produce Fresnel reflections. Accordingly, the DBR 434 comprises a plurality reflective surfaces 444 that are formed at the interfaces between the adjacent low and high index layers 436, 438. The plurality of reflective interfaces 444 together contribute to the total reflectance of the DBR. Moreover, the plurality of reflective interefaces 444 can produce a coherent effect.

In particular, the thickness of each layer is preferably fabricated such that light reflected by any one of the reflective surfaces 444 constructively interferes with light that is reflected by other reflective surfaces 444. In order to produce constructive interference, light propagating through a given layer 436, 438 of the DBR 434 is preferably phase shifted by approximately π radians. This π phase shift is introduced in each pass through the layer 436, 438 (i.e., once upon entering the layer and again after being reflected at the next reflective interface surface 444 back through the layer). Thus, light reflected by a reflective surface 444 is phase shifted by an amount that is approximately equal to 2π radians and is, therefore, constructively superimposed onto light reflected by the other reflective interfaces 444.

The appropriate thickness of each of the layers 436, 438 that produces such a coherent effect depends on the wavelength, λ, of the light reflected by the Bragg reflector 434 and the angle of incidence, θ, at which the light propagates relative to the surface normal reflective interface 444. For certain DBR designs, the amount of phase shift φ produced as light passes through a given layer 436, 438 is determined by the relationship:

$$\phi = \pi n\, t\, \cos(\theta)/\lambda \qquad (8)$$

where n is the refractive index of the material, t is the material layer thickness, θ is the angle of the incident and reflected light relative to the normal to the reflective interface 444, and λ is the wavelength of the light 402.

Preferably, the DBR 434 is designed to reflect incident light at a specific angle. This angle may be determined by the orientation of the fiber 403 with respect to the waveguide grating coupler 401 and the refractive index of the material in each layer. For example, the optical fiber 403 may be directed at an angle θ such that light from the fiber is incident on the grating 408 substantially at the angle θ. As a result, the unscattered rays 424 will have propagation angles of $\theta_{Low}$ and $\theta_{high}$ as it propagates through the layers 436 and the layers 438, respectively of the DBR 434. These propagation angles, $\theta_{Low}$ and $\theta_{High}$, are defined by Snell's law based on the refractive indices of the respective mediums (e.g., the air between the fiber 403 and the grating 408, and silicon dioxide in the low index layer 436). In this example, the layers 436 comprise the same material as the cladding 412 and the layers 438 comprise of the same material as the slab 410, although the DBR design is not to be so restricted. Upon reflection from the DBR 434, the unscattered light 424, represented in FIG. 25 as reflected ray 446, will be reflected at the angle θ with respect to the normal to the reflective interfaces 444. To estimate suitable thicknesses $t_{High}$ for the high index layer 438, the following relationship can be applied:

$$t_{High} = m\lambda/[4(n_{High})\cos(\theta_{High})] \qquad (9)$$

where m (an integer) is the order of the coherent reflection from the DBR, $n_{High}$ is the refractive index of the higher index material. This Equation 9 is obtained by setting φ in Equation 8 approximately equal to 2π, the phase shift that produces constructive interference of the reflected light. Similarly, the thickness $t_{Low}$ of the low index layer 436 may be determined from the relationship:

$$t_{Low} = m\lambda/[4(n_{Low})\cos(\theta_{Low})] \qquad (10)$$

where $n_{Low}$ is the refractive index of the lower index material. Preferably, the thicknesses and materials are selected based on the wavelength of light to be coupled into or out of the waveguide 404 and on the relative orientation of the optical fiber 403 with respect to the Bragg reflector 434, its optical output, and/or the unscattered portion of light 422. In the case where the primary concern is light scattered by the grating 408 along paths away from the predetermined optical path 426, the angle of this scattered light may be employed to select the appropriate thicknesses and material compositions of the layers 436, 438 in the DBR 434. The thickness and material composition of the layers may thus be designed in some embodiments to provide maximal or at least substantially increased reflectance for the desired wavelength and angle of incidence. Other methods may be used to obtain an estimate of the thicknesses of the layers 436, 438 that are different from the estimates obtained using Equations 9 and 10 or that are based on variations of Equations 9 and 10. For example, in some embodiments, the DBR 434 may comprise a quarter-wave stack instead of a half-wave stack. Similarly, in other embodiments, the DBR design and the corresponding layer thicknesses need not be selected to optimize or reduce reflection for a given wavelength light incident thereon at the specific angle θ.

Preferably, however, a substantial portion of the light incident on the DBR 434 is reflected back toward the grating 408. The light reflected by the DBR 434, represented by the reflected ray 446, reaches the grating 408 where at least some of the light is diffracted such that it propagates longitudinally down the waveguide 404 along a portion 448 of the predetermined optical path 426 (i.e., in the Z direction). Accordingly, the light 448 augments the light 422 from the optical fiber 403 that is scattered by the grating 408 on the first pass through the grating. The optical coupling efficiency of the integrated optical structure 430 is thereby increased in this manner, for example it may be doubled. However, some of the light 446 reflected from the DBR 434 may not be scattered by the grating 408 on this second optical interaction with the grating and continues through the grating as indicated by a ray 449. This light 449 may be lost as it is not coupled into the planar waveguide 404.

Nevertheless, increased efficiency is achieved by providing the DBR 434 together with the grating 408. This integrated optical apparatus 430, however, should not be limited to the configuration that is depicted in FIG. 25, as a wide variety of designs are considered possible.

In the structure 430 illustrated in FIG. 25, the DBR 434 is disposed beneath the slab 410 and cladding 412 and above the substrate 414. The optical fiber 403 is above the slab 410. Accordingly, the optical fiber 403 and the DBR 434 are on opposite sides of the waveguide structure, i.e., the slab 410. In addition, the cladding 412 is between the slab 410 and the DBR 434. In other embodiments, the DBR 434 may be directly adjacent to the slab 410 with no intermediate cladding 412 in the region of the grating coupler 401.

Also, although only three pairs of high/low layers 438, 436 are shown, more or less layers may be used. The number of alternating layers may range, for example, between about 2 to about 40, but should not be limited this range. Moreover, the materials that are employed to produce the higher and lower refractive indexes may be selected from a wide variety of possibilities, both materials well known in the art as well as those compositions yet to be developed. Preferably, however, at least one of the materials comprises a semiconductor material, and more preferably, silicon.

In one preferred embodiment, the high index layer 438 comprises crystal silicon having an index of refraction of about 3.5 and the low index layer 436 comprises silicon dioxide having an index of refraction of about 1.5. In other embodiments, the low index layer 436 may comprise other dielectrics such as other oxides and nitrides including for example silicon nitride. As discussed above, use of silicon and silicon related materials offers many advantages including well-developed fabrication technology, processes, and products. In addition, a DBR 434 comprising for example silicon and silicon dioxide is preferably compatible with silicon waveguide structures as well as semiconductor electronic devices. Moreover, the relatively large index contrast between materials such as silicon and silicon dioxide, having respective indices of refraction of 3.5 and 1.5, will yield large Fresnel reflections at the interfaces 444. Accordingly, selection of silicon or a silicon related material is preferred as a least comprising one or more of the layers, and more preferably the pair of silicon and silicon dioxide is included in at least part of the DBR 434. As indicated above, however, other materials such as for example silicon nitride layers and a sapphire substrate are considered possible.

The layers of the DBR 434 may be manufactured using conventional integrated circuit fabrication processes, as discussed above, as well as by utilizing techniques yet to be developed. For example, conventional "Silicon-on Insulator" (SOI) processes may be employed to form the DBR 434 on a silicon wafer or sapphire substrate. Fabrication techniques for forming a silicon layer adjacent an insulator include, but are not limited to, SIMOX, hydrogen implantation in silicon and subsequent cleaving ("SMARTCUT" process), bonding the crystal silicon on oxide, or growing silicon on sapphire. SIMOX processes involve the use of ion implantation to form oxide in a region of single crystal silicon. Accordingly, selected regions of silicon may be converted into silicon dioxide yielding a $Si/SiO_2$ multilayer structure. To produce the silicon/silicon dioxide DBR 434 the thickness and position of the silicon dioxide layers formed in the silicon are preferably selected appropriately, for example, to produce a multilayer structure such as half-wave stack.

Another strategy for fabricating the DBR 434 is to obtain a commercially available SOI wafer, which comprises a first silicon substrate having a first silicon dioxide layer thereon with a second layer of silicon on the first silicon dioxide layer. The aggregate structure therefore corresponds to $Si/SiO_2/Si$. Structures comprising a combination of silicon and silicon dioxide ($Si/SiO_2$) can also be used. These structures can be bonded together to produce the DBR 434. In one exemplary process, $Si/SiO_2$ structures can be bonded to a SOI wafer to produce the reflective stack 434. Additional $SiO_2$ and Si layers can also be formed using deposition or bonding techniques. Other techniques are also possible.

In other embodiments, deposition and patterning techniques may be used to produce the various layers 436, 438 of the DBR 434 on a silicon, sapphire, or other substrate 414. Sputtering, CVD, etching, and damascene processes are considered possible. For instance, in certain embodiments, sputtering or CVD techniques could be used to build up the various layers of the DBR 434, the cladding 412, and the slab 410 at least in areas of a waveguide structure designated to have the grating coupler 401. Formation of the features of the grating 408 could then be done using masks and/or deposition steps. Other technique for fabricating DBRs 434 such as those conventionally employed as well as those yet to be developed may be employed using both silicon based material systems as well as other different materials. For example, if the waveguide grating coupler is fabricated on a III–V substrate, preferably conventional and easy-to-fabricate III–V DBRs are used.

To further reduce light loss in the waveguide grating coupler 401, the light 449 that escapes through the top of the grating 408 is preferably redirected back to the grating 408. This light 449 is the portion of the light 446 reflected from the DBR 434 that is not scattered by the grating 408 on the second pass through the grating 408. Preferably, this light 449 too is directed by the waveguide grating 408 longitudinally down the waveguide 404.

Figure 26:
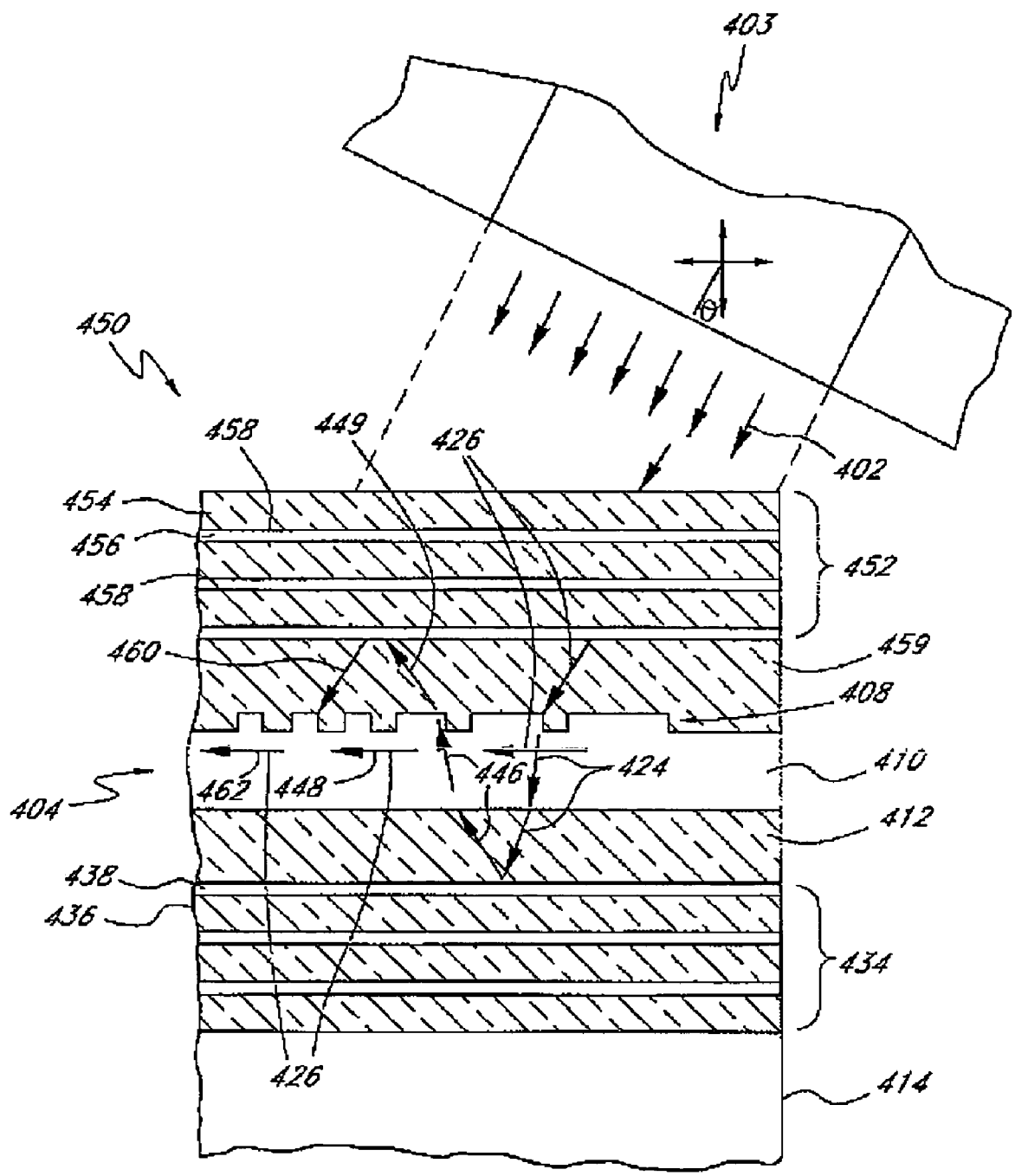
FIG. 26 is a cross-sectional view of a waveguide grating coupler that includes two DBRs, one disposed beneath the waveguide grating and the other disposed above the waveguide grating, to redirect deviant light rays back toward the waveguide grating for coupling into the planar waveguide.

In certain embodiments, such as that schematically illustrated in FIG. 26, an integrated optical apparatus 450 comprises the grating coupler 401 having the grating 408, wherein the grating coupler 401 includes both a lower DBR 434 and an upper DBR 452. The pair of DBRs 434, 452 are positioned on opposite sides of the grating 408 such that light from the beam 402 that does not propagate along a portion of the optical path 426 longitudinally along the waveguide 404 is reflected by the pair of DBRs 434, 452 towards the grating 408.

In certain embodiments, the second DBR 452 is constructed in essentially the same manner as the first DBR 434. Specifically, the DBR 452 generally comprises alternating layers 454, 456 of low and high refractive index material, respectively. The alternating low and high index layers 454, 456 create interfaces 458 with refractive index mismatches that produce Fresnel reflections. Accordingly, the second DBR 452 comprises a plurality reflective surfaces 458 that are formed at the interfaces between the adjacent low and high index layers 454, 456. The plurality of reflective interfaces 458 together contribute to the total reflectance of the DBR 452. As described above, this plurality of reflective interfaces can produce a coherent effect. Preferably, an upper cladding layer 459 is disposed between the slab 410 and the second DBR 452.

In certain embodiments, the thicknesses and materials for the layers 454, 456 in the DBR 452 are the same as the thicknesses and materials of the layers 436, 438 comprising the first DBR 434, respectively. In other embodiments, however, at least some of the materials and thicknesses in the upper DBR 452 may be different than those used in the lower DBR 434. Preferably, the DBR layers 436, 454, and the upper and lower cladding 459, 412, comprise silicon dioxide having an index of refraction of about 1.5, while the DBR layers 438, 456, and the slab 410 comprise crystal silicon having an index of refraction of about 3.5. In other embodiments, at least some of the DBR layers 436, 454, and the upper and lower cladding 459, 412, comprise other dielectrics such as other oxides and nitrides including, for example, silicon nitride. As described above, still other materials are possible.

Equations 9 and 10 may be used to calculate the thicknesses $t_{High}$ and $t_{Low}$, respectively, of the upper DBR 452, where the parameters on the left hand and right hand side of Equations 9 and 10 now refer to the upper DBR 452 and light incident on the upper DBR 452. This light may comprise, for example, light that is reflected off the lower DBR 434 and not scattered by the grating 408. Preferably, the thicknesses and materials for the upper DBR 452 are selected based on the wavelength of light to be coupled into or out of the waveguide 404 and on the relative orientation of the optical fiber 403 with respect to the upper Bragg reflector 452, its optical output, and/or the unscattered portion 449 of light passing through the grating 408. In the case where the primary concern is light scattered by the grating 408 along paths other than longitudinally down the waveguide, the angle of this scattered light may be employed to select the appropriate thicknesses and material compositions of the layers 454, 456 in the DBR 452.

Thus, the thickness and material composition of the layers may be designed in some embodiments to provide maximal or at least substantially increased reflectance for the desired wavelength and angle of incidence. Other methods may be used to obtain an estimate of the thicknesses of the layers 454, 456 that are different from the estimates obtained using Equations 9 and 10 or that are based on variations of Equations 9 and 10. As discussed above, for example, the DBR 452 may comprise a quarter-wave stack or multilayer structure wherein the multiple layers have a variety of thicknesses. Moreover, in certain embodiments, the angle of light incident on the DBR 452 is not considered in designing the DBR or at least is not employed to determine the DBR layer thicknesses that optimize reflectivity.

As illustrated by the ray 449 in FIG. 26, some of the light reflected by the lower DBR 434 and incident on the grating 408 is unscattered. At least some of this light 449, herein referred to by reference numeral 460, is reflected by the upper DBR 452 and propagates towards the grating 408 as a result of the constructive interference from reflections off the plurality of interfaces 458. The grating 408 diffracts at least a portion of this reflected light 460 along the optical path 426. This diffracted light, represented by ray 462, contributes to the light 426, 448 propagating longitudinally down the waveguide. In this manner, the coupling efficiency of the grating coupler 401 is increased in comparison to a grating coupler having only one or no reflective elements. In certain embodiments, additional reflections off of the two DBRs 434, 452 occur, causing more light to be coupled into the waveguide 404 and further improving the optical coupling efficiency of the integrated optical structure 450.

For purposes of illustration, FIG. 26 shows one reflection from each of the two DBRs 434, 452. In certain embodiments, however, the light 402 from the optical fiber 403 interacts with the various interfaces of the DBRs 434, 452, the slab 410, the cladding 412, and the separation layer 459 to produce optical resonance. The DBRs 434, 452 may form the reflectors of an optical cavity in which optical resonance can be achieved. Preferably, in such an embodiment, the thickness of one or more of the slab 410, the upper and lower cladding 459, 412 and the separation between the DBR 434, 452 are precisely adjusted so as to tune the cavity to create an optical resonance condition for the wavelength and angle of light output from the optical fiber 403 and incident on the waveguide coupler 401. The construction of the DBRs 434, 452, i.e., the number, thickness, and composition (and index of refraction) of the DBR layers, may also affect the resonance and the resonance condition. Creation of the optical resonance cavity enhances the coupling of light 402 from the fiber 403 into the integrated optical apparatus 450. In addition, creation of an optical resonance cavity allows external light (e.g., the light 402 from the optical fiber) at a proper incidence angle to be transmitted through the upper Bragg grating 452 and into the grating coupler 401, while portions of that same light are reflected by the upper Bragg grating 452 when incident from the opposite side (i.e., from within the separation layer 459).

The structure may be fabricated using techniques described above, however, the fabrication methods discussed herein are exemplary and should not be construed as limiting, since other methods may also be used to form an optical resonance cavity.

Figure 27:
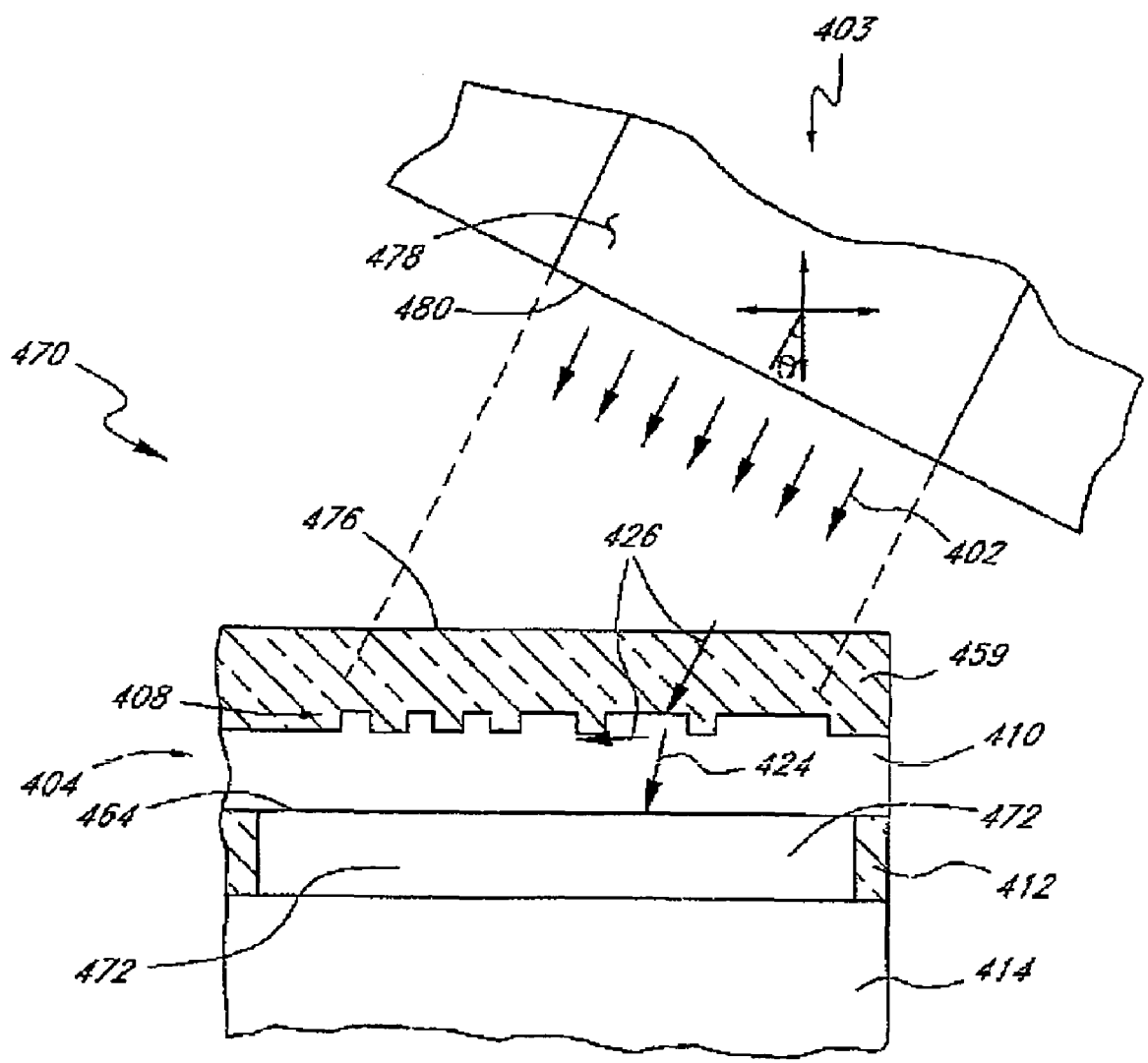
FIG. 27 is a cross-sectional view of a waveguide grating coupler that includes a gas-filled cavity disposed beneath the waveguide grating to increase the reflection of deviant light rays and direct them back toward the waveguide grating for coupling into the planar waveguide.

In certain embodiments, other reflective structures can alternatively be used in place either of the DBRs 434, 452 to reflect the light that is not scattered by the grating 408 or is scattered in a direction other than along the desired path. In one preferred embodiment schematically illustrated in FIG. 27, an integrated optical apparatus 470 comprises the planar waveguide 404 on the substrate 414. The grating coupler further includes a gas-filled cavity 472, at least a portion of which is in the cladding 412. An interface 464 between the slab 410 and the cavity 472 reflects light incident thereon. The cavity 472 is positioned with respect to the grating 408 such that light outside the optical path 426 is reflected by the cavity 472 towards the grating 408.

The reflection at the interface 464 is due to refractive index differences across the interface 464. The amount of light reflected is affected by parameters such as the angle of incidence of the light on the interface 464, the refractive index difference at the interface 464, and the polarization of the light. For angles greater than the critical angle of the interface 464 (measured from the surface normal), substantially all the light incident at the interface 464 is reflected. The critical angle of the interface 464 decreases as the relative difference in the refractive indices across the interface 464 increases. Also, at angles less than the critical angle of the interface 464, reflectivity at the interface 464 is higher for larger disparities of the refractive indices on opposite sides of the interface 464.

As a result of both these effects, reducing the refractive index in the region 472 beneath the slab 410 will generally result in more light from an incident beam being reflected at the interface 464. In the case of the light from the fiber 403, a reduction in the refractive index of this region 472 increases the reflection of both light that is unscattered by the grating 408 (i.e., ray 424) and light that is scattered by the grating 408, but is outside the predetermined optical path 426. The cavity 472 increases the relative difference in the refractive indices on the opposite sides of the interface 464 by effectively replacing the cladding 412, which has a refractive index that is greater than one, with a gas that has a refractive index that is approximately equal to one. As a result, more light is reflected towards the grating 408 by the interface 464 than in the case where the cavity 472 is not present.

In certain embodiments, the gas-filled cavity 472 comprises air that has a refractive index of approximately one. The pressure, temperature, and other conditions of the air may be those defined under standard atmospheric conditions or may be modified as required for operating conditions. Such modified conditions may include vacuum or near vacuum conditions. Alternatively, the gas-filled cavity 472 may comprise a different gas such as nitrogen or an inert gas such as helium. The cavity 472 may contain other gases as well. The gases in the cavity 472 may be determined in part by the environment in which the integrated optical structure 470 is fabricated such as for example a processing chamber.

Figure 28:
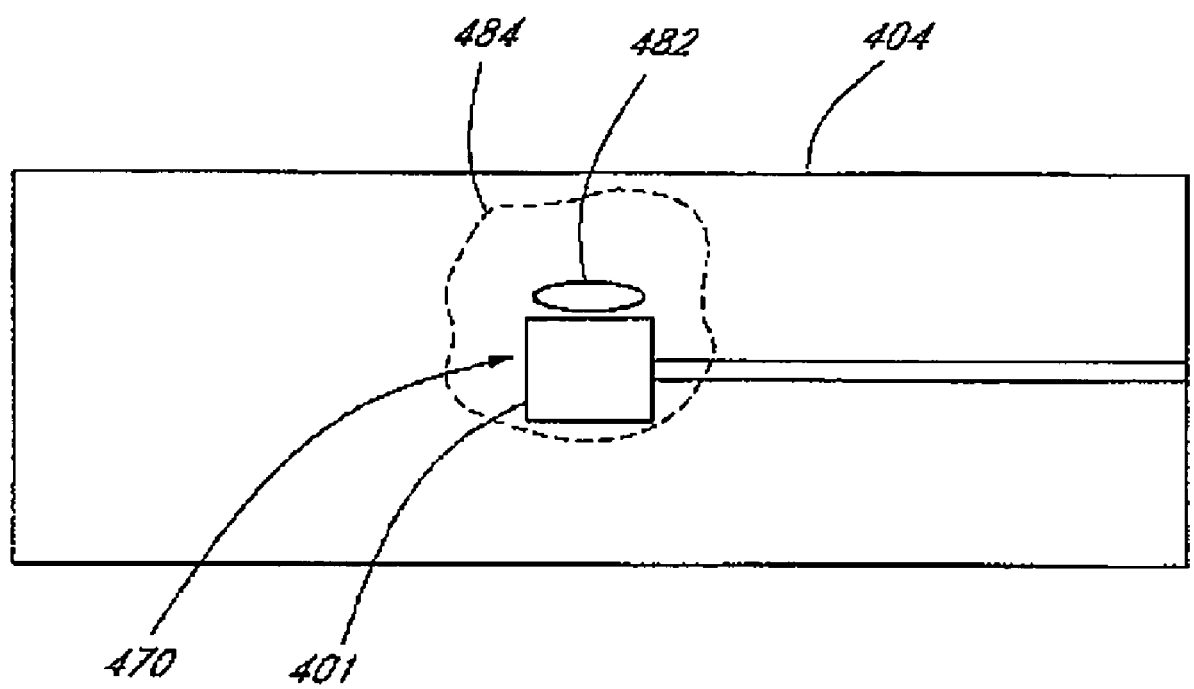
FIG. 28 is a schematic top view of a waveguide grating coupler such as shown in FIG. 27 depicting an access area for etching beneath the coupler.

In various preferred embodiments, the gas-filled cavity 472 of the optical device 470 may be fabricated as discussed with reference to FIG. 28, which schematically illustrates a top view of the planar waveguide 404 having the grating coupler 401 used to couple light from the optical fiber 403 (not shown). The optical device 470 may initially be fabricated on the waveguide 404 without the cavity 472. The slab 410 in the area of the grating coupler 401 is directly adjacent to the cladding 412 that lie beneath.

To create the gas-filled cavity 472, material is etched away from the slab 410 thereby forming an access area 482. Preferably, an appropriate etchant and etching procedure is used that will remove material from the slab 410, which may be silicon. Preferably, this etchant is not reactive or is substantially less reactive with the underlying cladding material than the slab 410. Buffered hydrofluoric acid is one example of an etchant well-known in the art that may be useful. The process, however, should not be limited to this particular etchant or type of etchant.

The access area 482 that is formed provides access to the underlying cladding 412, which is to be later removed from beneath the grating coupler 401 to produce the cavity 472. Preferably, the access area 482 is located near the grating coupler 401, but sufficiently far away to avoid inadvertent damage or alteration of the coupler 401. The shape of the access area 482 is shown as elliptical and with a dimension comparable to the grating coupler 401; however, other shapes and sizes may be used. The shape may vary as required to provide the desired access to the cladding 412 and to meet with other fabrication requirements.

To form the cavity 472, the access area 482 is exposed to an etchant that dissolves the cladding material, which may be silicon dioxide. Preferably, this etchant does not etch the material used in the slab 410 and substrate 414 or at least etches this material at a substantially slower rate than the cladding 412. Initially, material in the cladding that is directly exposed by the access area is removed; however, depending on the selection of etching processes and chemistry, one or more additional etchants tunnels underneath the slab 410 to produce a tunnel area 484 that encompasses at least a portion of the area beneath the coupler 401.

The tunneled area 484 can be cleaned and otherwise conditioned for use. In certain embodiments, the gas filled cavity may be filled with a desired gas under the desired environmental conditions. Additionally, the access area 482 may be sealed as necessary to maintain the proper environment inside the cavity 472. This step may be preformed, for example, using one of the deposition techniques discussed herein or other techniques common in the art.

The fabrication method discussed herein is exemplary and should not be construed as limiting, since other methods may also be used to form the gas filled cavity 472 consistent with embodiments of the present invention.

In certain embodiments, the optical apparatus 470 (see e.g. FIG. 27) may include an optical coating 459 over the grating 408 which may correspond to the upper cladding and/or at least one cover layer. The cover layer may serve as a protective coating to protect the grating 408 or serve other purposes such as to condition the light prior to interaction with the grating 408. Preferably, this optical coating 459 is substantially optically transmissive to light being coupled into or out of the waveguide 404 via the waveguide grating coupler 401. The optical coating 459 may have a surface 476 that is optically smooth and substantially parallel to the waveguide 404. In other embodiments, the surface 476 of the optical coating 459 may be inclined at an angle with respect to the waveguide. For instance, this coating surface 476 may be disposed such that it is normal to general propagation direction of the light 402 emanating from the optical fiber 403, so as to thereby reduce the amount of light 402 reflected by the surface 476 of the coating 459.

In certain embodiments, space between the optical fiber 403 and the optical coating 459 is filled with an index matching substance having an index of refraction that reduces reflective losses. For example, if the optical coating 459 comprises a material having substantially the same refractive index as a fiber core 478 in the optical fiber 403, an index matching fluid having the same refractive index may be used. Reflections of the light 402 at the fiber face 480 and at the surface 476 of the optical coating 459 can both be reduced to negligible amounts. If the optical coating 459 and the fiber core 478 have different refractive indices, this index matching substance may have an intermediate index between that of the optical coating and fiber so as to reduce reflection.

Figure 29:
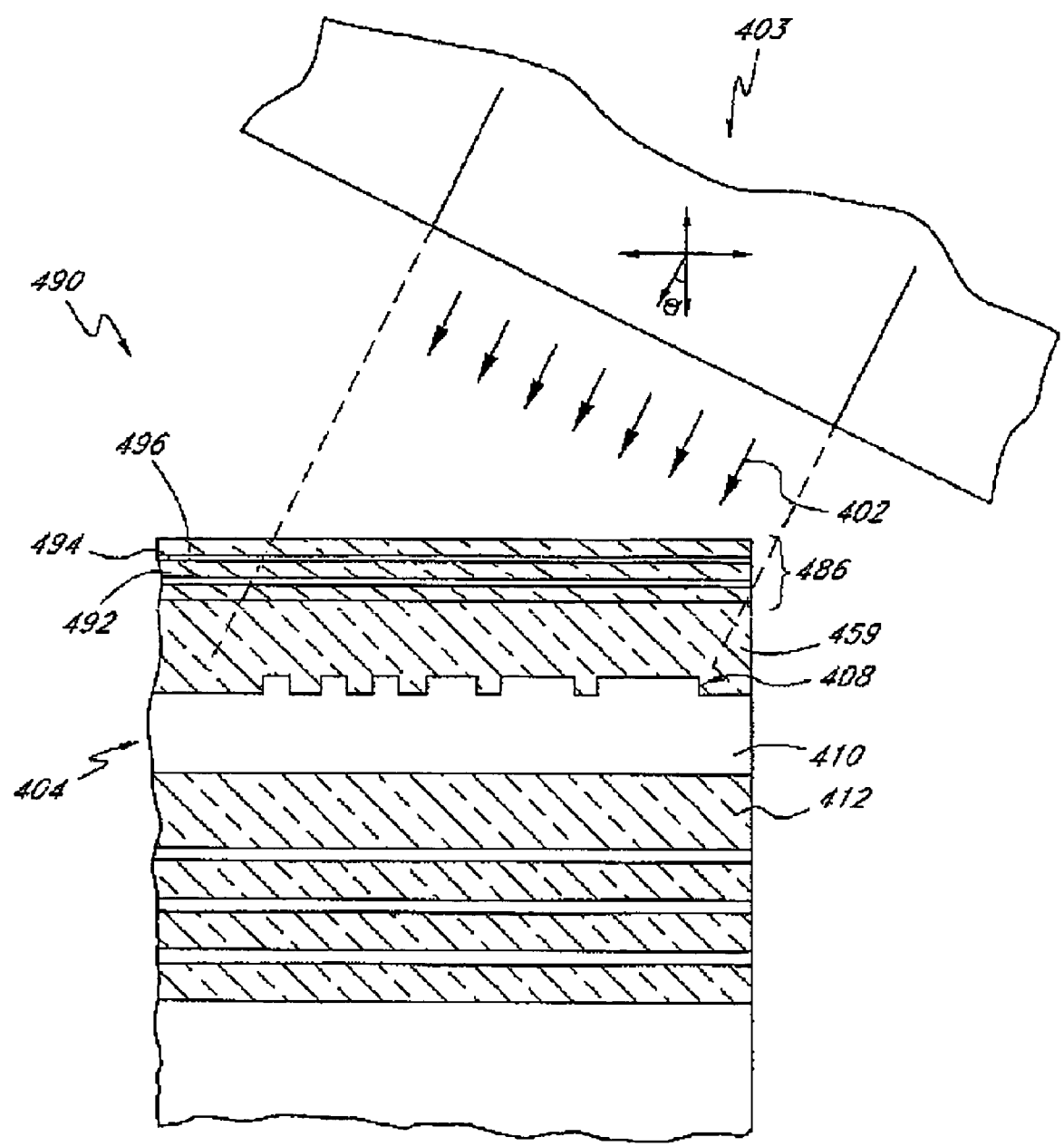
FIG. 29 is a cross-sectional view of a waveguide grating coupler that includes an anti-reflection (AR) coating disposed above an optical coating on the waveguide grating to decrease the amount of light reflected by the optical coating.

As schematically illustrated in FIG. 29, in certain embodiments, an integrated optical apparatus 490 includes an anti-reflection (AR) coating 486 which reduces the amount of light that is reflected off the surface 476 of the optical coating 459. This AR coating 486 may comprise a plurality of layers 492 of materials having specific thicknesses that are formed over the grating 408. In various preferred embodiments, the plurality of layers 492 of material provide an index gradient to match the index of the region between the beneath the optical fiber 403 with the refractive index of the layer 459 above the grating 408. Such AR coating designs, and methods of fabricating, are well-known in the art. In certain exemplary embodiments, the index of refraction may progressively increase from a relatively low value in portions closest to the optical fiber 403 to relatively high values in portions closest to the layer 459 above the grating 408. Other AR coating designs are possible. Selection of suitable materials, thicknesses, and configurations for AR coatings are well-known to those skilled in the art. Although the AR coating 486 depicted in FIG. 29 comprises five layers 492, more or less layers may be employed. Similarly, the thickness of the layers 492 may vary depending on the design.

Preferably, the AR coating 486 is designed to reflect incident light at a specific angle. This angle may be determined by the orientation of the fiber 403 with respect to the waveguide grating coupler 401 and the refractive index of the material in each layer. For example, the optical fiber 403 may be directed at an angle θ such that light from the fiber is incident on the AR coating 486 at the angle θ.

As indicated above, AR coating technology is well developed. Accordingly, conventional AR coatings known in the art may be suitably employed. Alternatively, designs yet to be developed may be used to reduce reflection losses associated with the waveguide grating coupler.

Additionally, the AR coating 486 may be manufactured using conventional integrated circuit fabrication processes, as discussed above, as well as by utilizing techniques yet to be developed. As with the multilayer structures described above, the AR coatings 486 may comprise semiconductor based materials such as silicon, silicon dioxide, and silicon nitride, as these materials may provide a high index contrast. Other materials, including but not limited to both other semiconductor and dielectric materials may be used as well.

Various features and aspects of waveguides grating couplers have been described above. These features and aspects may or may not be included in any given waveguide grating coupler resulting in a variety of possible embodiments and combination of such features. For example, the waveguide coupler may or may not be flared and may or may not have hyperbolic curve sidewalls. The waveguide coupler may or may not have curved or elliptically shaped scattering elements. The grating may or may not be in the near field of the optical element or vice versa. The grating coupler may or may not have a grating width profile having "jumps" that provides a Gaussian or other desired intensity profile. The grating coupler may or may not include segmented scattering elements. The grating coupler may or may not include one or more distributed Bragg reflector or other reflective element for directing light back toward the grating, may or may not include a pair of such reflectors to form an optical resonant cavity around the grating and may or may not include an anti-reflective coating. The grating coupler may or may not include a gas-filled cavity as a lower cladding and may or may not be index matched to, for example, an optical fiber. Various other features and aspects of the invention may or may not be included in any particular grating coupler while various combinations of these features may be incorporated together in any one configuration.

Those skilled in the art will appreciate that the methods and designs described above have additional applications and that the relevant applications are not limited to those specifically recited above. Also, the present invention may be embodied in other specific forms without departing from the essential characteristics as described herein. The embodiments described above are to be considered in all respects as illustrative only and not restrictive in any manner.

What is claimed is:

1. An integrated optical apparatus comprising:
a planar waveguide on a substrate;
said waveguide having an elongated guiding portion and a grating coupler;
said grating coupler comprising a plurality of gratings having respective scatter-cross-sections adapted to scatter light along at least a portion of a predetermined optical path and a gas-filled cavity, at least a portion of which is in the substrate;
said cavity positioned with respect to said gratings such that light scattered outside said portion of said optical path is reflected by said cavity towards said gratings.

2. The optical system of claim 1, wherein said grating coupler includes sidewalls to confine light in a transverse direction.

3. The optical system of claim 2, wherein said grating coupler comprises a waveguide selected from the group consisting of a channel waveguide, a ridge waveguide, a strip loaded waveguide, and a strip loaded waveguide having a low index transition region.

4. The integrated optical apparatus of claim 1, wherein said substrate comprises a silicon wafer.

5. The integrated optical apparatus of claim 4, wherein said substrate further comprises a silicon dioxide layer formed on said silicon wafer.

6. The integrated optical apparatus of claim 5, wherein said substrate further comprises one or more layers of material formed on said silicon wafer.

7. The integrated optical apparatus of claim 1, wherein said gas-filled cavity is filled with air.

8. The integrated optical apparatus of claim 1, wherein said waveguide comprises cladding and gas-filled cavity is in at least a portion of said cladding.

9. An integrated optical apparatus, comprising:
a planar waveguide having an elongate guiding portion and a grating coupler, said coupler having at least a flared waveguide portion comprising a relatively narrow end portion and a relatively wide end portion, said flared portion having a grating positioned to couple light between said coupler and an optical element, wherein (i) said grating comprises curved elongate scattering elements having curvatures defined by substantially elliptical paths so as to couple plane waves between said waveguide grating coupler and said optical element, (ii) wherein said elongate scattering elements have respective scatter cross-sections adapted to scatter light along at least a portion of a predetermined optical path for matching optical mode of plane waves in said elongate guiding portion and said optical element and (iii) said planar waveguide is fabricated in silicon.

10. The integrated optical apparatus of claim 9, wherein (i) said elongate scattering elements have respective scatter cross-sections adapted to scatter light along at least a portion of a predetermined optical path and (ii) a pair of Distributed Bragg Reflectors (DBRs) are positioned on opposite sides of said grating such that light scattered outside said portion of said optical path is reflected by said DBRs towards said grating.

11. The integrated optical apparatus of claim 10, wherein said pair of DBRs are spaced apart from each other a distance to provide an optical cavity resonance for said scattered light.

12. The integrated optical apparatus of claim 10, wherein said planar waveguide and said pair of DBRs are formed over a substrate, one of said DBRs being disposed between said planar waveguide and said substrate such that light scattered outside said portion of said optical path and toward said substrate is reflected by said one of said DBRs toward said grating.

13. The integrated optical apparatus of claim 9, wherein (i) said elongate scattering elements have respective scatter cross-sections adapted to scatter light along at least a portion of a predetermined optical path and (ii) a gas-filled cavity is positioned with respect to said grating such that light scattered outside said portion of said optical path is reflected by said cavity towards said grating.

14. The integrated optical apparatus of claim 13, further comprising a substrate, said planar waveguide being disposed over said substrate and at least a portion of said gas-filled cavity being in said substrate.

15. The integrated optical apparatus of claim 13, wherein said gas-filled cavity is filled with air.

16. The integrated optical apparatus of claim 13, wherein said planar waveguide comprises cladding and said gas-filled cavity is in at least a portion of said cladding.

17. The integrated optical apparatus of claim 9, further comprising:
a cladding over said grating; and
an anti-reflection coating over said cladding for reducing reflections.

18. The integrated optical apparatus of claim 17, wherein said anti-reflection coating comprises a multilayer stack.

19. The integrated optical apparatus of claim 17, wherein said anti-reflection coating comprises alternating layers of semiconductor and dielectric material.

20. The integrated optical apparatus of claim 17, wherein said anti-reflection coating comprises alternating layers of silicon and dielectric material.

21. The integrated optical apparatus of claim 17, wherein said anti-reflection coating comprises multiple layers of dielectric material.

22. The integrated optical apparatus of claim 17, wherein said dielectric material is selected from the group consisting of silicon dioxide and silicon nitride.

* * * * *